(12) United States Patent
Imade

(10) Patent No.: US 7,532,176 B2
(45) Date of Patent: May 12, 2009

(54) LIGHT SOURCE APPARATUS AND IMAGE PROJECTION APPARATUS

(75) Inventor: Shinichi Imade, Saitama-ken (JP)

(73) Assignee: Olympus Corporation, Tokyo (JP)

( * ) Notice: Subject to any disclaimer, the term of this patent is extended or adjusted under 35 U.S.C. 154(b) by 713 days.

(21) Appl. No.: 11/166,827

(22) Filed: Jun. 24, 2005

(65) Prior Publication Data

US 2006/0002109 A1  Jan. 5, 2006

(30) Foreign Application Priority Data

Jun. 30, 2004 (JP) .............................. 2004-192909

(51) Int. Cl.
*G09G 3/00* (2006.01)
*G09G 3/36* (2006.01)
*G02B 5/08* (2006.01)

(52) U.S. Cl. .................... 345/32; 345/102; 359/443

(58) Field of Classification Search .................. 345/32, 345/83–85, 102; 359/443
See application file for complete search history.

(56) References Cited

U.S. PATENT DOCUMENTS

2005/0128441 A1* 6/2005 Morgan ...................... 353/102

FOREIGN PATENT DOCUMENTS

| JP | 06-141262 | 5/1994 |
|----|-----------|--------|
| JP | 08-006364 | 1/1996 |
| JP | 3015201 | 12/1999 |
| JP | 2000-305040 | 11/2000 |
| JP | 2002-296680 | 10/2002 |
| JP | 2003-255465 | 9/2003 |
| JP | 2003-263902 | 9/2003 |

* cited by examiner

*Primary Examiner*—Amr Awad
*Assistant Examiner*—Randal Willis
(74) *Attorney, Agent, or Firm*—Volps and Koenig, P.C.

(57) ABSTRACT

The present invention provides a light source apparatus and an image projection apparatus having the light source apparatus. The light source apparatus includes a lamp for emitting white illumination light, a color wheel for sequentially switching a color filter on which illumination light emitted from the lamp is incident, a wheel driving unit for controlling rotation of the color wheel, an LED light source unit for emitting at least one color of illumination light, an LED driving unit for controlling illumination light of the LED light source unit, an optical synthesis unit capable of optically synthesizing illumination light from the lamp and illumination light from the LED light source unit and emitting such synthesized illumination light, and a system controlling unit for controlling the wheel driving unit and the LED driving unit so that each illumination light synthesized can be the same in color.

40 Claims, 31 Drawing Sheets

A ARROW VIEW DIAGRAM

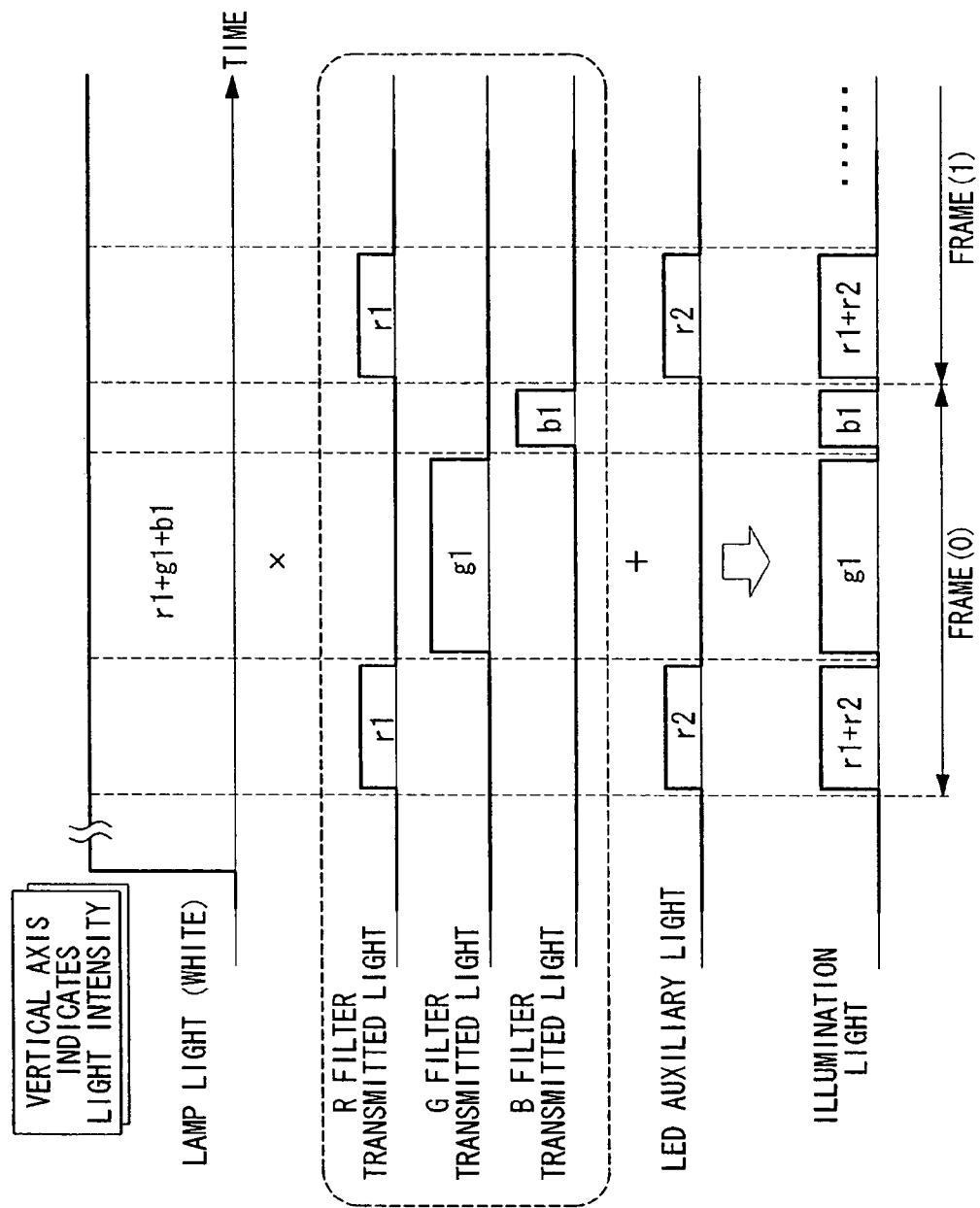

LIGHT SOURCE APPARATUS AND IMAGE PROJECTION APPARATUS

PRIORITY CLAIM

Priority is claimed on Japanese Patent Application No. 2004-192909, filed Jun. 30, 2004, the content of which is incorporated herein by reference.

BACKGROUND OF THE INVENTION

1. Field of the Invention

The present invention relates to a light source apparatus having mode selecting functions for giving priority to the color reproduction of a display image or to brightness according to need, and to an image projection apparatus having the light source apparatus.

2. Description of the Related Art

Known conventional image projection apparatuses include a type in which a white-light source is used to produce light separated into primary colors of red (R), green (G) and blue (B), and another type in which an optical semiconductor, for example, one capable of naturally emitting light of primary colors such as a light-emitting diode (LED), is used.

In the above-described image projection apparatus in which a white-light source is used, lamps such as discharge lamps capable of effectively producing high intensity light are often used. Some of these discharge-type lamps, for example, xenon lamps, are light sources extremely excellent in color rendering properties but limited to certain specific products due to high cost and a large lamp size. In general, an extra-high pressure mercury lamp is mainly used as a white-light source of an image projection apparatus and is now used widely, which is, however, not expected to provide sufficient performance in terms of color rendering properties.

In another type in which a photo diode is used, the LED is still far behind the discharge lamp as a single light source in absolute light intensity, although the LED has been now drastically improved in luminous efficiency. Since the LED does not require color separation and can directly emit primary colors of red, green and blue, it can be effectively used in an image projection apparatus based on a color frame sequential method. Further, the photo diode type is easier to use when switching electrical lighting and adjusting light intensity by electric current and free of harmful substances such as mercury, therefore receiving attention as a next generation light source. It has also caught attention as a light source extremely excellent in color rendering properties particularly due to high color purity.

In order to realize the brightness and color rendering properties required by an image projection apparatus, various types of apparatuses combining discharge lamps with photo diodes such as LEDs to fully utilize these two types of light source have been proposed (refer, for example, to Patent Documents Japanese Published Unexamined Patent Application No. 2000-305040, Japanese Published Unexamined Patent Application No. 2003-255465, Patent No. 3015201, Japanese Published Unexamined Patent Application No. Hei 6-141262, Japanese Published Unexamined Patent Application No. 2002-296680, and Japanese Published Unexamined Patent Application No. 2003-263902).

As one example of the above, the projection-type display apparatus as set forth in Japanese Published Unexamined Patent Application No. 2000-305040 discloses a structure in which light acquired by separating light emitted by a discharge white lamp into primary colors and emitted in light of primary colors by a photo diode are modulated by a display device (spatial modulation element) to project the video light. In addition, a light-emitting diode (LED) high in color purity is used as an optical semiconductor, and the light-emitting diode is used to supplement red color composition, which tends to be insufficient in a discharge lamp, and to improve color rendering properties.

As another example, the projection-type display apparatus as set forth in Japanese Published Unexamined Patent Application No. 2003-255465 discloses a structure in which a laser light source is used in place of a light-emitting diode, in an effort to realize the same object of the projection-type display apparatus as set forth in Japanese Published Unexamined Patent Application No. 2000-305040. This is because a light-emitting diode is in general a plane emission diffusion light source and has a smaller light angle, as with laser light, and proves problematic in providing effective illumination light, whereby the video light is not expected to be sufficiently improved in luminance and efficiency.

SUMMARY OF THE INVENTION

The first aspect of the invention is directed to a light source apparatus that comprises a lamp for emitting white illumination light; a color wheel for rotating a color filter having a plurality of colors and sequentially switching the color filter on which illumination light emitted by the lamp is incident; a wheel driving unit for rotating the color wheel and also controlling the rotation; an LED light source unit for emitting at least one color of illumination light; an LED driving unit for driving the LED light source unit and also controlling illumination light to be emitted; an optical synthesis unit capable of optically synthesizing and emitting illumination light passed through the color filter of the color wheel and illumination light emitted from the LED light source unit; and a system controlling unit for controlling the wheel driving unit and the LED driving unit so that each color of illumination light synthesized by the optical synthesis unit can be rendered the same.

Advantageously, the optical synthesis unit is a prism having a first plane on which illumination light passed through the color filter of the color wheel is incident, a second plane on which illumination light emitted by the LED light source unit is incident, and a third plane from which illumination light made incident at least on the first and the second planes is emitted, so that illumination light totally reflected by the second plane of illumination light incident on the first plane and illumination light totally reflected by the first plane of illumination light incident from the second plane are also emitted from the third plane.

Preferably the optical synthesis unit is a polarizing beam splitter having a polarization and transmission reflecting plane, and the polarizing beam splitter synthesizes linearly-polarized illumination light in a predetermined direction with respect to the polarization and transmission reflecting plane among various types of illumination light passed through the color filter of the color wheel and linearly-polarized illumination light in a direction perpendicular to the predetermined direction among various types of illumination light emitted by the LED light source unit.

Advantageously, the light source apparatus further comprises a first polarizing plate for converting illumination light passed through the color filter of the color wheel to linearly-polarized illumination light in the predetermined direction with respect to the polarization and transmission reflecting plane; and a second polarizing plate for converting illumination light emitted by the LED light source unit to linearly-polarized illumination light in a direction perpendicular to the predetermined direction, wherein the polarizing beam splitter synthesizes illumination light converted individually by the first polarizing plate and the second polarizing plate.

Preferably, the LED light source unit emits a single color of illumination light.

Advantageously, the LED light source unit includes a plurality of LED elements for emitting the single color of illumination light; and a light guide unit for guiding to the optical synthesis unit illumination light emitted by the plurality of LED elements, and wherein the LED driving unit drives the plurality of LED elements so that the plurality of LED elements are turned on sequentially in chronological order and also controls the light guide unit so as to move the light guide unit in relation to the plurality of LED elements in synchronization with timing for turning on the plurality of LED elements.

Advantageously, the plurality of LED elements is disposed on a circumference, emitting the single color illumination light toward the center of the circumference; and the light guide unit is rotated about the center of the circumference.

Preferably, the rotation number per unit time of the color wheel driven by the wheel driving unit is designed to be different from the rotation number per unit time of the light guide unit rotated by the LED driving unit.

Advantageously, the LED light source unit emits illumination light the color number of which is equal to that of illumination light passed through the color filter of the color wheel.

Advantageously, illumination light emitted by the LED light source unit and illumination light passed through the color filter of the color wheel have red (R), green (G) and blue (B) that are approximately the same in central wavelength.

Preferably, illumination light emitted by the LED light source unit and illumination light passed through the color filter of the color wheel have two types of red (R), green (G) and blue (B) that are different in central wavelength, respectively.

Preferably, only illumination light passed through the color filter of the color wheel includes white color.

Advantageously, the LED light source unit includes a plurality of LED elements for emitting at least two colors of illumination light and a light guide unit for guiding to the optical synthesis unit illumination light emitted by the plurality of LED elements; and the LED driving unit drives the plural LED elements to turn them on sequentially in chronological order and also controls the light guide unit so as to move with respect to the plurality of LED elements in synchronization with timing for turning on the plurality of LED elements.

Advantageously, the plural LED elements are disposed on a circumference, emitting illumination light toward the center of the circumference; and the light guide unit is rotated about the center of the circumference.

Preferably, the color order of the color filter moving in a direction opposite the rotating direction of the color wheel is the same as that of illumination light emitted by respective LED elements of the LED light source unit in the direction in which the light guide unit moves; and the rotation number per unit time of the color wheel driven by the wheel driving unit is designed to be equal to that of the light guide unit rotated by the LED driving unit.

Preferably, the a wheel driving unit includes a motor rotating and driving the color wheel; and the LED driving unit rotates the light guide unit by utilizing the rotation and driving force of the motor.

The second aspect of the invention is directed to an image projection apparatus for projecting an image according to the image information to be input so as to be observed by an observer. The image projection apparatus comprises a light source apparatus set forth in the first aspect of the invention; a spatial modulation element modulated according to the image information to be input; an illuminating optical unit for guiding illumination light emitted from the optical synthesis unit and illuminating the spatial modulation element; and an optical projection unit illuminated by the illuminating optical unit for projecting an image modulated by the spatial modulation element.

Advantageously, the system controlling unit can select one mode from at least two modes among four modes of lamp mode, LED mode, booster mode and dynamic selection mode, as a condition under which the spatial modulation element is illuminated by the illuminating optical unit, and controls the wheel driving unit and the LED driving unit so that illumination light emitted by the optical synthesis unit is only illumination light emitted by the lamp when selecting the lamp mode; only illumination light emitted by the LED light source unit when selecting the LED mode; combined illumination light derived by combining illumination light emitted by the lamp and that emitted by the LED light source unit in at least one color of illumination light when selecting the booster mode; and illumination light emitted by switching between the lamp mode and the LED mode within one frame period of the image information when selecting the dynamic selection mode.

Preferably, the system controlling unit selects and switches between the lamp mode and the LED mode for each color of illumination light emitted from the optical synthesis unit when selecting the dynamic selection mode.

Preferably, the image projection apparatus further comprises a manual switch operable by an observer for specifying the mode to be selected by the system controlling unit among the four modes.

Preferably, the system controlling unit selects one mode according to the image information to be input.

Advantageously, the system controlling unit selects the LED mode when a ratio of the pixels exceeding a predetermined gradation threshold to the whole is smaller than a predetermined ratio, in gradation distribution of the pixels of the image information to be input; and selects the booster mode when the ratio is greater than the predetermined ratio.

Advantageously, the image projection apparatus further comprises an ambient light intensity sensor for detecting an ambient light intensity, wherein the system controlling unit selects the LED mode when the ambient light intensity detected by the ambient light intensity sensor is smaller than a predetermined value, and selects the booster mode when it is greater than the predetermined value.

Advantageously, when the optical projection unit projects an image to a screen, the ambient light intensity sensor detects as an ambient light intensity the reflected light from the screen in a state where the optical projection unit projects no image.

Advantageously, the image projection apparatus further comprises a zooming unit for changing a magnification of the image projected by the optical projection unit, where in the system controlling unit selects the LED mode when the image projected by the optical projection unit is made smaller than a predetermined size by the zooming unit, and selects the booster mode when it is made greater than the predetermined size.

Advantageously, the image projection apparatus further comprises a projection light intensity sensor for detecting the light intensity of an image projected by the optical projection unit, wherein the system controlling unit selects the booster mode when light intensity of the projected image detected by the projection light intensity sensor is smaller than a predetermined value, and selects the LED mode when it is greater than the predetermined value.

Preferably, when the optical projection unit projects an image to a screen, the projection light intensity sensor detects the reflected light from the screen in a state where the optical projection unit projects the image.

Preferably, the image projection apparatus further comprises a lamp failure detecting unit for detecting failure of the lamp, wherein the system controlling unit selects the LED mode when the lamp failure detecting unit detects the failure of the lamp.

Advantageously, the image projection apparatus further comprises a lamp light-intensity detecting unit for detecting a reduction in light intensity of illumination light emitted by the lamp, wherein the system controlling unit selects the booster mode when the lamp light-intensity detecting unit detects the reduction in light intensity of illumination light emitted from the lamp, and also controls the LED driving unit so as to offset the reduction in light intensity of illumination light.

Preferably, the image projection apparatus further comprises a power-source monitoring unit for detecting whether or not a power source is supplied to respective components by a battery, wherein the system controlling unit selects the LED mode when the power source monitoring unit detects that the power source is supplied from the battery.

Advantageously, the image projection apparatus further comprises a projection light intensity sensor for detecting the light intensity of respective colors of red (R), green (G) and blue (B) on an image projected by the optical projection unit; and a white-balance calculation setting unit for calculating the white balance on the basis of the light intensity of respective colors detected by the projection light intensity sensor and controlling the intensity of the LED driving unit according to the calculated white balance.

Advantageously, the white-balance calculation setting unit controls the intensity of the LED driving unit so that the respective white balances of the LED mode, the booster mode and the dynamic selection mode are approximately equal.

Preferably, the system controlling unit selects the booster mode immediately after actuation, and selects the lamp mode or the booster mode after a time when the light intensity of illumination light projected from the lamp exceeds a predetermined light intensity from the lamp has elapsed.

Preferably, the image projection apparatus further comprises a lamp shutting-off unit for optically shutting off illumination light emitted by the lamp when the system controlling unit has switched from the lamp mode to the LED mode or from the booster mode to the LED mode.

Preferably, the image projection apparatus further comprises a cooling unit for expelling heat generated by the lamp and the LED light source unit from the apparatus, wherein the cooling unit expels the heat via a first channel capable of easily radiating the heat generated from the lamp when the lamp mode is selected, and expels the heat via a second channel capable of easily radiating heat generated by the LED light source unit when the LED mode is selected.

Preferably, the cooling unit includes a first suctioning pore and a second suctioning pore having an exhaust fan and a shutter function, and in order to radiate heat from the first channel, air is expelled from the apparatus by the exhaust fan in a state where the shutter of the first suctioning pore is opened and the shutter of the second suctioning pore is closed; and in order to radiate heat from the second channel, air is expelled from the apparatus by the exhaust fan in a state where the shutter of the first suctioning pore is closed and the shutter of the second suctioning pore is opened.

Preferably, the image projection apparatus further comprises a selection mode displaying unit for displaying a mode selected by the system controlling unit so as to be recognized by an observer.

Preferably, the third aspect of the invention relates to an image projection apparatus for projecting an image according to image information to be input. The image projection apparatus comprises a light source apparatus in which illumination light emitted by an LED light source unit and illumination light passed through a color filter of a color wheel have two types of red (R), green (G) and blue (B) that are different in central wavelength, respectively; a spatial modulation element to be modulated according to the image information to be input; an illuminating optical unit for guiding illumination light emitted from the optical synthesis unit and illuminating the spatial modulation element; an optical projection unit for projecting the image created by the illuminating optical unit and modulated by the spatial modulation element; and a color adjusting unit for adjusting a central wavelength for each color of red (R), green (G) and blue (B) of the image projected by the optical projection unit to adjust illumination light intensity of respective colors of red (R), green (G) and blue (B) emitted by the LED light source unit.

The fourth aspect of the invention is related to a light source apparatus which comprises a lamp emitting white illumination light; a color wheel for rotating color filters of a plurality of colors and sequentially switching the color filters on which illumination light emitted by the lamp is incident; a wheel driving unit for rotating and driving the color wheels and also controlling the rotation; an LED light source unit for emitting at least one color of illumination light; an LED driving unit for driving the LED light source unit and also controlling the emitted illumination light; a selective reflection unit for selecting and reflecting either illumination light passed through the color filter of the color wheel or illumination light emitted by the LED light source unit; and a system controlling unit for controlling the wheel driving unit and the LED driving unit so that each illumination light to be selected by the selective reflection unit is the same in color.

Preferably, the selective reflection unit is a DMD (digital micro-mirror device).

The fifth aspect of the invention is related to an image projection apparatus for projecting an image according to image information to be input so as to be observed by an observer. The image projection apparatus comprises a light source apparatus set forth in the fourth aspect of the invention; a spatial modulation element to be modulated according to the image information to be input; an illuminating optical unit for guiding illumination light reflected by the selective reflection unit and illuminating the spatial modulation element; and an optical projection unit for projecting the image illuminated by the illuminating optical unit and modulated by the spatial modulation element.

Preferably, the system controlling unit can select one mode from at least two modes among three modes of lamp mode, LED mode and dynamic selection mode as a condition where the illuminating optical unit illuminates the spatial modulation element, and controls the wheel driving unit and the LED driving unit so that illumination light emitted by the selective reflection unit is only illumination light emitted by the lamp when selecting the lamp mode; only illumination light emitted by the LED light source unit when selecting the LED mode; and illumination light emitted by switching between the lamp mode and the LED mode within one frame of the image information when selecting the dynamic selection mode.

Advantageously, the system controlling unit selects and switches between the lamp mode and the LED mode for each color of illumination light emitted by the selective reflection unit when the dynamic selection mode is selected.

BRIEF DESCRIPTION OF THE DRAWINGS

FIG. 5A is a cross-sectional diagram along arrow of (A-A) of FIG. 5B;

FIG. 25 is a diagram of the lighting sequence when illumination light is emitted from the lamp and the LED light source unit for the image projection apparatus shown in FIG. 13;

DETAILED DESCRIPTION OF THE INVENTION

Next, the first embodiment of the light source apparatus and the image projection apparatus of the invention will be described with reference to FIG. 1 to FIG. 9.

Figure 1:
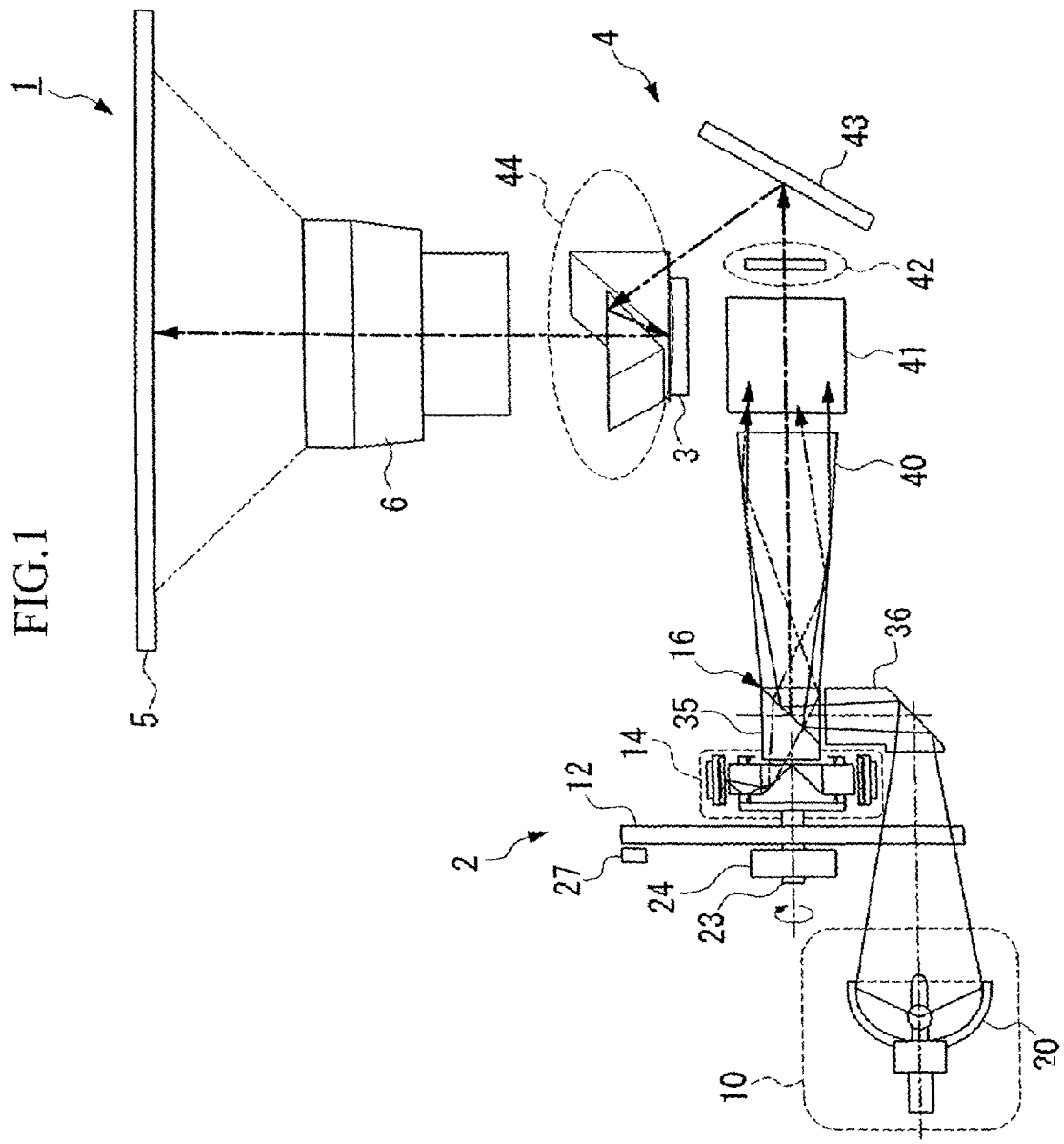
FIG. 1 is an overall view showing the image projection apparatus of the first embodiment according to the present invention.

An image projection apparatus 1 of this embodiment intends to project an image so that an observer can observe the image according to the image information to be input, and, as shown in FIG. 1, comprises a light source apparatus 2, a DMD (Digital Micro-mirror Device; registered trade mark) (spatial modulation element) 3, modulated according to image information to be input, a illuminating optical unit 4 for guiding illumination light emitted from a synthetic prism 16 (an optical synthesis unit) of the light source apparatus 2 to be described later and illuminating the DMD 3 and a projection lens (optical projection unit) 6 for projecting on the screen 5 an image projected by the illuminating optical unit 4 and modulated by the DMD 3.

Figure 2:
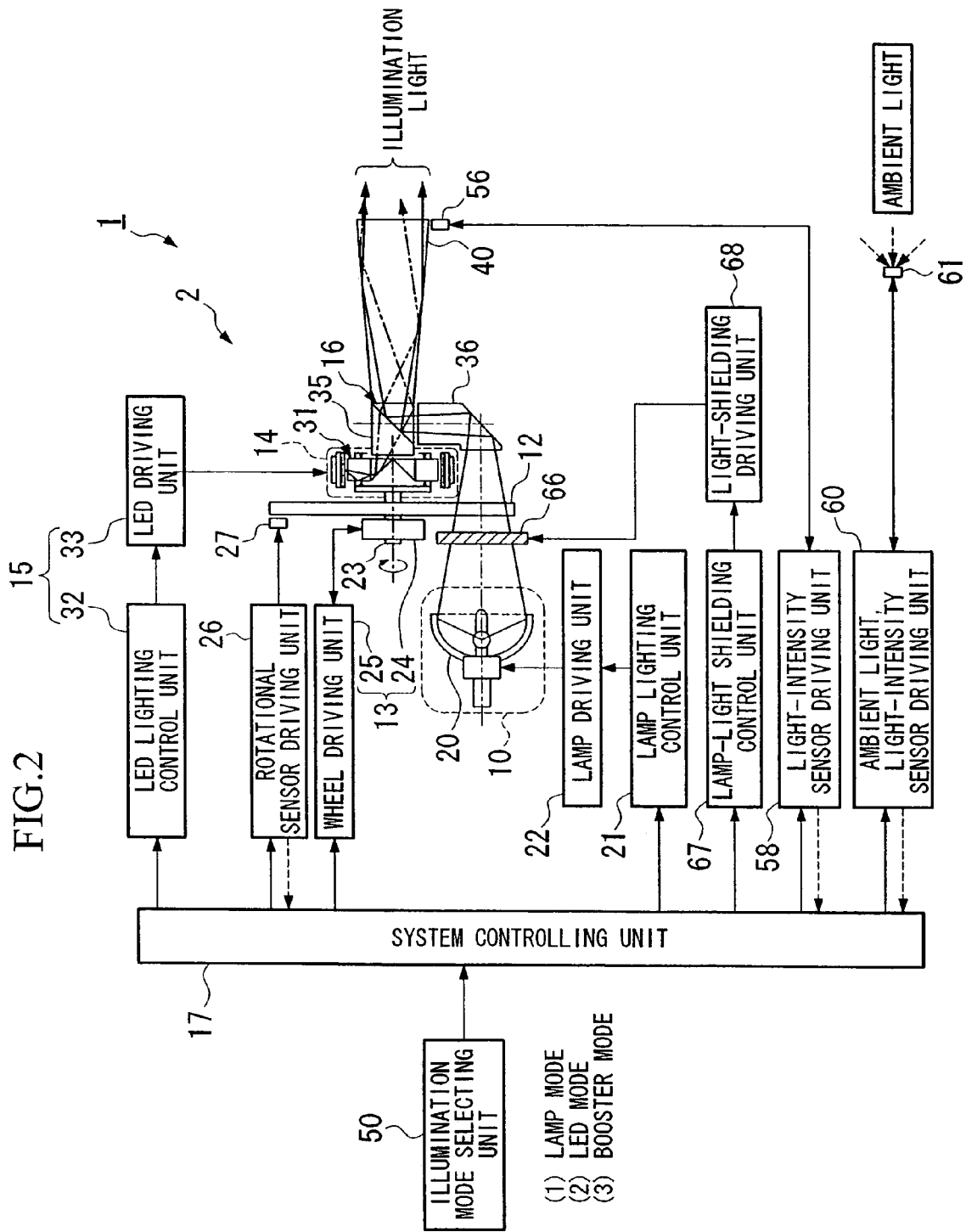
FIG. 2 is an overall view of the optical apparatus of the first embodiment according to the present invention, which is a component of the image projection apparatus shown in FIG. 1.

As shown in FIG. 2, the above light source apparatus 2 comprises a lamp 10 emitting white illumination light, a color wheel 12 which rotates a color filter 11 having plural colors and sequentially switches the color filter 11 on which illumination light emitted from the lamp 10 is made incident, a wheel driving unit 13 which rotates and drives the color wheel 12 and also controls the rotation, an LED light source unit 14 emitting at least one color of illumination light, an LED driving unit 15 which drives the LED light source unit 14 and also controls illumination light to be emitted, a synthetic prism 16 capable of optically synthesizing and emitting illumination light which passed via the color filter 11 of the color wheel 12 and illumination light emitted from the LED light source unit 14, and a system controlling part 17 (system controlling unit) controlling the wheel driving unit 13 and the LED optical unit so that each illumination light synthesized by the synthetic prism 16 can be rendered the same in color.

The above lamp 10 is surrounded by a lamp reflector 20 and designed to emit white illumination light in one direction (right side with respect to the paper). Further, the lamp 10 is designed to light up by a lamp driving unit 22 controlled by a lamp lighting control unit 21. The lamp lighting control unit 21 is designed to be controlled by the above-described system controlling part 17.

Figure 3:
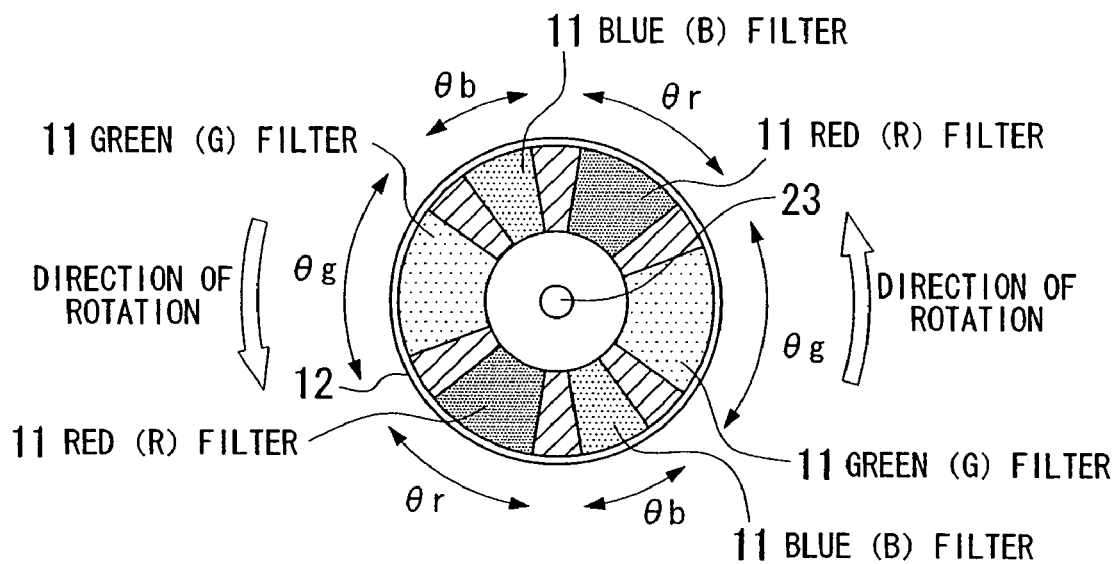
FIG. 3 is a front view of the color wheel of the optical apparatus shown in FIG. 2.

As shown in FIG. 2 and FIG. 3, the above-described color wheel 12 is arranged in the emitting direction of illumination light emitted from the lamp 10 and provided in a circular form around the center of a rotational axis 23. The color wheel 12 is provided with two color filters 11 consisting of red (R), green (G) and blue (B). The color filters 11 are arrayed in the order of red (R), green (G) and blue (B) opposite to the rotational direction of the color wheel 12. The color filters 11 of FIG. 3 correspond to the color wheel 12 of FIG. 2, and are drawn as a side view.

In this embodiment, the green color filter 11 ($\theta g$) is the largest in proportion, followed by red ($\theta r$) and blue ($\theta b$). A black light-shielding area (shaded area in FIG. 3) for optically shielding illumination light from the lamp 10 is provided between the color filters 11 adjacent to each other (border).

The wheel driving unit 13 is, as shown in FIG. 2, connected to the bottom end of the rotational axis 23, and provided with a motor 24 rotating and driving the color wheel 12 via the rotational axis 23 and with a wheel driving unit 25 controlling the motor 24. Further, the wheel driving unit 25 is designed to be controlled by the system controlling part 17.

The color wheel 12 is determined for the rotation number by a rotating sensor 27, the action of which is controlled by a rotating sensor driving unit 26. The thus determined rotation number is sent via the rotating sensor driving unit 26 to the system controlling part 17. The system controlling part 17 controls the wheel driving unit 25 so that the color wheel 12 rotates at a determined rotation number on the basis of the rotation number which was sent.

As shown in FIG. 2, FIG. 4 and FIGS. 5A AND 5B, the LED light source unit 14 is provided with plural LED elements 30 emitting at least 2 colors of illumination light and a light guide unit 31 guiding to the synthetic prism 16 illumination light emitted from said plural LED elements 30. The LED driving unit 15 drives the plural LED elements 30 so as to light sequentially in chronological order and also controls the light guide unit 31 so as to relatively move in relation to the plural LED elements 30 in synchronization with lighting timing of the plural LED elements 30.

The plural LED elements 30 are each made up of an LED package 30a and an LED light emitting chip 30b and arrayed on a circumference to emit illumination light toward the center of the circumference.

The plural LED elements 30 of this embodiment are designed to emit illumination light of the color number equal to that which passed via the color filter 11 of the color wheel 12, namely, illumination light consisting of red (R), green (G) and blue (B).

The colors are arrayed opposite to the rotating direction of the rotational axis 23, or toward the rotating direction of the color wheel 12 and in the order of red (R), green (G) and blue (B). To be more specific, the color order of the color filter 11 opposite to the rotating direction of the color wheel 12 is the same as the color order of illumination light emitted by the LED elements 30 in the moving direction of the light guide unit 31.

Further, the LED elements 30 are the same in proportion of each color with the color filter 11, namely, green ($\theta g$) is the largest in proportion, followed by red ($\theta r$) and blue ($\theta b$). A certain space is provided between respective color LED elements 30 (border) or LED elements are provided, which will not turn on.

As shown in FIG. 2, these LED elements 30 are designed to turn on various colors by using an LED driving unit 33 which is controlled by an LED lighting control unit 32. Further, the LED lighting control unit 32 is designed to be controlled by the system controlling part 17. The LED driving unit 15 is constituted by the LED lighting control unit 32 and the LED driving unit 33.

Figure 5B:
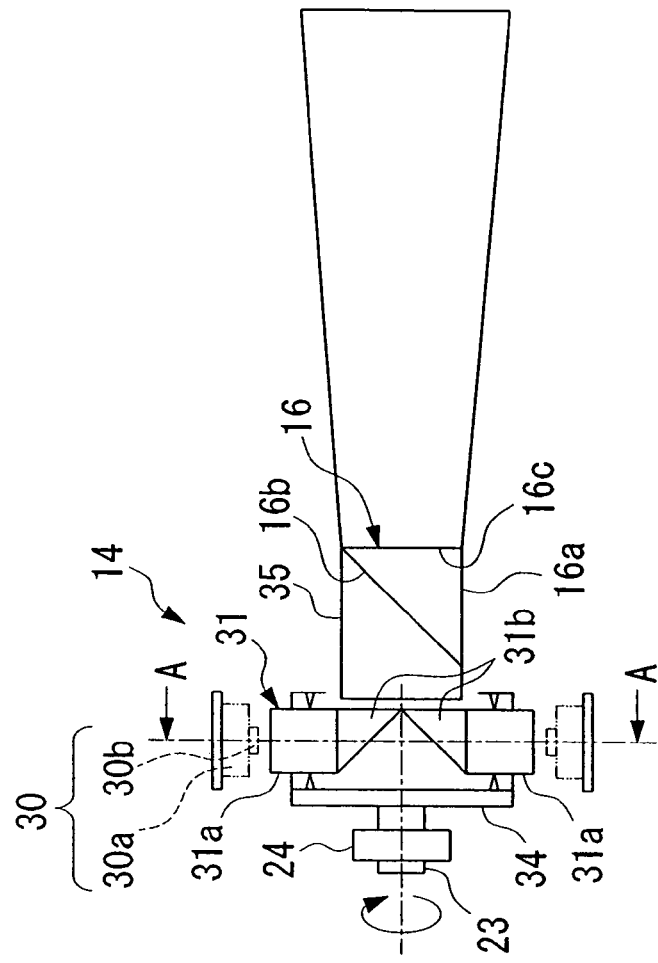
FIGS. 5A and 5B are a structural drawing of the light guide unit, plural LED elements and an area in the vicinity of the synthetic prism shown in FIG. 2.
Figure 5A:
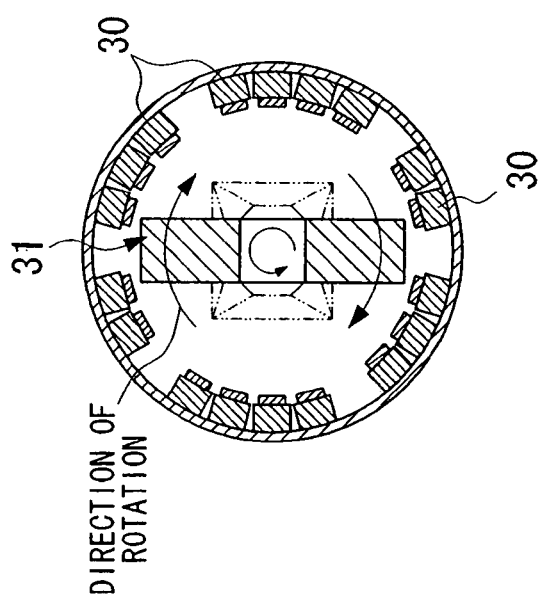

As shown in FIG. 2 and FIGS. 5A and 5B, the light guide unit 31 is constituted, in a shape of a square pole, by two parallel rods 31a on which illumination light is made incident from both ends and two prisms 31b whereby the direction of illumination light incident from the parallel rod 31a is changed by 90 degrees toward the axial line of the rotational axis 23.

Further, the light guide unit 31 is designed to move rotationally (rotate) about the center of the circumference of the plural LED elements 30. To be more specific, the rotational axis 23 connected to the motor 24 is connected to a rod supporting unit 34 at a position adjacent to the color wheel 12, after passage via the color wheel 12, and the light guide unit 31 is fixed to the rod supporting unit 34. Namely, the LED light source unit 14 allows the light guide unit 31 to move rotationally by utilizing the rotating and driving force of the motor 24.

The light guide unit 31 takes into the parallel rod 31a the illumination light emitted by the LED elements 30 from both ends in the order of red (R), green (G) and blue (B) via the rotational movement, and also emits the illumination light toward the axial line of the rotational axis 23 after the angle is changed by the prisms 31b.

The rotation number per unit time of the color wheel 12 driven by the wheel driving unit 13 is designed to be equal to that of the light guide unit 31 rotated by the LED driving unit 15. More particularly, the system controlling part 17 controls the wheel driving unit 25 and the LED lighting control unit 32 so that the rotation number per unit time of the color wheel 12 is equal to that of the light guide unit 31.

As shown in FIG. 2 and FIGS. 5A and 5B, the synthetic prism 16 is provided with a first plane 16a on which illumination light that passed via the color filter 11 of the color wheel 12 is made incident, a second plane 16b on which illumination light emitted from the LED light source unit 14 is made incident, and a third plane 16c on which illumination light that was made incident at least from the first plane 16a and the second plane 16b is emitted.

Further, the synthetic prisms 16 are arrayed via a light pipe 35 so that the second plane 16b is adjacent to two prisms 31b of the light guide unit 31 at a predetermined interval, and illumination light emitted from the third plane 16c is emitted toward the axial line of the rotational axis 23. An inner circumference plane of the light pipe 35 is a highly efficient reflection plane for reflecting illumination light and provided with a function for allowing the illumination light emitted from the guide unit 31 to reliably be made incident on the second plane 16b.

Further, light that passed via the color wheel 12 is, as shown in FIG. 2, designed to be made incident on the first plane 16a of the synthetic prism 16, after being guided via a lamp light guiding unit 36 consisting of the prisms and the rods.

Illumination light totally reflected by the second plane 16b among various types of illumination light incident from the first plane 16a and illumination light totally reflected by the first plane 16a among various types of illumination light incident from the second plane 16b are also emitted from the third plane 16c.

As shown in FIG. 1, the projection lens 6 is arrayed in front of a screen 5 at a predetermined interval from the screen 5. Further, the DMD 3 is a semiconductor optical switch having a plurality of movable micro-mirrors (not shown) and arrayed between the projection lens 6 and the light source apparatus 2. The movable micro-mirror is designed to change the angle, according to the ON or OFF state of a power source, and illumination light is turned to the projection lens 6 when the power source is ON. Further, modulation can be effected by controlling the ON or OFF state of the movable micro-mirror according to an image to be input. Thus, controlling the ON or OFF state allows a modulated image illuminated by illumination light to be made incident on the projection lens 6.

The illuminating optical unit 4 is provided with a taper rod 40, a relay lens 41, an illumination system diaphragm 42 and a reflection mirror 43, and a TIR prism 44.

The taper rod 40 is, as shown in FIG. 1 and FIG. 2, arrayed in parallel with the axial line of the rotational axis 23, with one end in contact with the third plane 16c of the synthetic prism 16. According to this structure, illumination light emitted from the third plane 16c proceeds forward, repeating reflection on an inner circumference plane of the taper rod 40, and is emitted from the other end (emitting plane) in an approximately parallel light flux, with the diffusion angle kept low. The relay lens 41, the illumination system diaphragm 42, and the reflection mirror 43 are arrayed in sequence adjacent to the taper rod 40. Light reflected on the reflection mirror 43 is designed to be made incident on the DMD 3 via the TIR prism 44.

The TIR prism 44 consists of two prisms holding an air layer therebetween and has a function for allowing illumination light totally reflected on the reflection mirror 43 to be incident on the DMD 3 by total reflection.

The above-described system controlling part 17 can select one mode from at least two modes among four modes of lamp mode, LED mode, booster mode and dynamic selection mode, as a condition that the illuminating optical unit 4 illuminates the DMD (registered trade mark) 3.

Further, the system controlling part 17 controls illumination light emitted from the synthetic prism 16 so that the light can be only illumination light emitted from the lamp 10 when the lamp mode is selected, only illumination light emitted from the LED light source unit 14 when the LED mode is selected, only illumination light emitted from the lamp 10 and that emitted from the LED light source unit 14, each of which is at least a single color of illumination light when the booster mode is selected, and illumination light emitted by switching the lamp mode and the LED mode within one frame period of the image information when the dynamic selection mode is selected. This will be described in detail later.

Figure 6:
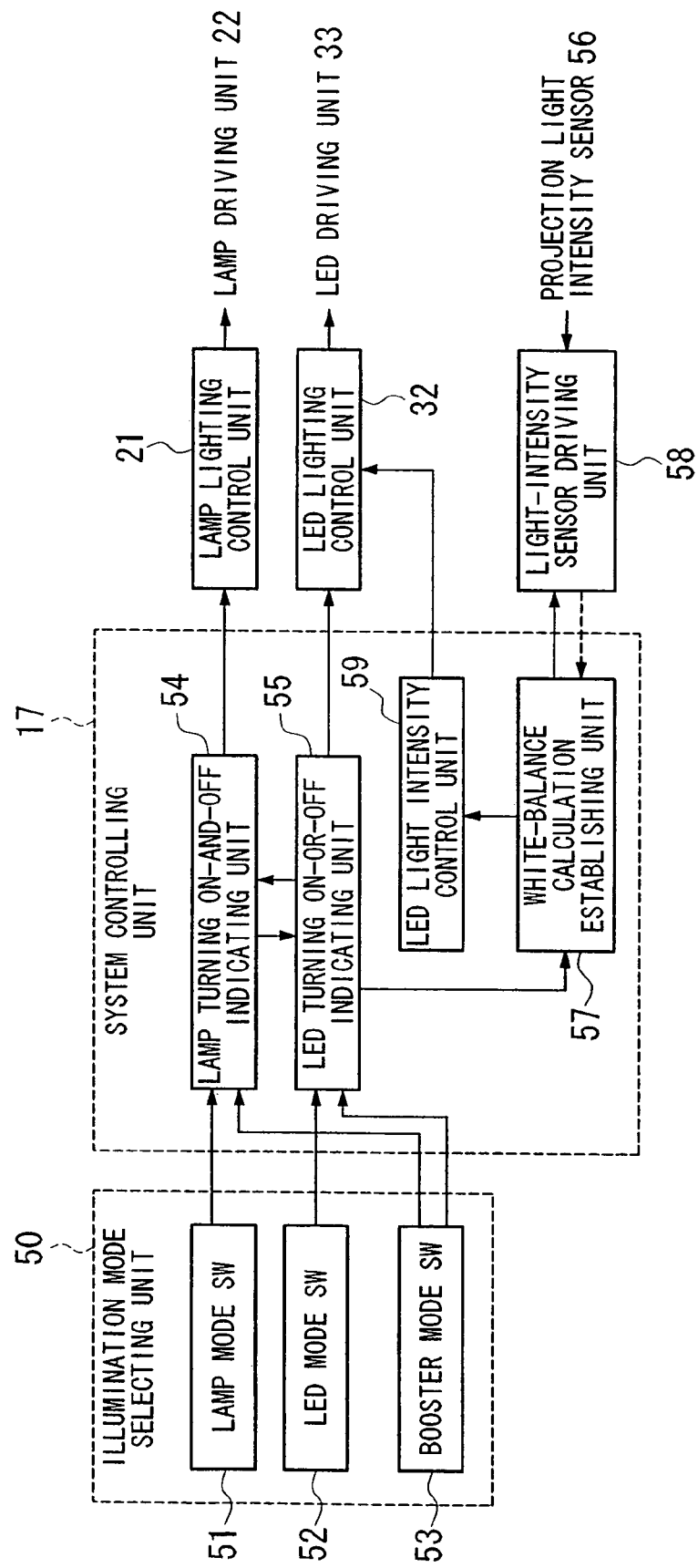
FIG. 6 is a block diagram showing the relationship between the illumination-mode selecting unit and the system controlling unit of the image projection apparatus shown in FIG. 1.

In this embodiment, as shown in FIG. 2 and FIG. 6, one mode can be selected from three modes of lamp mode, LED mode and booster mode.

As shown in FIG. 6, the image projection apparatus 1 of this embodiment is provided with an illumination-mode selecting unit 50 which can be operated by an observer and which specifies a mode selected by the system controlling part 17 from the above three modes.

An illumination-mode selecting unit 50 is provided with manual switches of a lamp mode SW 51, an LED mode SW 52 and a booster mode SW 53 which can select the respective three modes.

Further, the system controlling part 17 is provided with a lamp turning on-and-off indicating unit 54 and an LED turning on-and-off indicating unit 55, and is designed to control the lamp lighting control unit 21 and the LED lighting control unit 32 according to the mode selected by each of the switches SW 51, SW 52 and SW 53. This will also be described in detail later.

As shown in FIG. 2 and FIG. 6, the image projection apparatus 1 of this embodiment is also provided with a projection light intensity sensor 56 for sensing light intensity of each color of red (R), green (G) or blue (B) of an image projected by the projection lens 6, and a white-balance calculation setting unit 57 (white-balance calculation setting unit) for calculating white balance according to the light intensity of each color detected by the projection light intensity sensor 56 and adjusting the controlled variable of the LED driving unit 15 according to the calculated white balance.

The projection light intensity sensor 56 is arrayed on the other end of the emitting plane of the taper rod 40, and is controlled for the actuation by a light-intensity sensor driving unit 58. The light-intensity sensor driving unit 58 is controlled for the actuation by the white-balance calculation setting unit 57.

In addition, the white-balance calculation setting unit 57 is designed to adjust the controlled variable of the LED driving unit 15 so as to make white balance in the LED mode approximately equal to that in the booster mode (or the dynamic selection mode). To be more specific, the white-balance calculation setting unit 57 is designed to control the LED lighting control unit 32 by the LED light intensity control unit 59 mounted on the system controlling part 17.

Figure 7:
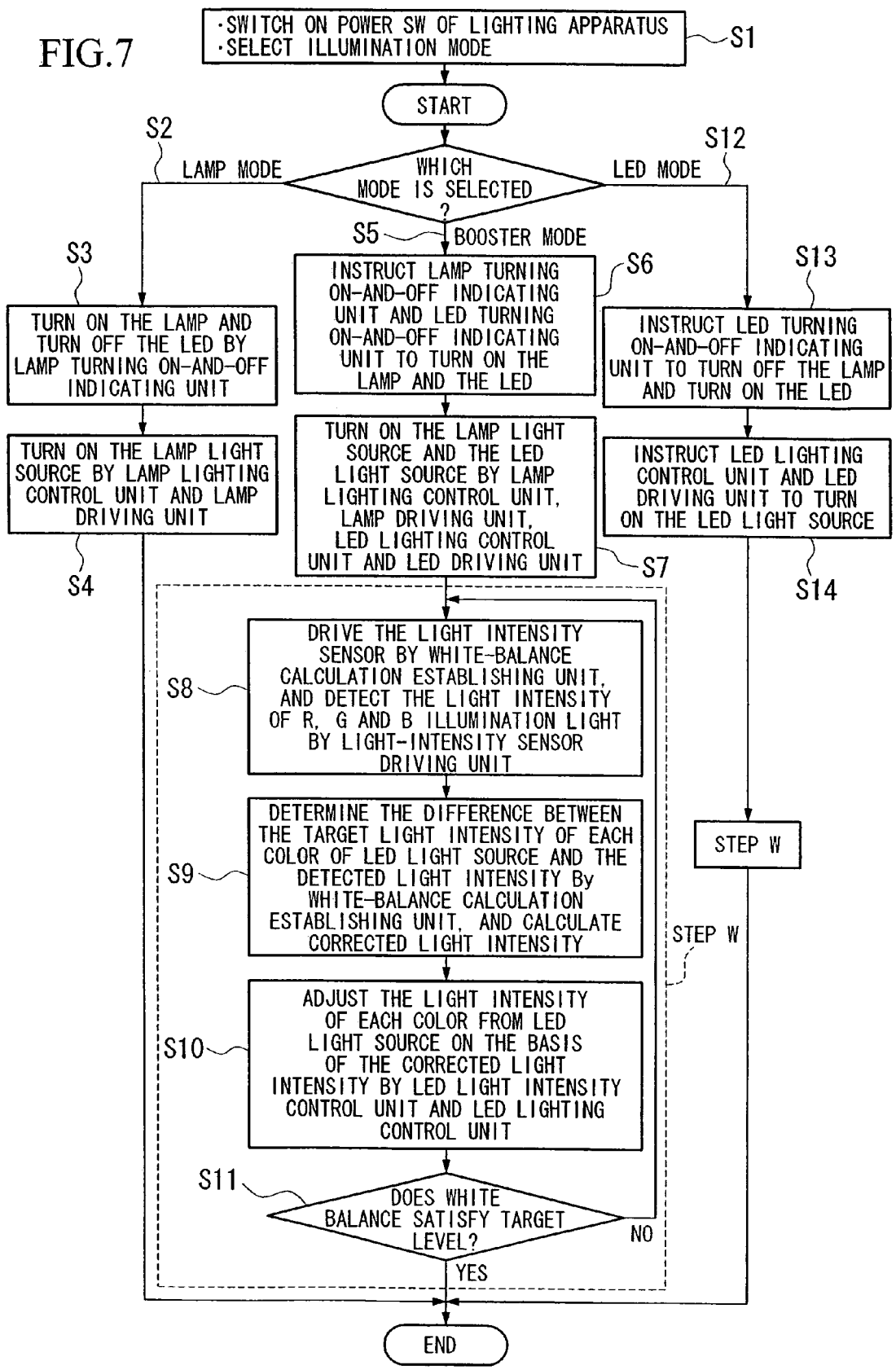
FIG. 7 is a flowchart used when a projected image is observed using the image projection apparatus shown in FIG. 1.

A case where an image is projected on the screen 5 by the thus structured image projection apparatus 1 and the light source apparatus 2 will be described with reference to FIG. 7 and FIG. 8.

Figure 8:
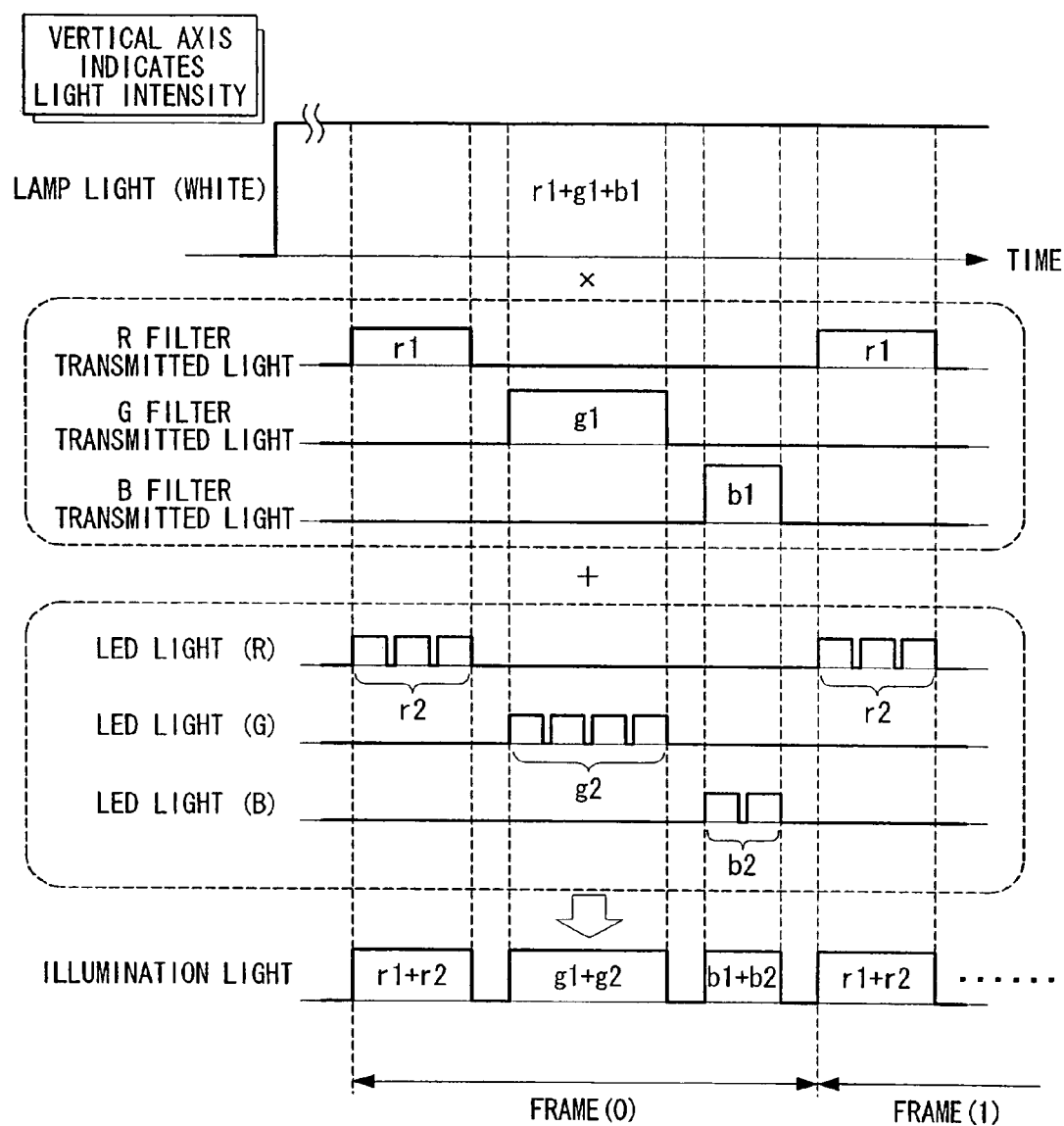
FIG. 8 is a diagram showing the lighting sequence when illumination light is emitted from the lamp and the LED light source unit for the image projection apparatus shown in FIG. 1.

The symbols given in FIG. 8, of r1, g1, b1, r2, g2 and b2, indicate the light intensity of each color (lighting strength ×lighting time).

First, an observer, after each power source is turned on in the image projection apparatus 1, will select a desired mode (S1) by using the illumination-mode selecting unit 50 to start projection of an image.

Where the observer turns on the lamp mode SW 51 and selects the lamp mode (S2), as shown in FIG. 6, a signal is input from the lamp mode SW 51 to the lamp turning on-and-off indicating unit 54 of the system controlling part 17. On receipt of the signal, the lamp turning on-and-off indicating unit 54 instructs the lamp lighting control unit 21 to turn on the lamp 10, and also instructs the LED turning on-and-off indicating unit 55 to turn off the LED (S3), whereby the lamp lighting control unit 21 actuates the lamp driving unit 22 to turn on the lamp 10 (S4). Further, the LED turning on-and-off indicating unit 55 sends instructions to the LED lighting control unit 32 so as not to actuate the LED driving unit 33.

After the power source is turned on, the system controlling part 17 sends instructions to the wheel driving unit 25 to drive the wheel motor 24, thereby rotating the rotational axis 23, whereby the color wheel 12 is rotated in the direction shown in FIG. 3. Further, the system controlling part 17 also sends instructions to the rotating sensor driving unit 26 to operate the rotating sensor 27 to detect the rotation number of the color wheel 12. Then, the system controlling part 17 sends instructions to the wheel driving unit 25 so as to rotate the color wheel 12 at a predetermined rotation number on the basis of the rotation number sent from the rotating sensor 27. In this instance, the light guide unit 31 is also rotated, at the same time as the rotation of the color wheel 12.

As shown in FIG. 2, illumination light emitted from the lamp 10 according to the above instructions is made incident on the color filter 11 of the color wheel 12, after being emitted from the lamp reflector 20 in one direction (the right side with respect to the page in FIG. 2). In this instance, since the color filter 11 is switched in turn in the order of red (R), green (G) and blue (B) at a position on which the illumination light is incident, the illumination light is emitted in this color order.

Then, illumination light that passed through the color filter 11 is incident on the first plane 16a of the synthetic prism 16 by guidance of the lamp light guiding unit 36, and is emitted from the third plane 16c directly or after total reflection by the second plane 16b.

Illumination light emitted from the third plane 16c is incident from one end of the taper rod 40, repeating reflection therein, and is emitted from the other end as an approximately parallel light. Then, the illumination light is, as shown in FIG. 1, relayed by the relay lens 41, and then is narrowed down by the illumination system diaphragm 42 to a predetermined width of illumination light to be reflected by the reflection mirror 43. The reflected illumination light is incident on the TIR prism 44, repeating total reflection, and then is incident on the DMD 3.

In this instance, the DMD 3 is modulated according to an image to be input, allowing illumination light to be made incident on the projection lens 6, whenever necessary, by controlling the movable micro-mirror to be ON or OFF according to the color concerned and changing the angle, whereby an optimal image is made incident on the projection lens 6. Then, the image is projected on the screen 5 by the projection lens 6.

Since an image projected by selecting the lamp mode is illumination light emitted from the lamp 10, the observer can observe a projected image of high intensity light. In particular, the color wheel 12 consists of three primary colors of red (R), green (G) and blue (B), and an observer can observe the projected image for all the colors at a sufficient brightness (luminance).

Next, where the observer turns on the booster mode SW 53 to select the booster mode (S5) after the step S1, as shown in FIG. 6, a signal is input from the booster mode SW 53 to the lamp turning on-and-off indicating unit 54 and the LED turning on-and-off indicating unit 55 of the system controlling part 17. On receipt of this signal, the lamp turning on-and-off indicating unit 54 and the LED turning on-and-off indicating unit 55 instruct the lamp lighting control unit 21 and the LED lighting control unit 32 to turn on the lamp 10 and the LED elements 30. Then, the lamp lighting control unit 21 actuates the lamp driving unit 22 to turn on the lamp 10, and also the LED lighting control unit 32 actuates the LED driving unit 33 to turn on the LED (S7)

Figure 4:
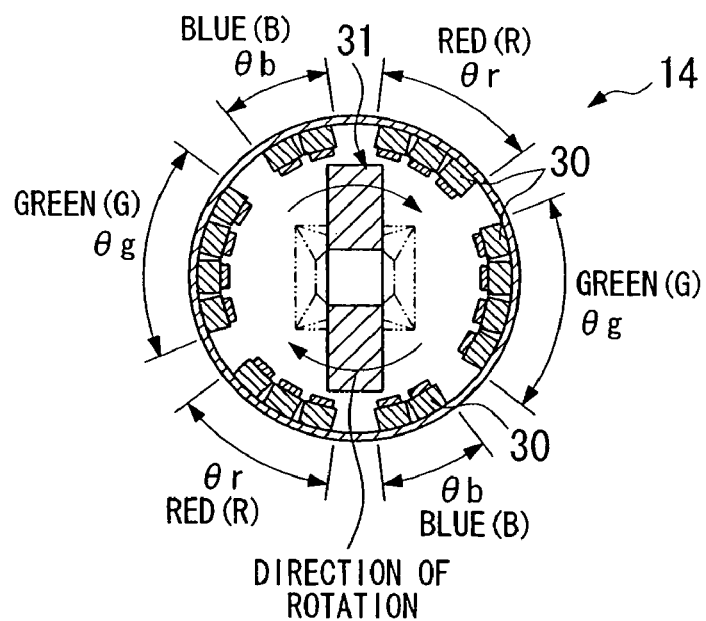
FIG. 4 is a drawing of the light guide unit and plural LED elements shown in FIG. 2, which is viewed from the synthetic prism.

Further, the system controlling part 17 sends instructions to the wheel driving unit 25 to drive the wheel motor 24 to rotate the rotational axis 23 and the color wheel 12. In this instance, as described above, the system controlling part 17 rotates the color wheel 12 at a predetermined rotation number on the basis of the rotation number sent from the rotating sensor 27. The rod supporting unit 34 connected to the one end of the rotational axis 23 is also rotated, together with the rotation of the color wheel 12, whereby, as shown in FIG. 4 and FIGS. 5A and 5B, the light guide unit 31 moves rotationally (rotates) about the center of the rotational axis 23. In this embodiment, since the color wheel 12 and the light guide unit 31 are connected to the same rotational axis 23, the rotation number per unit time of the color wheel 12 equals that of the light guide unit 31.

Here, as shown in FIG. 8, the illumination light emitted from the lamp 10 according to the above instructions is incident on the color filter 11, as the above-described lamp mode, and also is emitted in the order of red (R), green (G) and blue (B). Then, illumination light that passed through the color filter 11 is incident on the first plane 16a of the synthetic prism 16 being guided by the lamp light guiding unit 36.

As shown in FIG. 4 and FIGS. 5A and 5B, the LED lighting control unit 32 controls the LED driving unit 33 so as to turn on the LED elements 30 in the order of red (R), green (G) and blue (B) or in chronological order in association with rotational movement (rotation) of the light guide unit 31. In other words, the LED elements 30 located at both ends of a parallel rod 31a are turned on in turn in association with the rotation number of the light guide unit 31.

Therefore, as shown in FIG. 8, the light guide unit 31 can reliably take in illumination light emitted from the LED elements 30 from both ends of the parallel rod 31a in the order of red (R), green (G) and blue (B). As shown in FIGS. 5A and 5B, illumination light incident from both the ends of the parallel rod 31a is incident on the second plane 16b of the synthetic prism 16 after the direction is changed by the prism 31b.

In this instance, since the rotation number of the color wheel 12 is the same as that of the light guide unit 31 and also the same in color order, as shown in FIG. 8, illumination light which is incident on the second plane 16b of the synthetic prism 16 from the LED elements 30 and illumination light which is incident on the first plane 16a of the synthetic prism 16 from the above color wheel 12 are the same in color and also enter at the same timing.

These two types of illumination light with the same color are, as shown in FIGS. 5A and 5B, synthesized by the synthetic prism 16 and emitted from the third plane 16c toward the taper rod 40. In this instance, illumination light incident from the first plane 16a is emitted from the third plane 16c directly or after total reflection by the second plane 16b, and illumination light incident from the second plane 16b is also emitted from the third plane 16c directly or after total reflection by the first plane 16a. As described above, each illumination light is effectively synthesized by the synthetic prism 16 and emitted from the third plane 16c.

Illumination light after synthesis incident on the taper rod 40 is guided by the illuminating optical unit 4, the same as in the lamp mode, lighting up the DMD 3. Then, it is utilized as light for creating a projected image by the projection lens 6.

As shown in FIG. 8, since an image projected by selecting the booster mode is illumination light acquired by synthesizing illumination light emitted from the lamp 10 and that emitted from the light source unit 14, an observer can observe a projected image which is sufficient in brightness (luminance) of all colors with a large light intensity and excels in color rendering properties. Accordingly, the observer can observe the projected image clearly. Further, as shown in FIG. 8, one frame (about 1/120 seconds) is composed of red (R), green (G) and blue (B).

In particular, the image projection apparatus 1 of this embodiment can establish an optimal white balance of the projected image (step W).

To be more specific, the system controlling part 17 sends instructions to the light intensity sensor driving unit 58 to actuate a projection light intensity sensor 56. The projection light intensity sensor 56 detects the light intensity of each color of red (R), green (G) and blue (B) in illumination light emitted from the emitting plane of the taper rod 40 (other end) (S8). The white-balance calculation setting unit 57 determines a difference between target light intensity of each color of the LED elements 30 and the thus detected light intensity on the basis of the light intensity of the thus detected colors, and conducts a necessary calculation for correcting the light intensity (S9). Then, the white-balance calculation setting unit 57 sends a light source controlled variable of each color to an LED light intensity control unit 59 according to the corrected light intensity. The LED light intensity control unit 59 controls the LED lighting control unit 32 according to the thus sent light intensity controlled variable, whereby the LED lighting control unit 32 adjusts the light intensity of each color in illumination light emitted from the LED elements 30 (S10).

The white-balance calculation setting unit 57 judges whether white balance reaches a target level or not (S11) on the basis of the light intensity of each color after adjustment which is sent from the projection light intensity sensor to adjust it until the target level is reached.

The step makes it possible to set illumination light after synthesis to the optimal white balance; therefore, an observer can observe a projected image at an optimal color balance.

Next, where an observer turns on the LED mode SW 52 to select the LED mode (S12) after the above SI, a signal is input, as shown in FIG. 6, from the LED mode SW52 to the LED turning on-and-off indicating unit 55 of the system controlling part 17. On receipt of the signal, the LED turning on-and-off indicating unit 55 sends instructions to the LED lighting control unit 32 to turn on the LEDs, and also sends instructions to the lamp turning on-and-off indicating unit 54 to turn off the lamp 10 (S13). Because of this, the LED lighting control unit 32 actuates the LED driving unit 33 to turn on the LEDs (S14). Further, the lamp turning on-and-off indicating unit 54 sends instructions to the lamp lighting control unit 21 so as not to actuate the lamp driving unit 22.

The LED driving unit 15 also sends instructions to the wheel driving unit 25 to drive the wheel motor 24, thereby rotating the rotational axis 23. According to this, as described above, the color wheel 12 is rotated. The rod supporting unit 34 is rotated by this rotation, and is connected to the rotational axis 23 on which the color wheel 12 is also connected.

Accordingly, as shown in FIG. 4 and FIGS. 5A and 5B, the light guide unit 31 is rotated at the same rotation number as with the color wheel 12.

Further, as shown in FIG. 4 and FIGS. 5A and 5B, the LED lighting control unit 32 controls the LED driving unit 33 so as to turn on the LED elements 30 in the order of red (R), green (G) and blue (B) or in chronological order in association with the rotational movement (rotation) of the light guide unit 31. Because of this, as with the above booster mode, the light guide unit 31 reliably takes into the parallel rod 31a illumination light emitted by the LED elements 30 from both ends in the order of red (R), green (G) and blue (B), and also allows the illumination light to be incident on the second plane 16b of the synthetic prism 16.

Illumination light incident on the synthetic prism 16 is emitted from the third plane 16c, and is incident on the taper rod 40 directly or after total reflection by the first plane 16a. Illumination light incident on the taper rod 40 is guided by the illuminating optical unit 4 and illuminates the DMD 3, as the above lamp mode and the booster mode, which is then used as light for creating a projected image using the projection lens 6.

Further, as in the above booster mode, the LED mode is also adjusted for the white balance of illumination light by the above-described step W. Thus, an observer can observe a projected image excellent in color rendering properties at an optimal color balance.

As described above, according to the light source apparatus 2 of this embodiment, illumination light passed through the color wheel 12 and emitted from the lamp 10 and illumination light emitted from the LED elements 30 are controlled by the system controlling part 17 and synthesized by the synthetic prism 16 in the same color, thereby always providing a highly efficient illumination light which is sufficient in brightness and excellent in color rendering properties.

In particular, in the synthesis of the illumination lights by the synthetic prism 16, illumination light made incident from the first plane 16a and the second plane 16b is not only emitted on the third plane 16c but also emitted from the third plane 16c by utilizing total reflection by the first plane 16a and the second 16b, thereby synthesizing illumination light reliably and effectively.

Further, the plural LED elements 30 are controlled by the LED driving unit 15 to turn on and emit illumination light of three colors, red (R), green (G) and blue (B) sequentially in chronological order, and the light guide unit 31 relatively moves in synchronization with lighting timing of plural LED elements 30. Then, the light guide unit 31 can reliably guide into the synthetic prism 16 the illumination light from the LED elements 30 which are turned on, of the plural LED elements 30, whereby illumination light emitted from the LED elements 30 can be effectively acquired for effective use and guided into the synthetic prism 16 with a small light angle, thereby securing color rendering properties. Since the number of the LED elements 30 is plural, even if some of the LED elements 30 are defective, nondefective LED elements may be utilized. Thus, reliability can be improved.

In addition, since a plurality of the LED elements 30 are arrayed on the circumference, the light guide unit 31 can make a circular movement, thereby acquiring illumination light reliably without interruption.

In addition, since the color wheel 12 is the same in color number as the LED elements 30, the color filter 11 moving opposite to the rotating direction of the color wheel 12 is the same in color order as the LED elements 30 in the moving direction (rotational direction) of the light guide unit 31, and the rotation number per unit time of the color wheel 12 is the same as that of the light guide unit 31, the illumination light from the LED elements 30 and that from the color wheel 12 are incident to the synthetic prism 16 at the same timing and the same color order, and then are synthesized and emitted. Therefore, illumination light can be acquired, which is sufficient in brightness of all three colors and excellent in color rendering properties.

Further, the rotating and driving force of the motor 24 is utilized to drive the color wheel 12 and the light guide unit 31, thereby removing the necessity for providing plural driving unit and also making the structure simpler and smaller.

According to the image projection apparatus 1 of this embodiment, since illumination light sufficient in brightness and excellent in color rendering properties can be used in projecting an image, an observer can observe a projected image clearly.

Since one mode can be selected from the lamp mode, the LED mode and the booster mode, in particular, and illumination light can be changed according to the mode selected, an optimal image information can be projected, for example, according to a mode in which priority is given to brightness or a high color reproduction mode in which priority is given to color rendering properties, thereby improving usability.

In addition, since an observer can specify a mode by using the SW 51, SW 52 and SW 53 of the illumination-mode selecting unit 50 in selecting the mode, an observer can use the apparatus easily and effectively.

Since the white-balance calculation setting unit 57 calculates an optimal white balance on the basis of the light intensity of each color detected by the projection light intensity sensor 56 to adjust the controlled variable of the LED driving unit 15, an observer can observe a projected image at an optimal color balance. In this instance, the white-balance calculation setting unit 57 is adjusted so that the white balance can be approximately equal in each mode. Therefore, the observer can observe a projected image approximately at the same color and color balance regardless of any selected mode, and viewability is improved.

The lamp mode, the LED mode and the booster mode will be described with reference to the color region/chromaticity coordinate system shown in FIG. 9.

Figure 9:
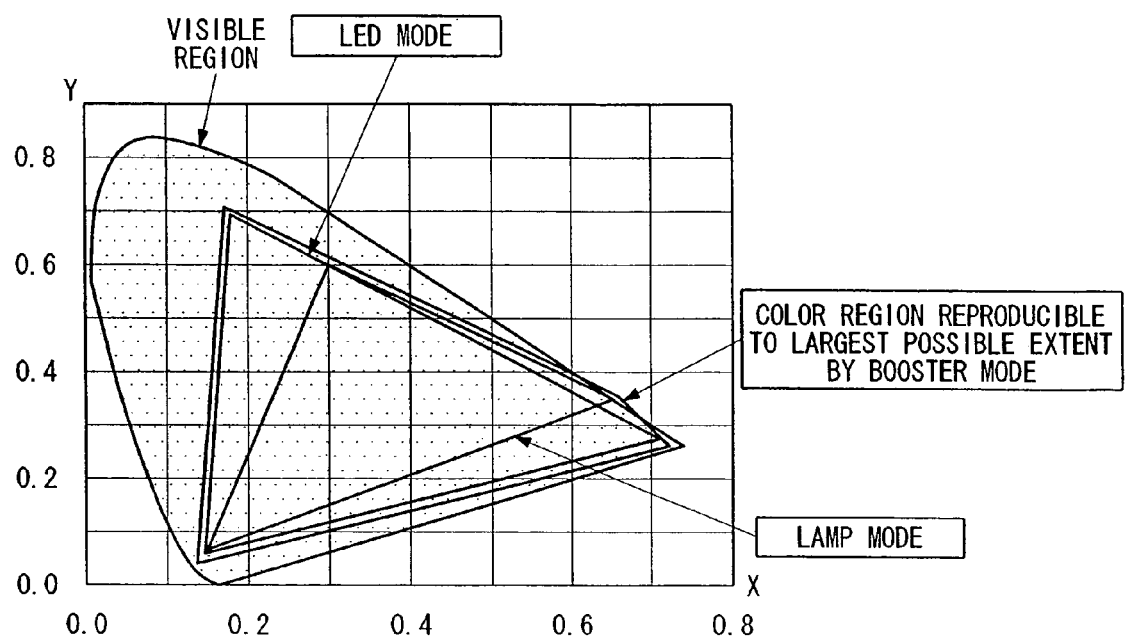
FIG. 9 is a graph showing illumination light emitted by the lamp mode, the LED mode and the booster mode displayed on the chromaticity coordinate system.

As shown in FIG. 9, the lamp mode is relatively narrow in color region, but greater in light intensity. The LED mode is ensured to have a larger proportion of red (R), very large in color region and greater in reproducible region but smaller in light intensity than the lamp mode. Then, the booster mode is provided with a color region similar to both the lamp mode and the LED mode, and can form a bright projected image.

In addition, if the central wavelength of illumination light which passes through a red (R) filter of the color wheel, for example, and that of illumination light (R) emitted from the LED light source deviate, the color shade of red (R) illumination light can be changed by changing the light intensity of the LED light source or the lamp in the booster mode. The thus adjusted region is indicated in FIG. 9 as "color region reproducible to the largest possible extent by the booster mode."

Further, in the above embodiment 1, it is structured so that an observer can select three modes by using the illumination-mode selecting unit 50, but the present invention is not restricted thereto. For example, such a structure may be acceptable that when an ambient light intensity detected is smaller than a predetermined value, the LED mode is automatically selected, and when it is greater than the predetermined value, the booster mode is automatically selected.

Figure 10:
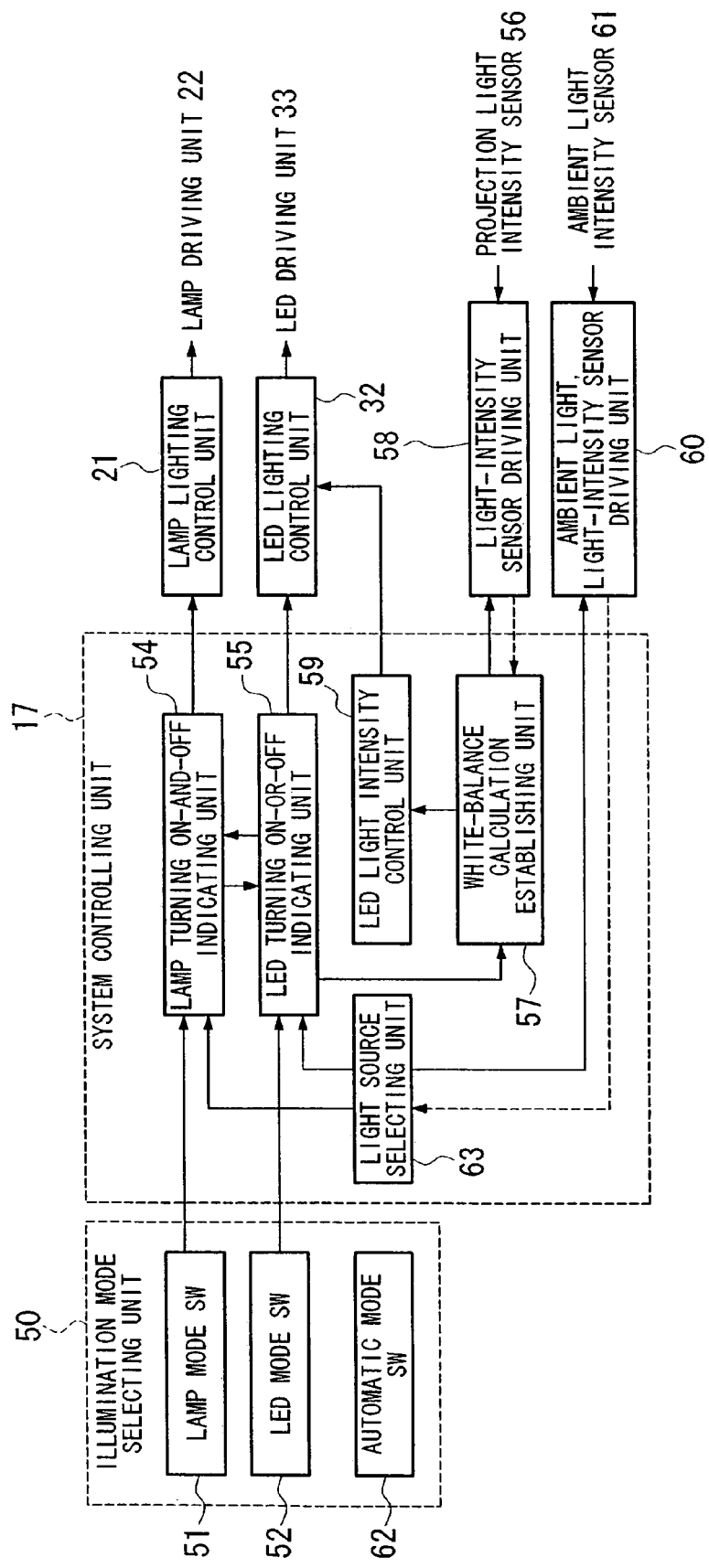
FIG. 10 is a block diagram showing the relationship between the illumination-mode selecting unit and the system controlling unit in a case where the image projection apparatus of the first embodiment is combined with the ambient light intensity sensor and the white-balance calculation establishing unit, and the lamp mode and the LED mode are automatically selected according to the brightness of ambient light.

To be more specific, as shown in FIG. 2 and FIG. 10, the image projection apparatus 1 is provided with an ambient light intensity sensor 61 for detecting the light intensity of ambient light controlled by an ambient light intensity sensor driving unit 60. Further, the illumination-mode selecting unit 50 is provided with an automatic mode SW 62 for automatically switching between the booster mode and the LED mode, and the system controlling part 17 is provided with a light source selecting unit 63 which actuates when the automatic mode SW 62 is selected. A light source selecting unit 63 is designed to control respectively the lamp turning on-and-off indicating unit 54 and the LED turning on-and-off indicating unit 55 on the basis of ambient light detected by the ambient light intensity sensor 61.

Figure 11:
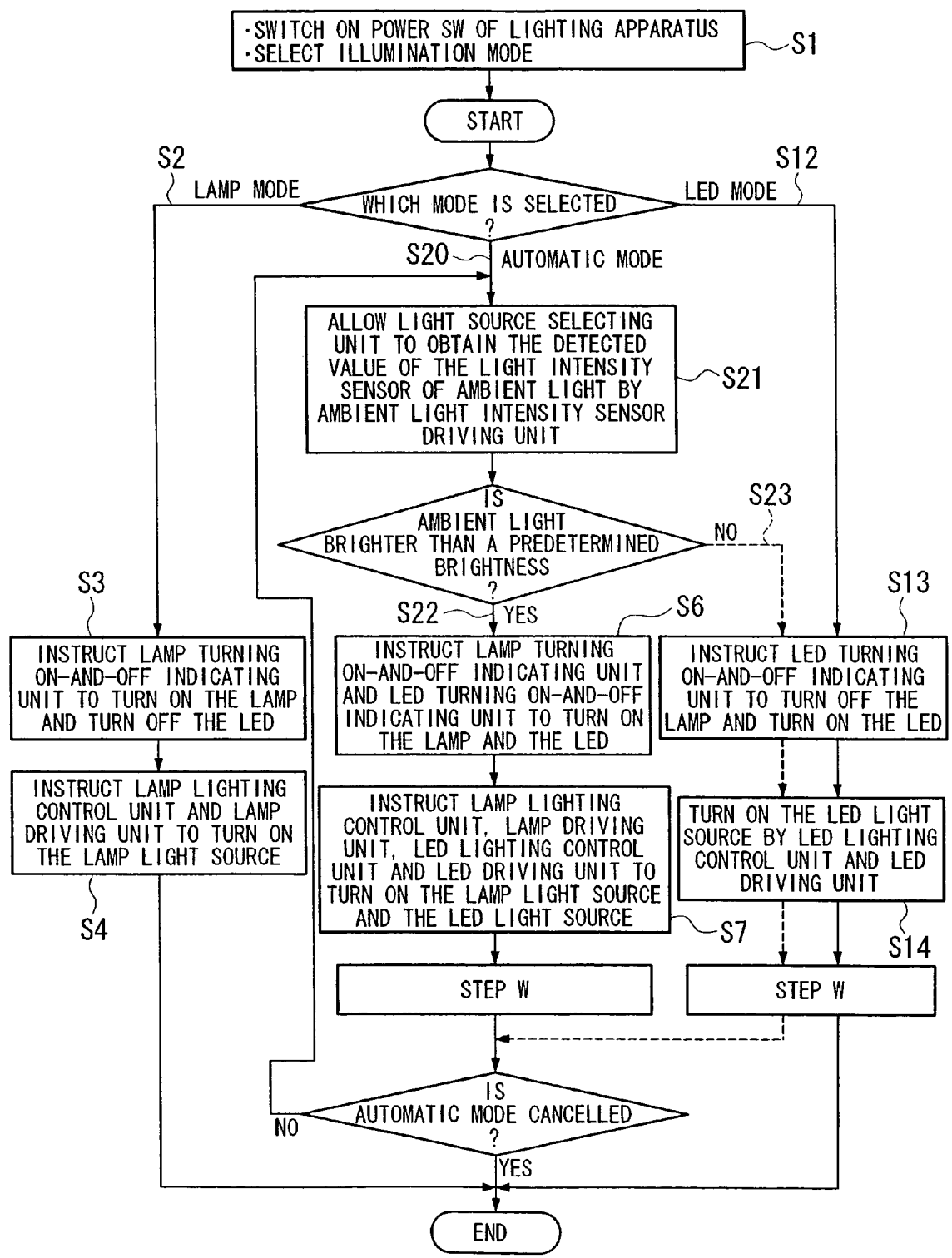
FIG. 11 is a flowchart used when a projected image is observed using the image projection apparatus shown in FIG. 10.

A case where the observer selects an automatic mode SW 62 in the thus structured image projection apparatus 1 will be described with reference to FIG. 11. Where the observer selects the lamp mode or the LED mode, the structure is the same as in the first embodiment.

When the automatic mode SW 62 is selected (S20), the light source selecting unit 63 sends instructions to the ambient light intensity sensor driving unit 60 to actuate the ambient light intensity sensor 61, whereby the ambient light intensity sensor 61 detects the light intensity of ambient light or brightness (S2). The light source selecting unit 63 judges whether or not the detected ambient light has a predetermined brightness. In this instance, the predetermined brightness may be set arbitrarily. For example, the predetermined brightness is meant to be brightness of the ambient light in which a ratio of a projected image by the LED light source unit 14 to the ambient light in an environment is 10:1 or lower.

As a result, where the light source selecting unit 63 judges that the detected ambient light is higher than a predetermined brightness (S22), the booster mode is selected in the above embodiment 1 (S6, S7 and step W). In contrast, where the light source selecting unit 63 judges that the detected ambient light is lower than the predetermined brightness (S23), the LED mode is selected in the above embodiment 1 (S13, S14 and step W).

Further, the light source selecting unit 63 judges and selects the above-described booster mode or the LED mode continually based on the determination result provided from the ambient light intensity sensor 61, unless the automatic mode is cancelled.

According to the image projection apparatus 1, the system controlling part 17 selects a mode and changes the brightness of a projected image according to the light intensity of ambient light detected by the ambient light intensity sensor 61. Therefore, the observer can observe a projected image at an optimal brightness, which is not influenced by ambient brightness.

Further, such a structure may also be acceptable in which when detecting the light intensity of ambient light, the ambient light intensity sensor 61 can detect reflected light from the screen 5 in a state where no image is projected in terms of the light intensity of ambient light. Since the structure can change the brightness of a projected image on the basis of the reflected light from the screen 5 before image projection, it is possible to observe the image on the screen 5 at an optimal brightness.

The above-described automatic mode is structured so as to automatically select the booster mode or the LED mode according to the light intensity of ambient light. However, the automatic mode is not restricted to this structure. For example, as shown in FIG. 12 or FIG. 13, such a structure may be acceptable in which the system controlling part 17 selects one mode, namely the booster mode or the LED mode according to image information to be input.

To be more specific, the system controlling part 17 is provided with an adequate light-intensity setting unit 65 for controlling the LED light intensity control unit 59 on the basis of the image to be input. The adequate light-intensity setting unit 65 selects the LED mode when a ratio of the pixels exceeding a predetermined gradation threshold to the whole is smaller than a predetermined ratio, and selects the booster mode when it is greater than the predetermined ratio, in gradation distribution of the pixels of the image data to be input (image information to be input). This will be described below in detail.

Figure 12:
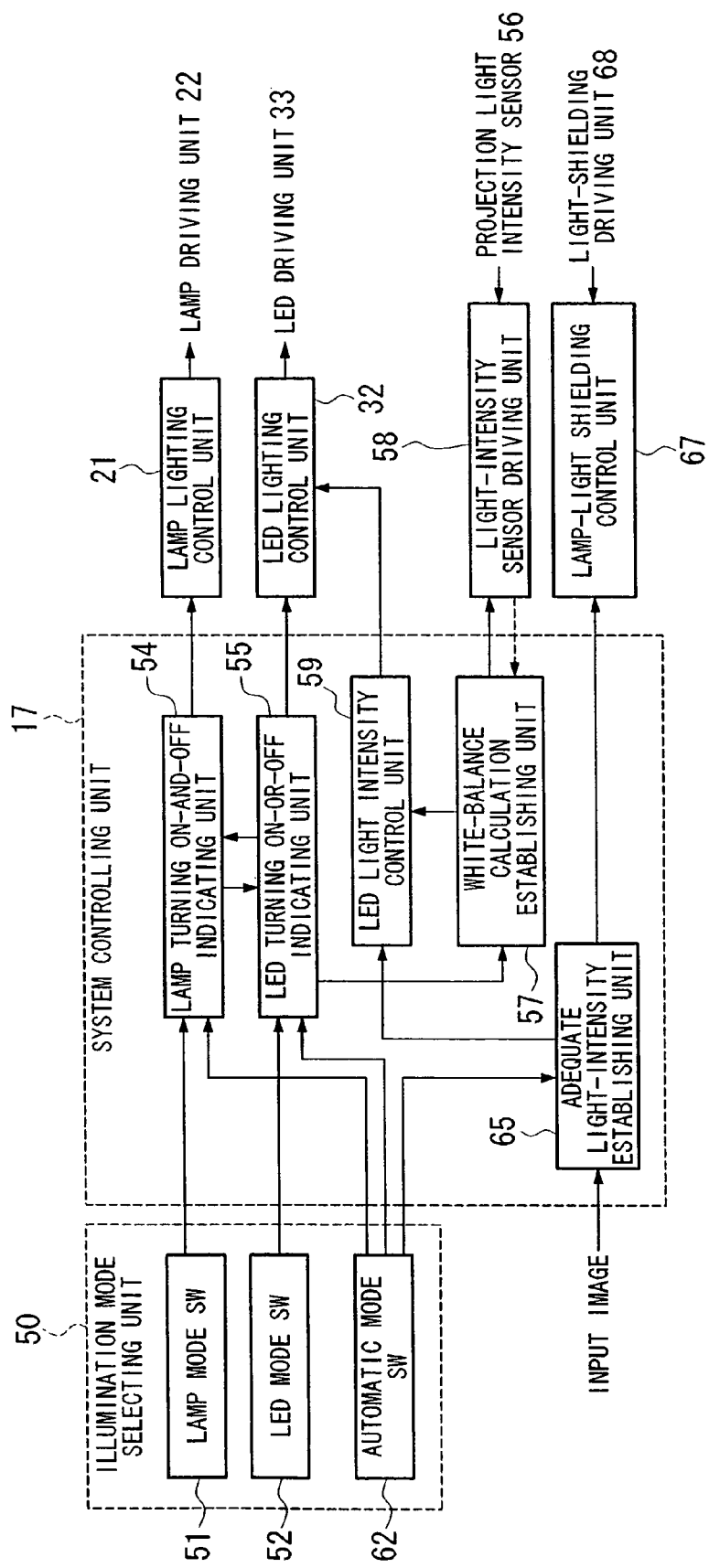
FIG. 12 is a block diagram showing the relationship between the illumination-mode selecting unit and the system controlling unit in a case where the image projection apparatus of the first embodiment is combined with the lamp-light shielding control unit, the white-balance calculation establishing unit and the adequate light-intensity establishing unit, and the lamp mode and the LED mode are automatically selected according to the brightness of an input image.
Figure 13:
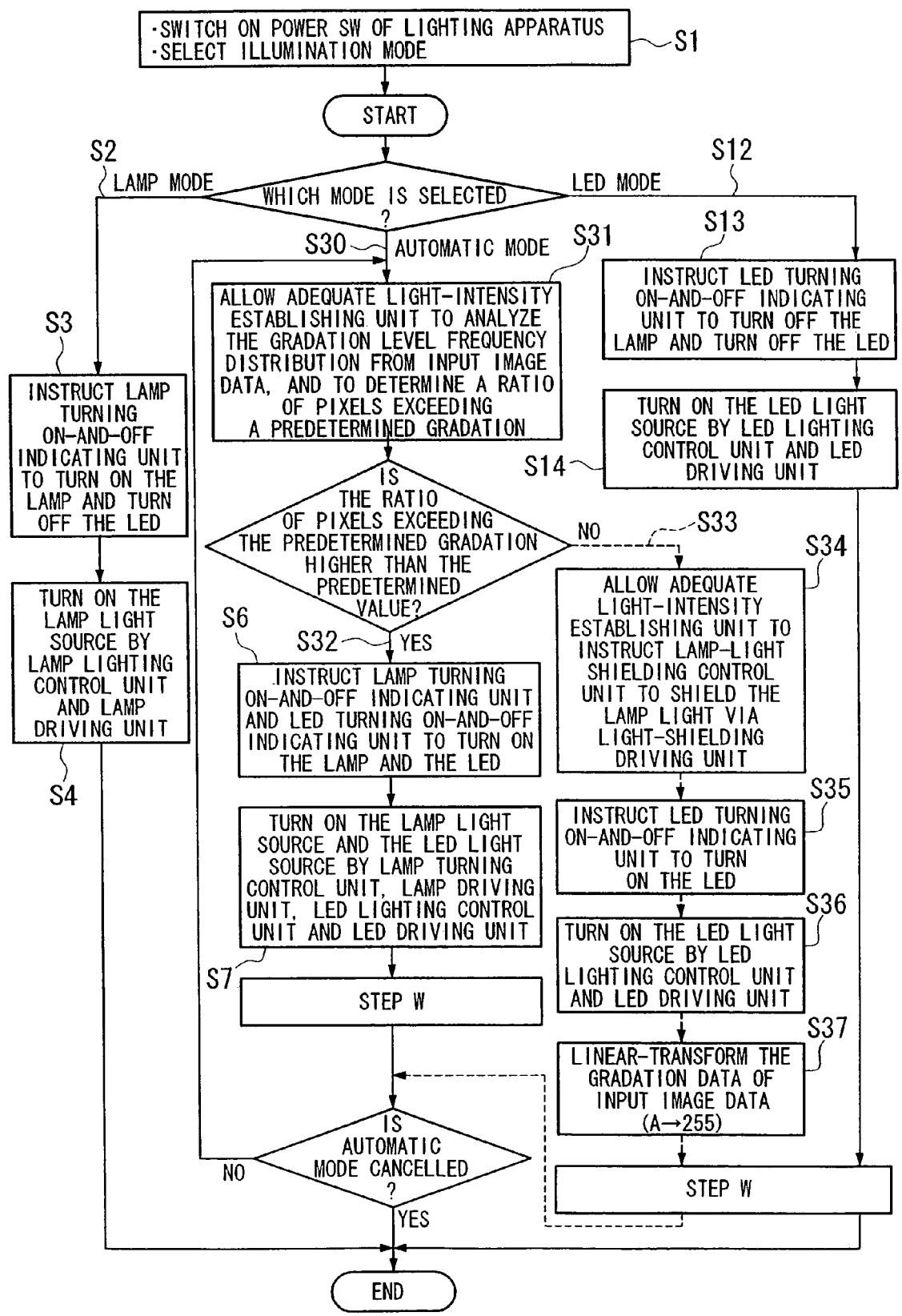
FIG. 13 is a flowchart used when a projected image is observed by the image projection apparatus shown in FIG. 12.

Further, the image projection apparatus 1 is provided with the adequate light-intensity setting unit 65 and a lamp-light shielding unit 66 for optically shielding illumination light emitted from the lamp 10 when a mode selected by the system controlling part 17 is switched from the booster mode to the LED mode, as shown in FIG. 2 and FIG. 12.

The lamp-light shielding unit 66 is made of an optically shielding material, shaped in a plate form and arrayed between the lamp 10 and the color wheel 12 so that it can travel from a position shielding a light path of illumination light to a position away from the position. In addition, the lamp-light shielding unit 66 is designed to be actuated by a light-shielding driving unit 68 controlled by a lamp-light shielding control unit 67.

The above-described adequate light-intensity setting unit 65 sends instructions to the lamp-light shielding control unit 67 to actuate the lamp-light shielding unit 66, when the LED mode is selected.

A case where an observer selects the automatic mode SW 62 in the thus structured image projection apparatus 1 will be described with reference to FIG. 13. Where the observer selects the lamp mode or the LED mode, the structure is the same as in the above embodiment 1.

The observer will select the automatic mode SW62 (S30) and also input image data to the adequate light-intensity setting unit 65. In this embodiment, the lamp 10 is lit up in advance via the lamp turning on-and-off indicating unit 54, when the automatic mode is selected.

Figure 14:
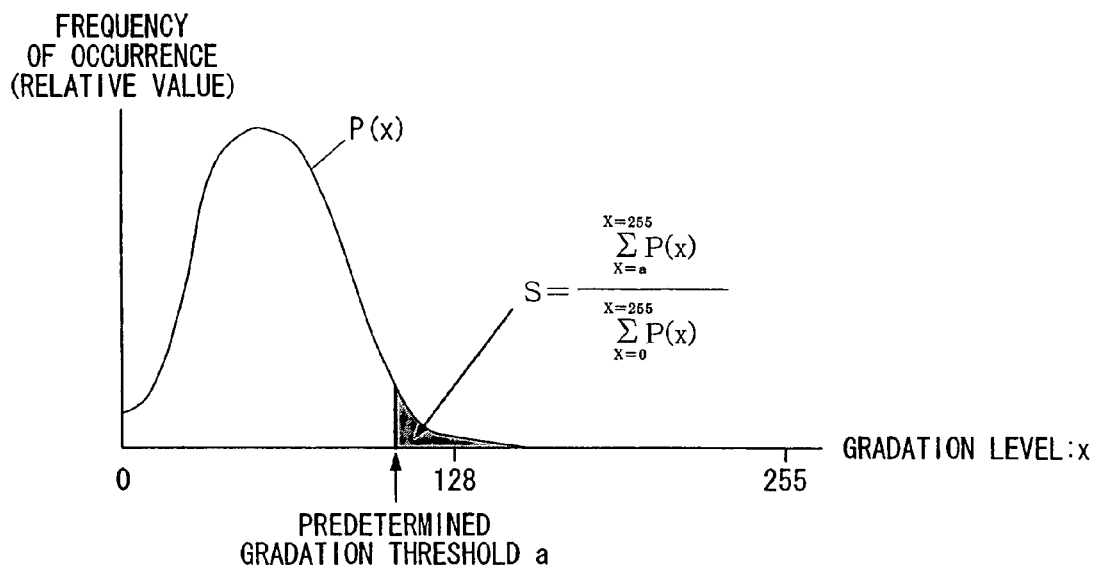
FIG. 14 shows an example where the gradation distribution of input data is analyzed by using the adequate light-intensity establishing unit shown in FIG. 12.

The adequate light-intensity setting unit 65 analyzes the gradation level frequency distribution from the input image data to determine a ratio of the pixels exceeding a predetermined gradation (S31). Then, as shown in FIG. 14, the adequate light-intensity setting unit 65 selects the booster mode (S32) when a ratio (S) of the pixels exceeding a predetermined gradation threshold to the whole is above 5% (predetermined ratio), and selects the LED mode (S33) when it is 5% or less.

Where the adequate light-intensity setting unit 65 selects the booster mode, steps similar to those described in the above embodiment 1 are performed (S6, S7 and step W). Then, where the adequate light-intensity setting unit 65 selects the LED mode, it sends instructions to the lamp-light shielding control unit 67 and allows the lamp-light shielding unit 66 to move to a light-shielding position in the light path of illumination light via the light shielding control unit (S34). By this step, illumination light emitted from the lamp 10 is shielded by the lamp-light shielding unit 66 and is not incident on the color filter 11 of the color wheel 12.

Further, the adequate light-intensity setting unit 65 sends instructions to the lamp-light shielding control unit 67 and also sends instructions to the LED turning on-and-off indicating unit 55 to turn on the LEDs (S35). On receipt of these instructions, the LED lighting control unit 32 actuates the LED driving unit 33 to emit each color of illumination light from the LED elements 30 (S36).

Figure 15:
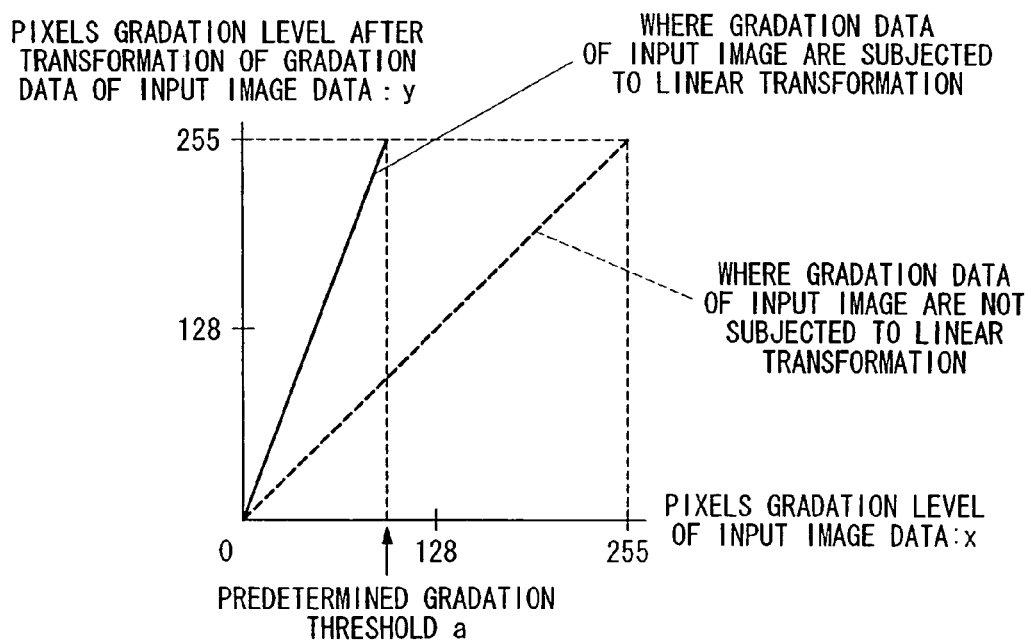
FIG. 15 is a graph of gradation data transformation of the input image data performed by switching to the LED mode by the adequate light-intensity establishing unit shown in FIG. 12.

In addition, when the adequate light-intensity setting unit 65 selects the LED mode, as shown in FIG. 15, gradation data of input image data are subjected to linear transformation (S37). To be more specific, linear transformation of the gradation data is performed so as to raise brightness of projection light on the basis of a predetermined gradation threshold "A". Then, white balance is adjusted at the step W.

According to the image projection apparatus 1, since the LED mode or the booster mode is automatically selected on the basis of the ratio of the pixels exceeding a predetermined gradation threshold "A" to the whole in the pixels of the image information to be input, an observer can always observe a projected image at an optimal brightness, thereby improving usability. Further, where the adequate light-intensity setting unit 65 selects the LED mode, it is possible to observe a project image in illumination light of a predetermined brightness and excellent color rendering properties, because gradation data of the image are subjected to linear transformation.

Further, it is also possible to instantly shield illumination light emitted from the lamp 10 or cancel such light shielding by using the lamp-light shielding unit 66. Therefore, switching to the LED mode can be performed smoothly regardless of the length of an initial lighting timing or light-out time of the lamp 10.

Where the above-described lamp-light shielding unit 66 is provided, a structure may be acceptable, in which the illumination-mode selecting unit 50 has a dynamic selection mode SW (not shown) that can select the dynamic selection mode other than the lamp mode, the LED mode or the dynamic mode.

In this instance, a structure may also be possible in which the adequate light-intensity setting unit 65 of the system controlling part 17 instructs the lamp-light shielding control unit 67 to appropriately actuate the lamp-light shielding unit 66, whereby the lamp mode and the LED mode are switched between for each frame of the image information. As described above, the lamp-light shielding unit 66 can be used to smoothly switch modes, thus making it possible to reliably switch modes within one frame period.

Figure 16:
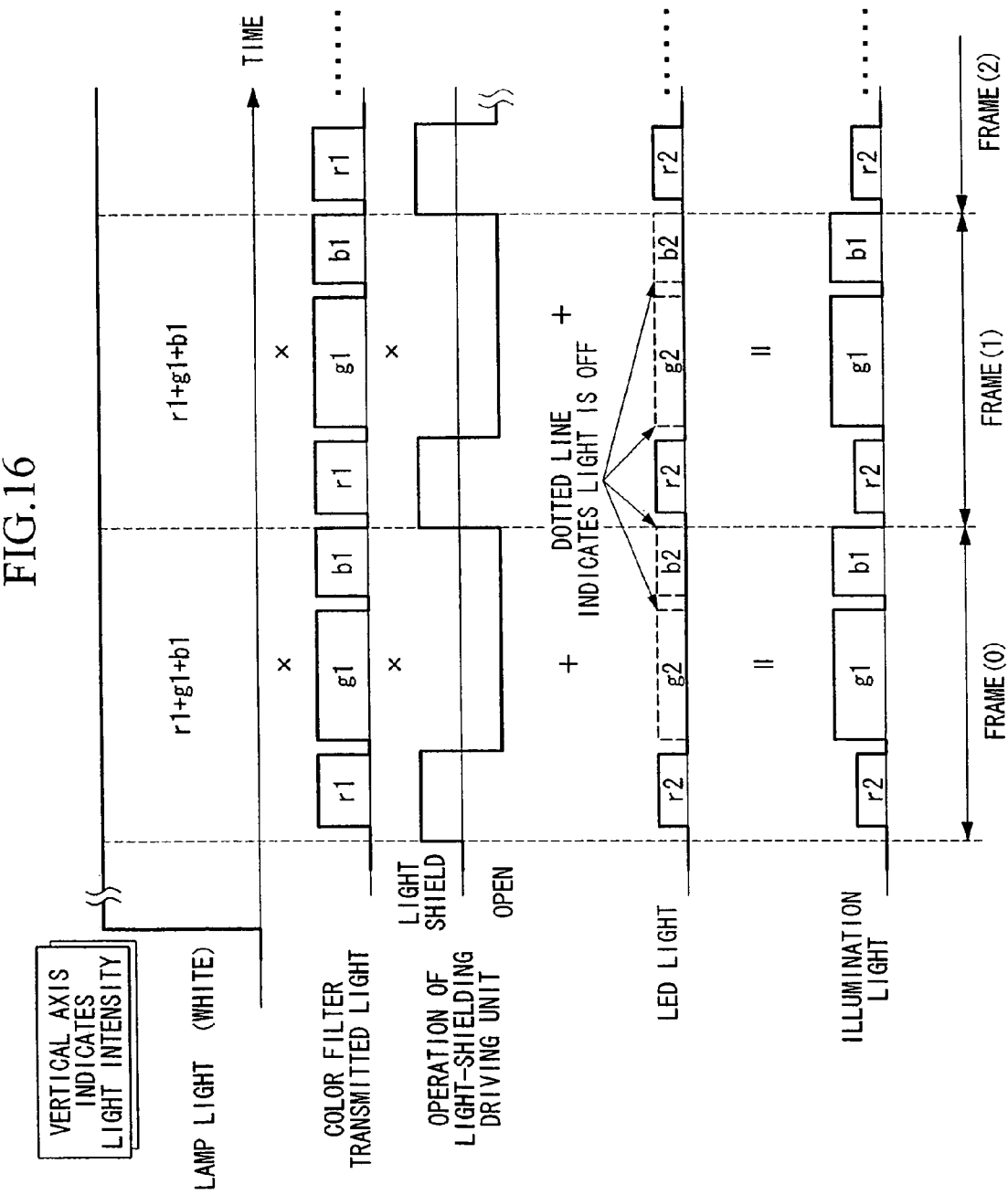
FIG. 16 is a graph showing the lighting sequence when illumination light is emitted from the lamp and the LED light source unit for the image projection apparatus shown in FIG. 12.

In addition, as shown in FIG. 16, a structure may also be acceptable in which the lamp mode or the LED mode can be selected and switched between for each color emitted from the synthetic prism 16, for example, for every red (R). In this instance, regarding illumination light shielded by the lamp 10, only red (R) is to be shielded by the lamp-light shielding unit 66. Further, regarding illumination light shielded by the LED elements 30, only red (R) is to be emitted. In this combination, illumination light emitted from the synthetic prism 16 becomes illumination light of which the red is from the LED elements 30 and green (G) and blue (B) are from the lamp 10 to be able to switch a mode for each color.

This step makes it possible for an image to be projected in a state where priority is given to color rendering properties for a predetermined color and given to brightness for other colors. Accordingly, a mode is used appropriately according to the application.

Figure 20:
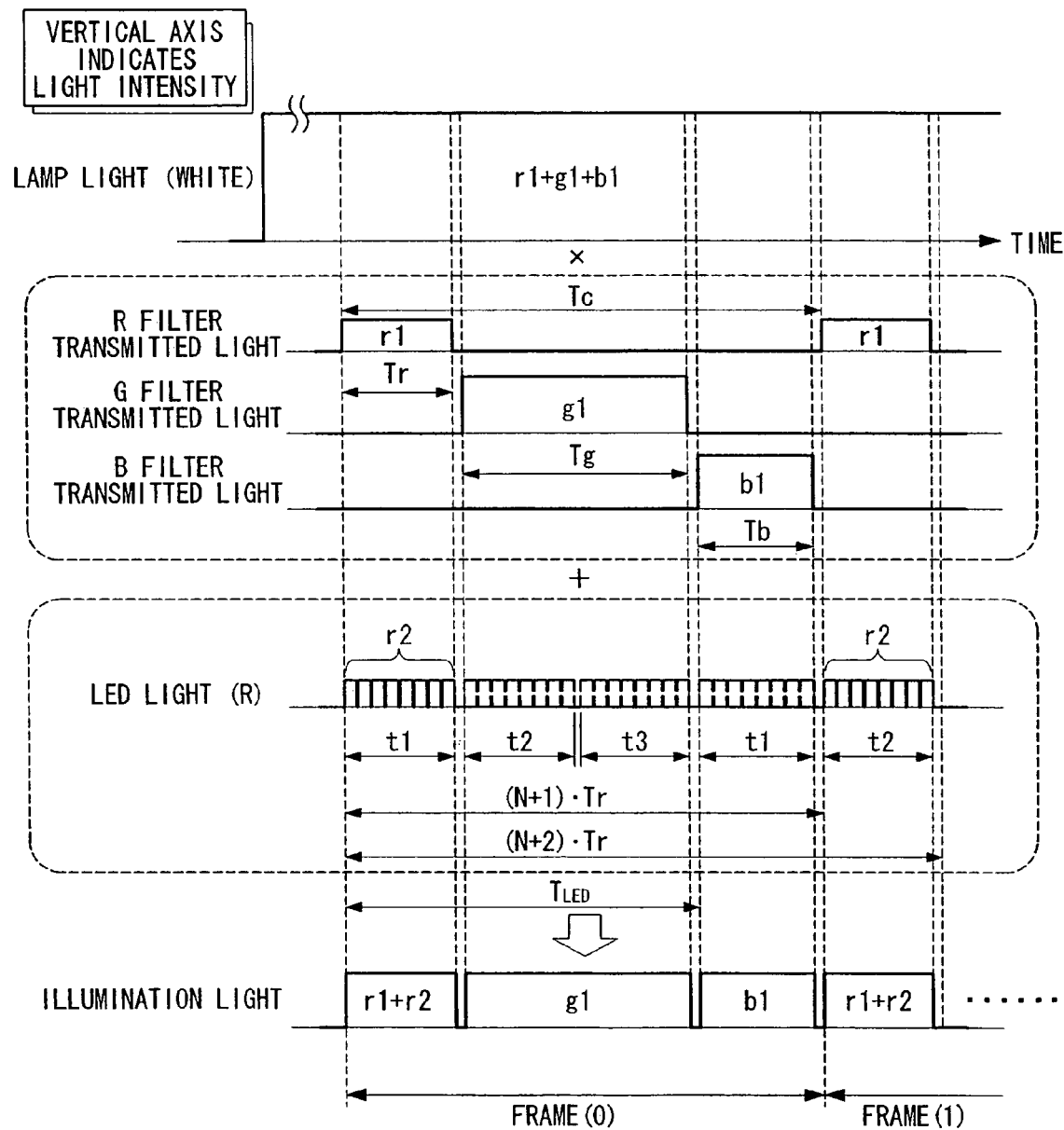
FIG. 20 is a diagram showing the lighting sequence when illumination light is emitted from the lamp and the LED light source unit for the image projection apparatus shown in FIG. 17.

Next, the second embodiment of the light source apparatus of the present invention according to the present invention will be described with reference to FIG. 1 and FIG. 20. The same symbols are given to the components of the second embodiment which are the same as those of the first embodiment, and the descriptions thereof are omitted.

A difference between the second embodiment and the first embodiment is that in the first embodiment the LED light source unit 14 emits illumination light in three colors of red (R), green (G) and blue (B), whereas in the image projection apparatus 70 of the second embodiment the LED light source unit 14 emits illumination light in a single color or only red (R). Another difference is that in the first embodiment the color wheel 12 and the light guide unit 31 are driven and rotated by the motor 24 via the same rotational axis 23, whereas in the second embodiment the color wheel 12 and the light guide unit 31 are separately driven and rotated.

Figure 17:
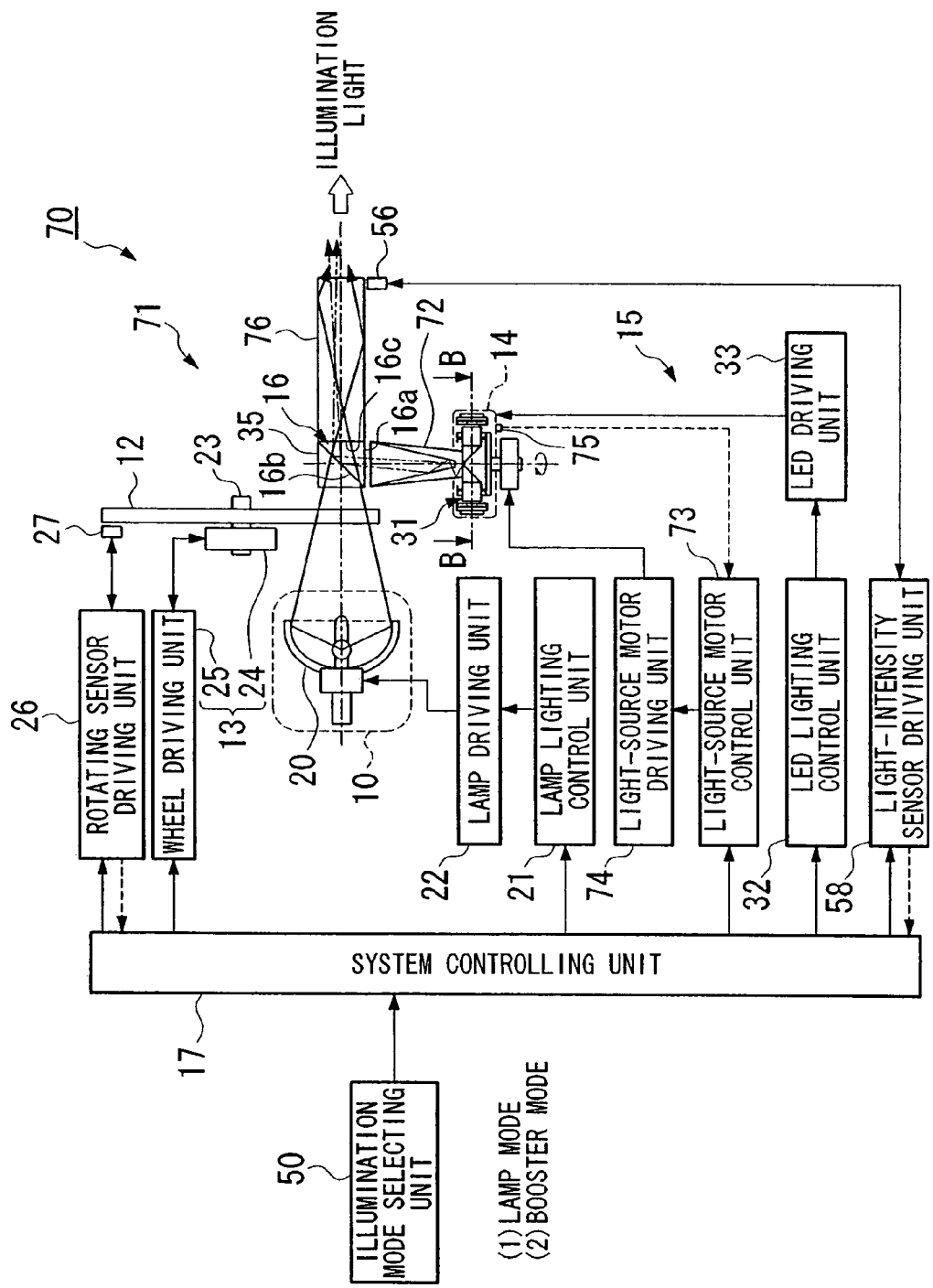
FIG. 17 is an overall block diagram showing the image projection apparatus and the light source apparatus of the second embodiment according to the present invention.

To be more specific, in a light source apparatus 71 of this embodiment, as shown in FIG. 17, the light guide unit 31 is arrayed laterally on the first plane 16a of the synthetic prism 16, and illumination light is incident on the first plane 16a by a taper rod 72.

The synthetic prism 16 of this embodiment is structured so that illumination light from the LED light source unit 14 is incident on the first plane 16a and illumination light from the lamp 10 is incident on the second plane 16b. Accordingly, the synthetic prism 16 of this embodiment has the light-entering planes opposite to those of the synthetic prism 16 in the first embodiment.

In addition, the light guide unit 31 is driven and rotated by a light-source motor driving unit 74 controlled by a light-source motor control unit 73. The light-source motor control unit 73 and the light-source motor driving unit 74 partially constitute the LED driving unit 15.

As the color wheel 12, the light source apparatus 71 is provided with a rotating sensor 75 for detecting the rotation number of the light guide unit 31, and the light source motor control unit 73 can rotate the light guide unit 31 at a desired rotation number on the basis of the rotation number detected by the rotating sensor 75.

Figure 18:
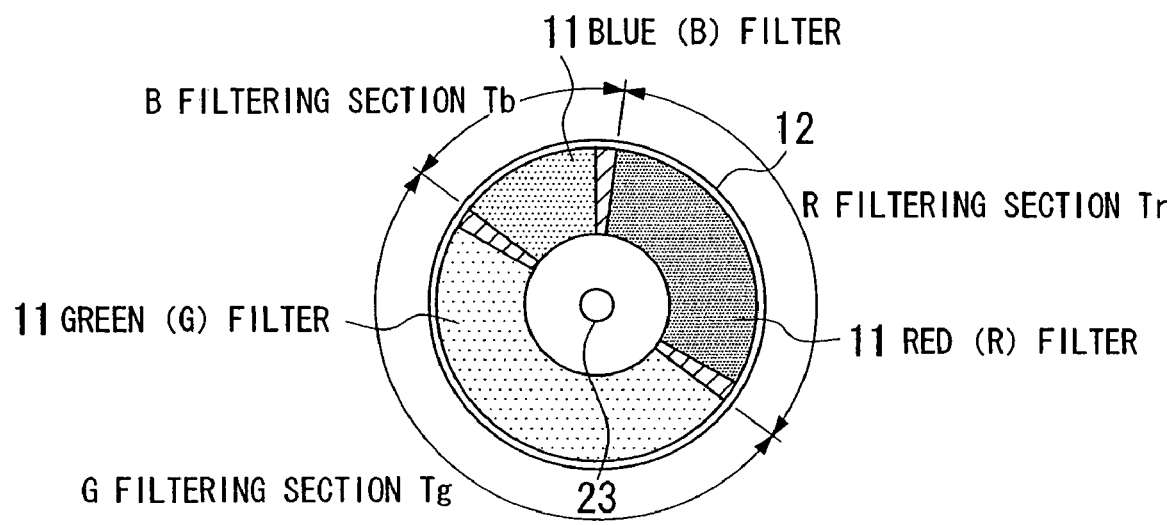
FIG. 18 is a front view of the color wheel of the optical apparatus shown in FIG. 17.

As shown in FIG. 18, in the color wheel 12 of this embodiment, a proportion of the color filter 11 is made larger in the order of green (G), red (R) and blue (B), and green (G) accounts for about a half of the whole color filter and red (R) accounts for about ⅓. Further, illumination light passed through the color wheel 12 is incident on the second plane 16b of the synthetic prism 16.

Figure 19:
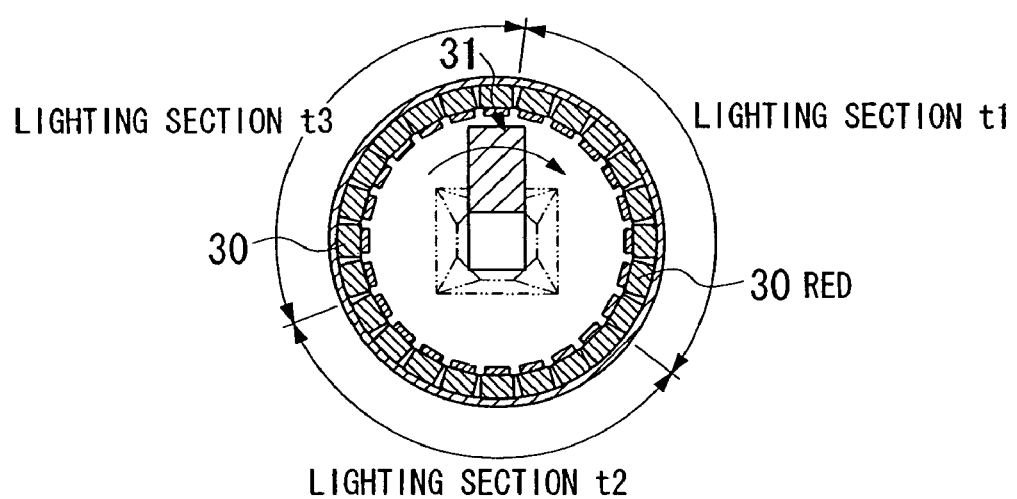
FIG. 19 is a view of the light guide unit and plural LED elements shown in FIG. 17, when viewed from the taper rod.

As shown in FIG. 19, all the plural LED elements 30 are designed to emit illumination light in red (R).

In the image projection apparatus 70 of this embodiment, illumination light emitted from the third plane 16c of the synthetic prism 16 proceeds inside an integrator rod 76 and then is made incident on the relay lens 41.

In this embodiment, the rotation number per unit time of the color wheel 12 driven by the wheel driving unit 13 is designed to be different from that of the light guide unit 31 rotated by the LED driving unit 15. To be more specific, color wheel 12 is designed to rotate faster than the light guide unit 31 in synchronization with lighting timing of the plural LED elements 30.

Namely, as shown in FIG. 18 and FIG. 19, if the period in which light is to pass through red (R) of color filter 11 of the color wheel 12 is designated as Tr, the LED driving unit 33 turns on the red (R) LED elements 30 within this Tr period.

In this embodiment, all the LED elements 30 per one circumference are divided into three portions (N=3), which are set to be three lighting portions (t1, t2 and t3), each of which is to turn on the respective elements during the period equal to the Tr period. Namely, the color wheel 12 is designed for rotational speed so that one rotating period Tc is determined by a formula of Tc=(N+1)×Tr. In contrast, the period T LED in which the LED elements 30 are turned on per one circumference of the light guide unit 31 can be expressed as $T_{LED}=N \times Tr$.

This equation means that if in the first rotation of the color wheel 12, the red (R) color filter 11 is in synchronization with the lighting portion t1 of the LED elements 30, then, in the second rotation of the color wheel 12, the red (R) color filter 11 is in synchronization with the lighting portion t2 of the LED elements 30. Thus, the rotation number per unit time of the color wheel 12 is designed to be different from that of the light guide unit 31, which will be described in detail later.

A case where the thus structured light source apparatus 71 and the image projection apparatus 70 are used to project an image will be described with reference to FIG. 20 as follows. In this embodiment, two modes, or the lamp mode and the booster mode, are available.

First, where an observer selects the lamp mode, as in the above embodiment 1, an observer can observe a projected image of illumination light having sufficient brightness and great light intensity.

Then, where the observer selects the booster mode, the wheel driving unit 25 and the light source motor control unit 73 rotate respectively the color wheel 12 and the light guide unit 31 at the above-described rotation number on the basis of the rotation number detected by the rotating sensors 27 and 75. Thus, illumination light emitted from the lamp 10 passes through the color filter 11 of red (R), green (G) and blue (B) at the timing as shown in FIG. 20, entering the second plane 16b of the synthetic prism 16.

The LED driving unit 33 turns on the LED elements 30 in synchronization with the rotation of the light guide unit 31. Namely, as shown in FIG. 20, in the first rotation of the color wheel 12, the LED driving unit 33 sequentially turns on the LED elements 30 arrayed at the lighting portion t1 to emit illumination light in red (R) when the red (R) portion of the color filter 11 reaches a position where illumination light from the lamp 10 is incident, but does not turn on the LED elements 30 when the green (G) or blue (B) portion of the color filter 11 reaches at the position.

As described above, the period Tc for which the color wheel 12 turns around once is longer (namely, the color wheel 12 rotates faster than the light guide unit 31) than the period $T_{LED}$ for which the light guide unit 31 turns around once. Therefore, in the second rotation of the color wheel 12, the LED elements 30 at the lighting portion t2 are turned on sequentially. Similarly, in the third rotation of the color wheel 12, the LED elements 30 at the lighting portion t3 are turned on sequentially.

As described above, the plural LED elements 30 are sequentially turned on for each lighting portion to emit illumination light in red (R).

Illumination light emitted from the LED elements 30 passes through the taper rod 72 and is incident on the first plane 16a of the synthetic prism 16. The synthetic prism 16 synthesizes illumination light from the color wheel 12 incident from the second plane 16b and illumination light from the LED elements 30 incident from the first plane 16a, and emits the thus synthesized illumination light from the third plane 16c. Namely, the synthesized illumination light is light in which only red (R) is synthesized from these two types of illumination light, as shown in FIG. 20.

Then, the illumination light passes through the integrator rod 76, and is then used as light for creating an image projected on the screen 5, as in the first embodiment.

As described above, according to the light source apparatus 71 and the image projection apparatus 70 of this embodiment, in addition to illumination light from the lamp 10, red (R) illumination light from the LED elements 30 can be used as auxiliary light, whereby an image can be projected by using illumination light having sufficient light brightness and great light intensity in a state where color rendering properties of red (R) are increased. Since color rendering properties of red (R) in particular are excellent, it is easier to adjust white balance. Further, use of the integrator rod 76 makes it possible to remove variance in light intensity of the synthesized illumination light, thereby improving the visibility of a projected image.

In addition, since the rotation number per unit time of the color wheel 12 is different from that of the light guide unit 31, it is possible to turn on evenly all the LED elements 30 during the lighting portions t1, t2 and t3, instead of turning on specific LEDs of the plural LEDs, for example, only those during the lighting portion t1. Thus, the LED elements 30 are improved in durability (longer life) and reliability can be improved in use for a long time.

In this embodiment, plural LED elements 30 are designed to emit red (R) illumination light, but green (G), blue (B) or other colors may be used in addition to red (R). Tc=(N+2)×Tr is also acceptable, although the period for which the color wheel 12 turns around once is designated as Tc=(N+1)×Tr.

Figure 21:
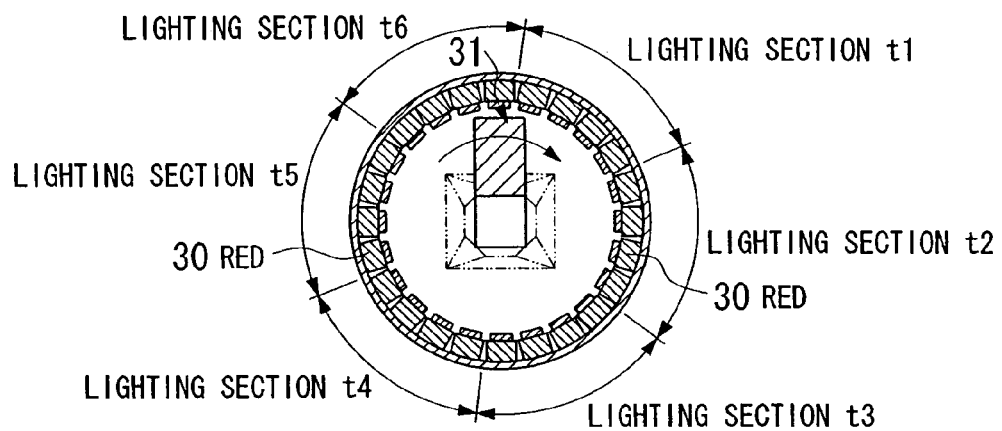
FIG. 21 is a front view of an example of the color wheel which is used in the optical apparatus shown in FIG. 17 but different from the color wheel shown in FIG. 18.
Figure 22:
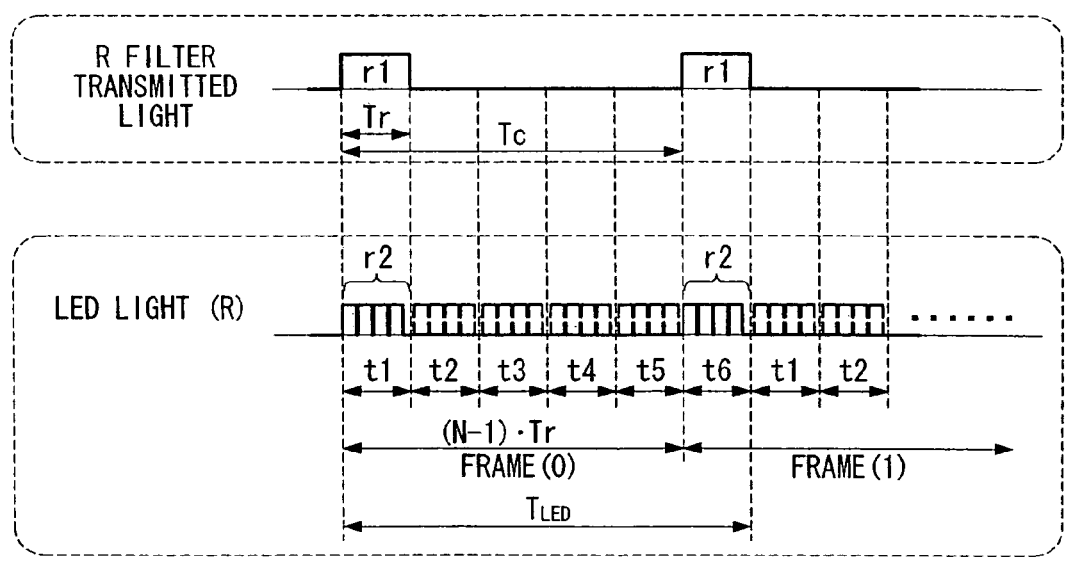
FIG. 22 is a diagram of the lighting sequence when the color wheel shown in FIG. 21 is used.

Further, an example is shown in which the LED elements 30 are divided into three lighting portions. However, the lighting portions are not restricted to three portions. For example, as shown in FIG. 21 and FIG. 22, they may be divided into 6 portions (N=6) or may be divided into plural portions. In the examples shown in FIG. 21 and FIG. 22, the color wheel 12 is designed for rotational speed so that one rotating period Tc is Tc=(N +1)×Tr. However, the period $T_{LED}$ in which the LED elements 30 are turned on for one circumference of the light guide unit 31 can be expressed as $T_{LED}$=N×Tr. In other words, the period Tc for which the color wheel 12 turns around is shorter than the period $T_{LED}$ for which the light guide unit 31 turns around (namely, the color wheel 12 rotates more slowly than the light guide unit 31). Therefore, in the second rotation of the color wheel 12, the LED elements 30 at the lighting portion t6 are turned on sequentially.

The third embodiment of the light source apparatus and the third embodiment of the image projection apparatus according to the invention will be described with reference to FIG. 23 to FIG. 25. The same symbols are given to the components of the third embodiment which are the same as those of the second embodiment, and the descriptions thereof are omitted.

A difference between the third embodiment and the second embodiment is that in the second embodiment the LED light source unit 14 emits red (R) illumination light from the plural LED elements 30 via the light guide unit 31 which can be moved rotationally, whereas in an image projection apparatus 80 of the third embodiment the LED light source unit 14 emits red (R) illumination light from a fixed light emitting chip.

Figure 23:
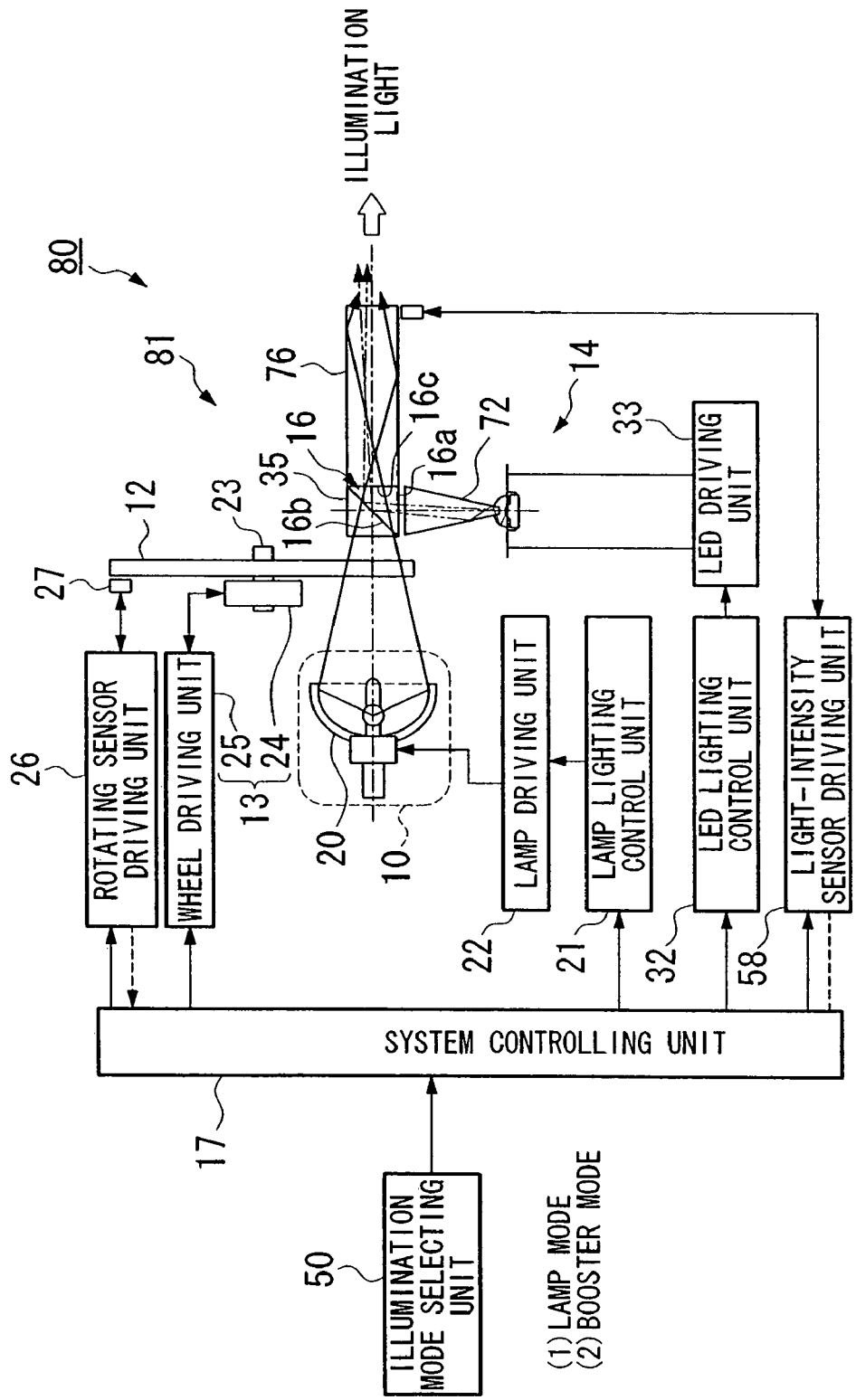
FIG. 23 is an overall view showing the image projection apparatus and the light source apparatus of the third embodiment according to the present invention.
Figure 24A:
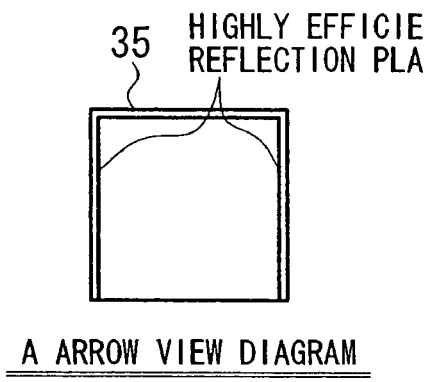
FIG. 24A shows a structure of a member seen from an arrow A in FIG. 24B.
Figure 24B:
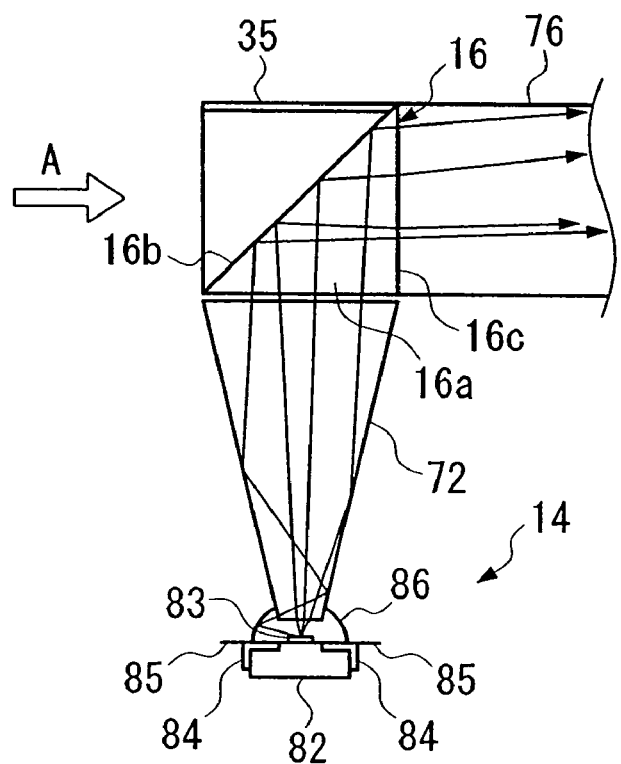
FIG. 24B is a drawing showing an area in the vicinity of the LED light source unit and the synthetic prism shown in FIG. 23.

To be more specific, as shown in FIG. 23 and FIGS. 24A and 24B, a light source apparatus 81 of the this embodiment is provided with a luminescence chip 83 fixed on a heat conducting block 82 at the same position where the light guide unit 31 of the second embodiment is located. The luminescence chip 83 is electrically connected to an electric pole 85 fixed to the heat conducting block 82 via a package 84. The luminescence chip 83 is designed to emit red (R) illumination light when electric power is supplied to an electrode 85 via the LED driving unit 33. A light conductive resin 86 is provided between the luminescence chip 83 and the taper rod 72 so that illumination light emitted from the luminescence chip 83 is reliably made incident on the taper rod 72.

In addition, the LED lighting control unit 32 controls the luminescence chip 83 so that the chip is turned on at the timing when the red (R) portion of the color filter 11 of the color wheel 12 reaches a position where illumination light emitted from the lamp 10 is incident.

FIG. 24A shows a structure of a member 35 seen from an arrow A in FIG. 24B. The member 35 of FIG. 24B is represented in a sectional view of FIG. 24A. The structure of the member 35 is the one in which the light that enters the member 35 is totally reflected on an inside surface thereof and is introduced into the prism 16.

A case where an image is projected by the thus structured image projection apparatus 80 and the light source apparatus 81 will be described below with reference to FIG. 25. In this embodiment, two modes, or the lamp mode and the booster mode, are available.

First, when an observer selects the lamp mode, he can observe a projected image in illumination light having sufficient brightness and great light intensity, as in the first embodiment.

Next, when the observer selects the booster mode, the wheel driving unit 25 rotates the color wheel 12 at a predetermined rotation number on the basis of the rotation number detected by the rotating sensor 27. Thus, illumination light emitted from the lamp 10 passes through the color filter 11 of red (R), green (G) and blue (B) at the timing, as shown in FIG. 25, and is incident on the second plane 16b of the synthetic prism 16.

As shown in FIG. 25, the LED driving unit 33 supplies electric power to the electrode 85 via the LED driving unit 33 at the above-described timing to turn on the luminescence chip 83. Illumination light emitted from the luminescence chip 83 passes through the light conductive resin 86 to be made incident on the taper rod 72 and then is made incident on the first plane 16a of the synthetic prism 16. Thereafter, the light is synthesized as in the second embodiment and used as light for creating a projected image.

According to the image projection apparatus 80 and the light source apparatus 81 of this embodiment, it is possible to acquire the same effect of the second embodiment by using the luminescence chip 83. Further, since it is not necessary to provide the plural LED elements 30 or the light guide unit 31, the apparatus can be simplified in structure and produced at a lower cost.

The luminescence chip 83 is not restricted to one chip, but may be arrayed in a plural number so as to have a greater light intensity.

Next, the fourth embodiment of the light source apparatus and of the image projection apparatus according to the present invention will be described with reference to FIG. 26 to FIG. 29. The same symbols are given to the components of the fourth embodiment which are the same as those of the first embodiment, and the descriptions thereof are omitted.

A difference between the fourth embodiment and the first embodiment is that in the first embodiment white illumination light emitted from the lamp 10 is converted into various colors of red (R), green (G) and blue (B) by the color filter 11 of the color wheel 12, whereas in the fourth embodiment the image projection apparatus uses white illumination light emitted from the lamp 10 as white light, as is.

Figure 26:
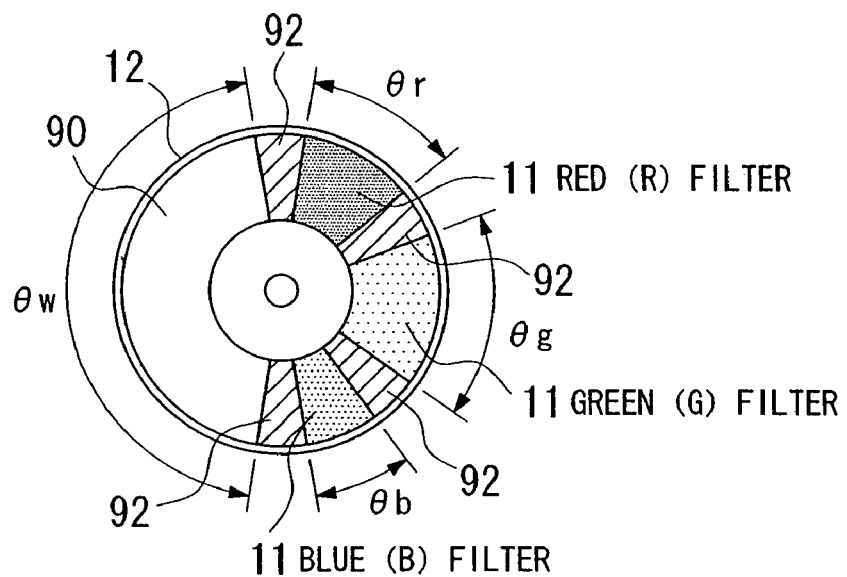
FIG. 26 is a front view of the color wheel used in the image projection apparatus and the light source apparatus of the fourth embodiment according to the present invention.

To be more specific, as shown in FIG. 26, in the light source apparatus of this embodiment, about a half of the area of the color wheel 12 is provided with a hole (space) (θw) for allowing white illumination light to pass, and the remaining half of the area is provided with the color filter 11 of red (R), green (G) and blue (B), together with a light shielding unit 92. Namely, white color is included only in illumination light passed through the color filter 11 of the color wheel 12. A proportion of the color filter 11 is made larger in the order of green (G), red (R) and blue (B).

Figure 27:
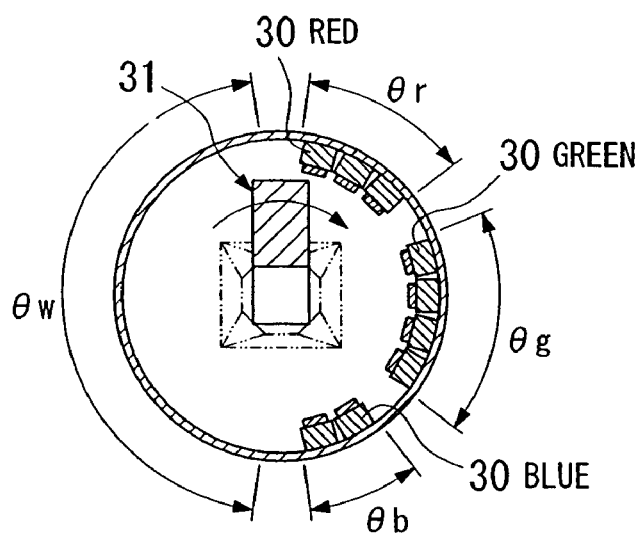
FIG. 27 is a view showing the LED elements arrayed corresponding to the color wheel shown in FIGS. 24A and 24B.

As shown in FIG. 27, the plural LED elements 30 are arrayed on an approximately half of the circumference, which are to emit the same colored light according to the color wheel 12.

A case where the thus structured light source apparatus and image projection apparatus are used to project an image will be described with reference to FIG. 28.

Figure 28:
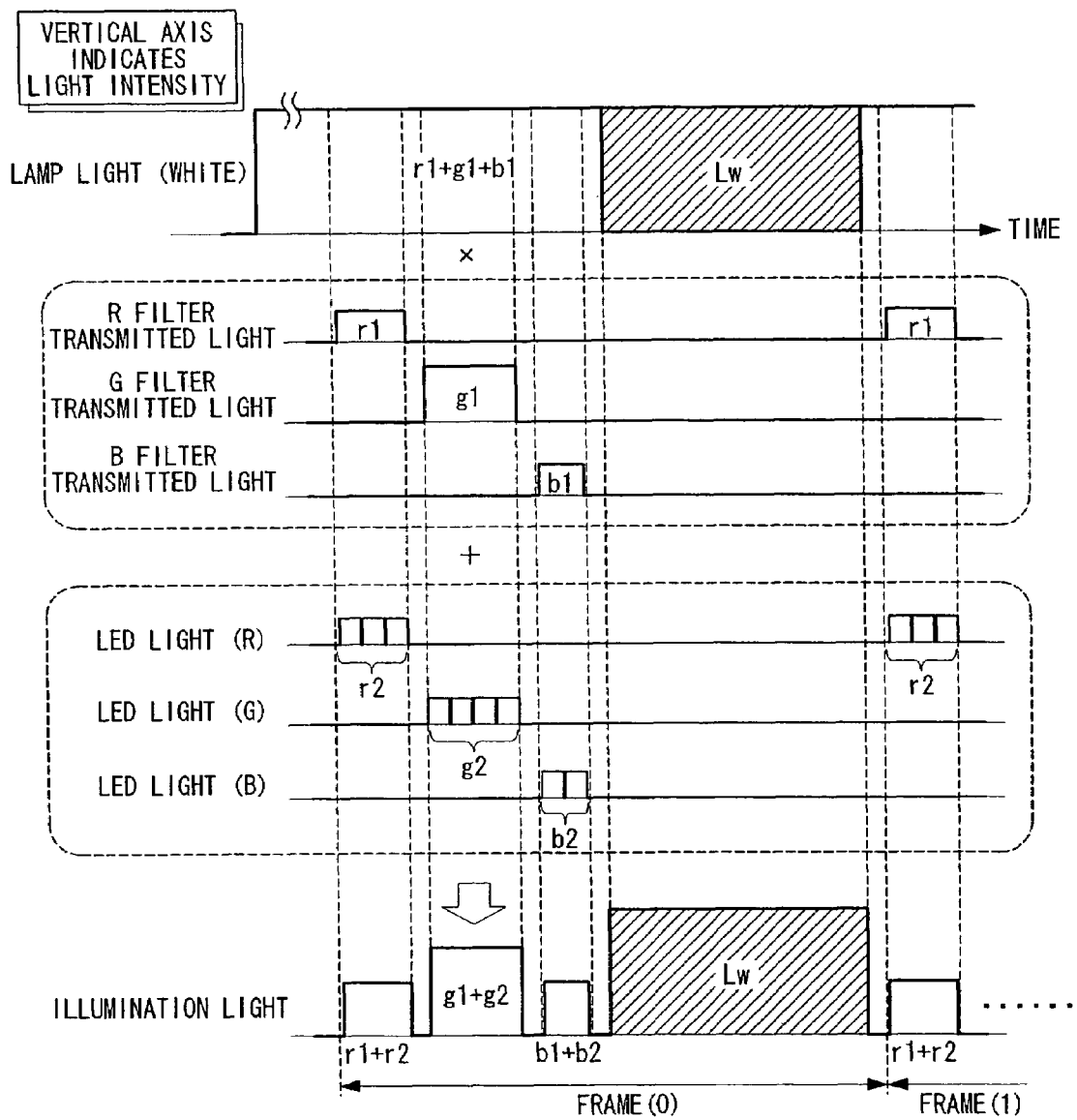
FIG. 28 is a diagram of the lighting sequence according to the color wheel and the LED elements shown in FIG. 23 and FIGS. 24A and 24B.

When an observer selects the booster mode, illumination light emitted from the lamp 10 is made incident on the second plane 16b of the synthetic prism 16 in four colors of white (LW), red (R), green (G) and blue (B) as shown in FIG. 28, after passage through the color wheel 12. Further, illumination light emitted from plural LEDs is incident on the first plane 16a of the synthetic prism 16 in three colors of red (R), green (G) and blue (B). Illumination light synthesized by the synthetic prism 16 and emitted from the third plane 16c is illumination light in which only white color (LW) is emitted from the lamp 10, as shown in FIG. 28. This illumination light is used as light for illuminating a projected image after passage through the taper rod 72.

Figure 29:
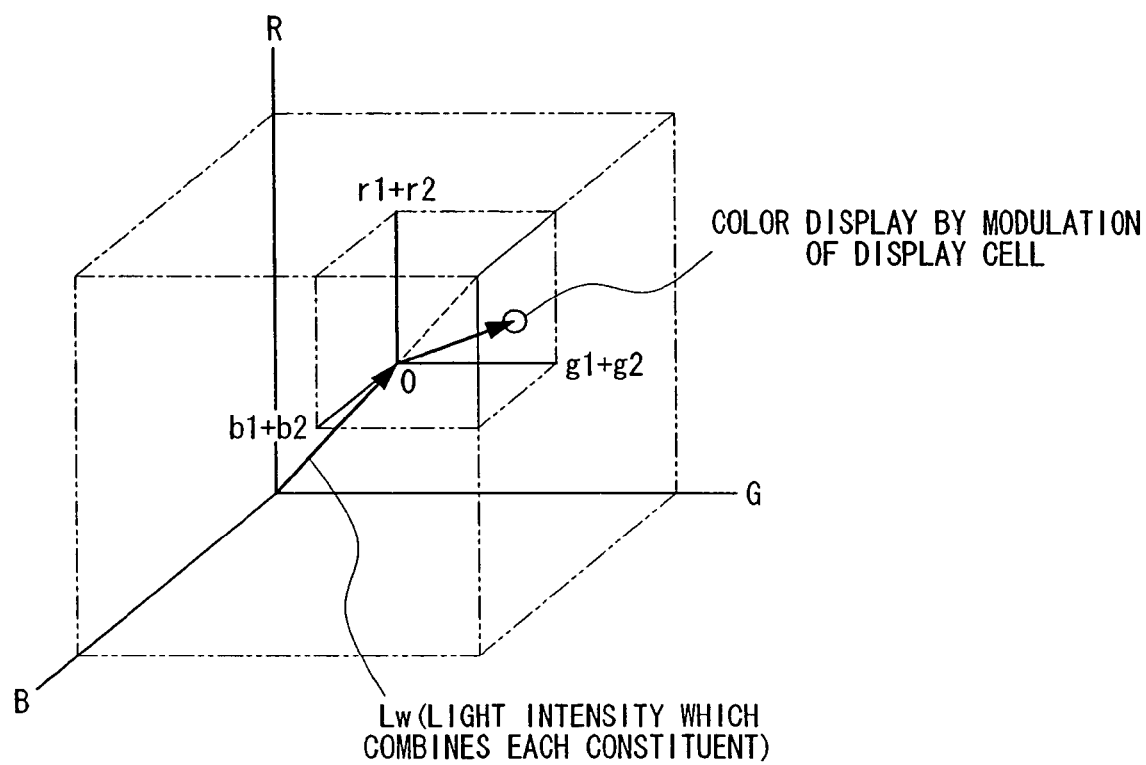
FIG. 29 is a view explaining the display area of illumination light shown in FIG. 28.

According to the light source apparatus and the image projection apparatus of this embodiment, it is possible to acquire white illumination light having sufficient brightness, in addition to illumination light of three colors of red (R), green (G) and blue (B) sufficient in brightness and excellent in color rendering properties. Therefore, as shown in FIG. 29 in which color is displayed on the basis of brightness of three colors of red (R), green (G) and blue (B), the light intensity can be increased as a whole, thereby making it possible to project an image in a state where priority is given to brightness. This is particularly effective when a black-and-white image is projected.

As shown in FIG. 27, the LED elements 30 are not arrayed on approximately half the area of the circumference, but the LED elements 30 of the colors are arrayed on the other half area of the circumference. However, an LED element which emits white illumination light may be arrayed on half the area of the circumference, whereby the light intensity of white color can be further increased.

Next, the fifth embodiment of the light source apparatus and image projection apparatus according to the present invention will be described with reference to FIG. 30 to FIG. 32. The same symbols are given to the components of the fifth embodiment which are the same as those of the second embodiment, and the descriptions thereof are omitted.

A difference between the fifth embodiment and the second embodiment is that in the second embodiment no heat-reducing measures are taken for the lamp 10 and the LED light source unit 14, whereas in an image projection apparatus 100 of the fifth embodiment heat-reducing measures are taken for allowing heat generated by the lamp 10 and the LED light source unit 14 to dissipate.

Figure 30:
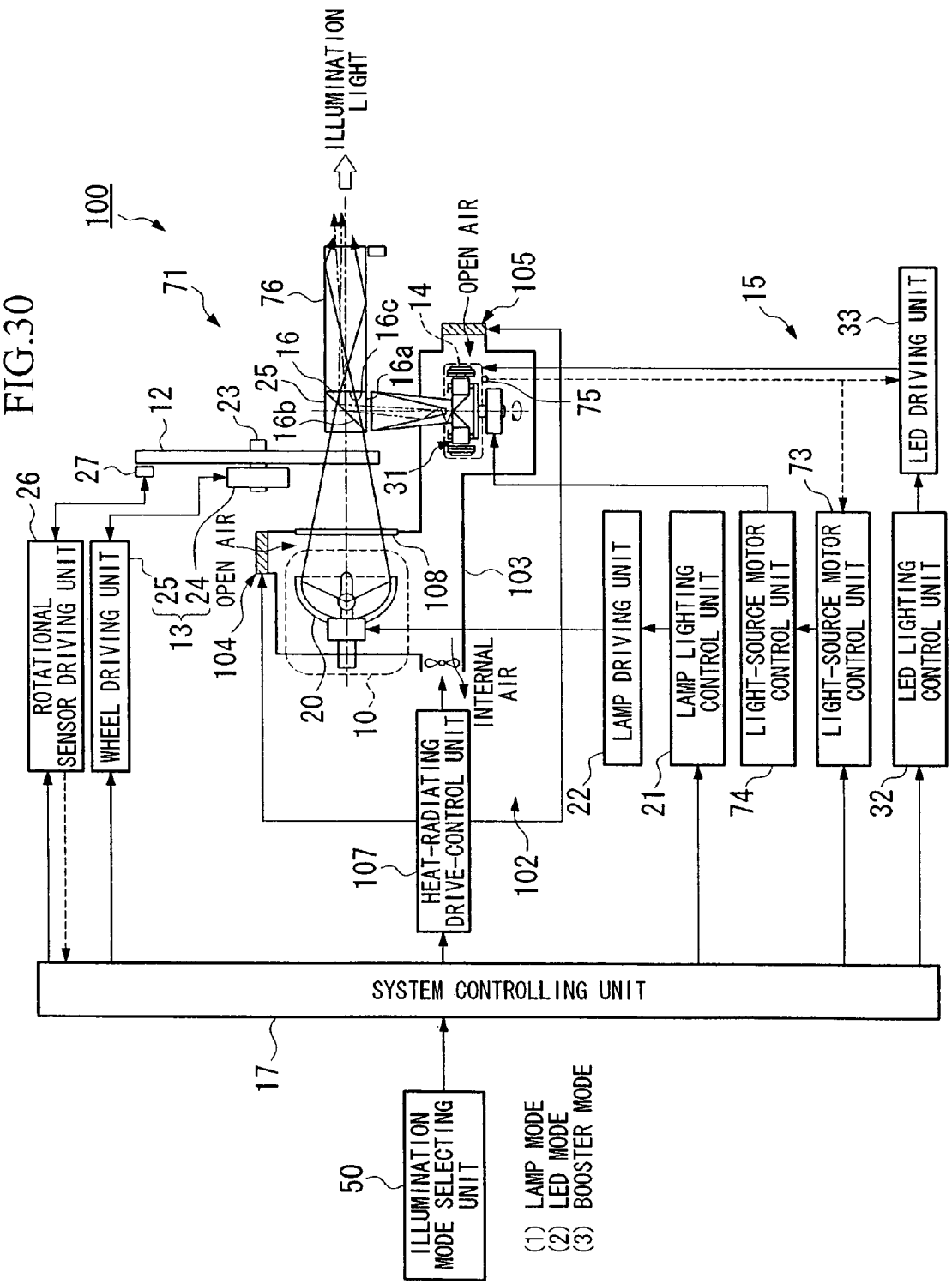
FIG. 30 is an overall view showing the image projection apparatus and the light source apparatus of the fifth embodiment according to the present invention.

To be more specific, as shown in FIG. 30, the image projection apparatus 100 of this embodiment is provided with a cooling unit 102 for expelling from the apparatus heat generated by the lamp 10 and the LED light source unit 14. The cooling unit 102 expels the heat via the first channel capable of easily radiating heat generated by the lamp 10 when the lamp mode is selected, and expels the heat via the second channel capable of easily radiating the heat generated by the LED light source unit 14 when the LED mode is selected.

In the LED light source unit 14 of this embodiment, the plural LED elements 30 are arrayed so as to emit illumination light of three colors of red (R), green (G) and blue (B), as in the first embodiment. Therefore, an observer can select any of the lamp mode, the LED mode or the booster mode.

As shown in FIG. 30, the above-described cooling unit 102 is provided with a heat-radiating duct 103 for accommodating the lamp 10 and the LED light source unit 14. This heat-radiating duct 103 is provided with a first suctioning shutter 104 (a first suctioning pore having a shutter function) mounted in the vicinity of the lamp 10, a second suctioning shutter 105 (a second suctioning pore having a shutter function) mounted in the vicinity of the LED light source unit 14, and an exhaust fan 106 for expelling internal air. Further, the first suctioning shutter 104, the second suctioning shutter 105 and the exhaust fan 106 are respectively controlled for the action by a heat-radiating drive-control unit 107 instructed by the system controlling part 17. Namely, the above-described cooling unit 102 is constituted by the heat-radiating duct 103, the first suctioning shutter 104, the second suctioning shutter 105, the exhaust fan 106 and the heat-radiating drive control unit 107.

Further, the heat-radiating duct 103 is provided with a transparent cover 108 for allowing illumination light emitted from the lamp 10 to be incident on the color wheel 12.

Figure 31:
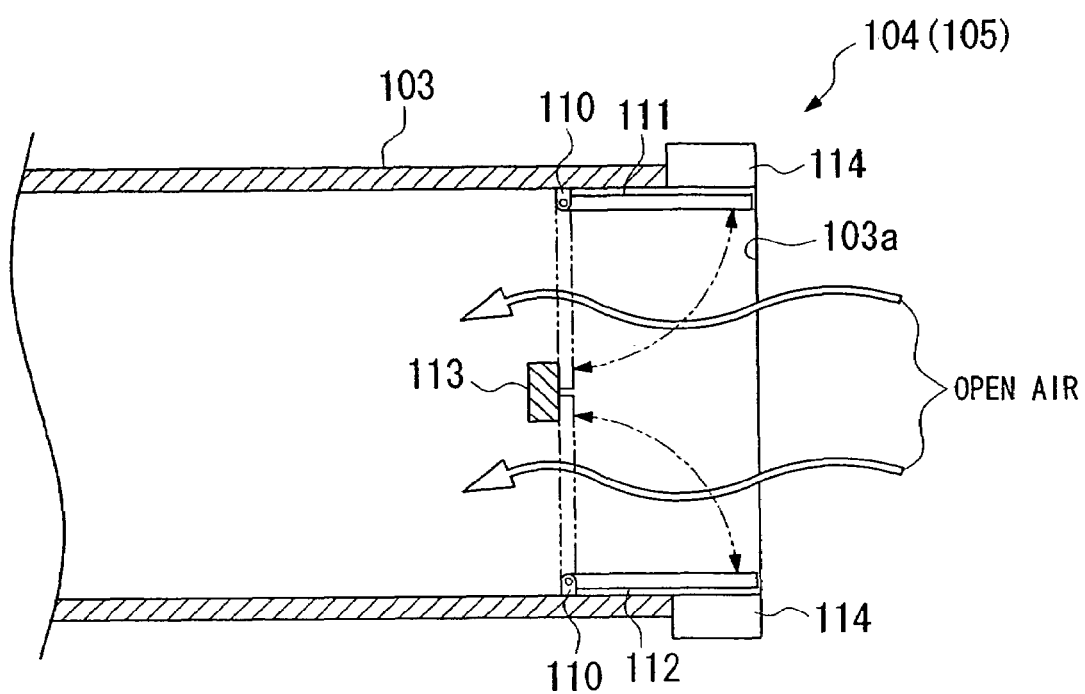
FIG. 31 is a diagram of the first suctioning shutter and the second suctioning shutter shown in FIG. 30.
Figure 32:
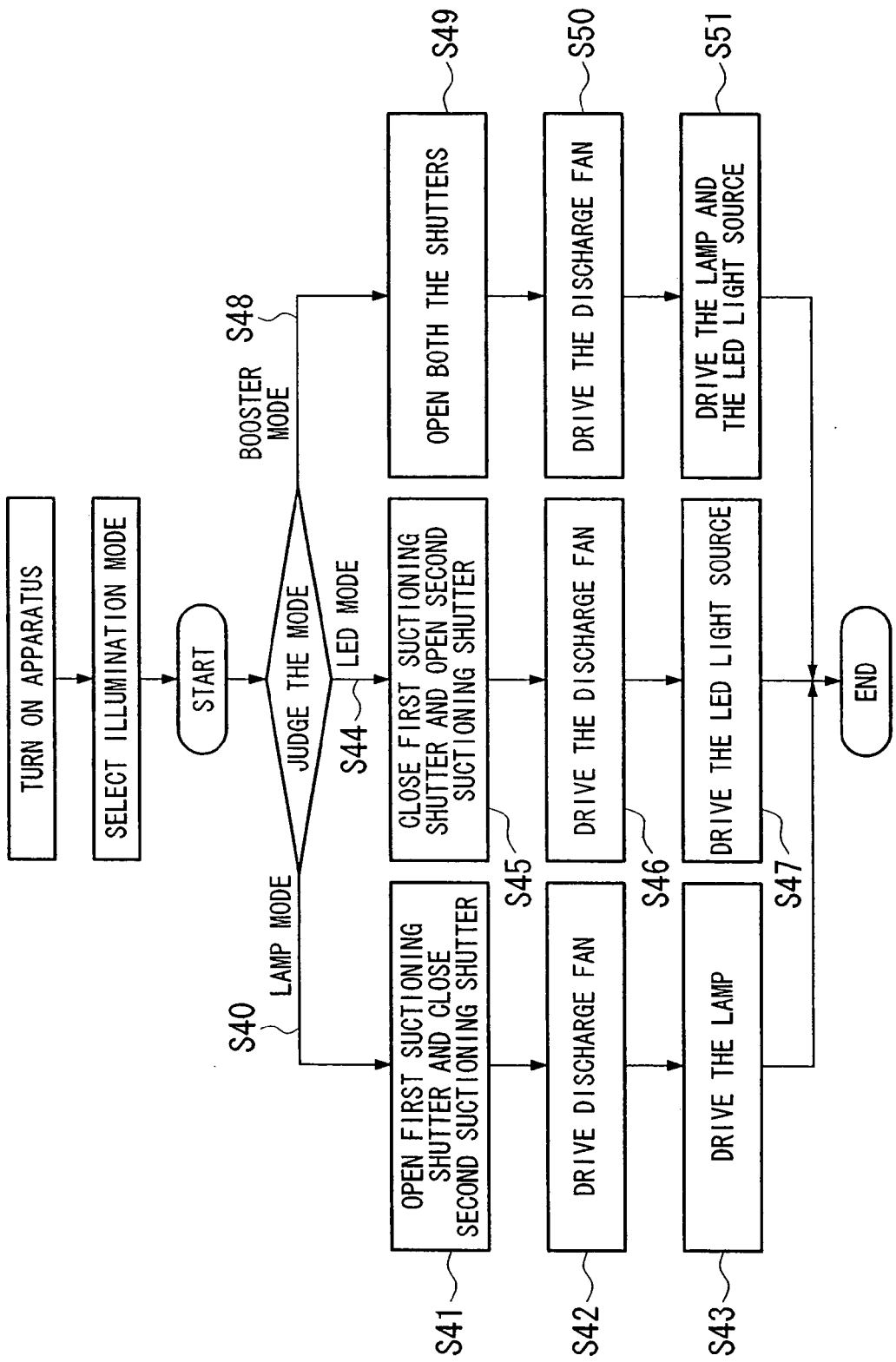
FIG. 32 is a flowchart showing a case where the cooling unit is driven for each mode by the image projection apparatus shown in FIG. 30.

As shown in FIG. 31, the first suctioning shutter 104 and the second suctioning shutter 105 are made of a magnetic material and formed in a plate form, with one end fixed to the heat-radiating duct 103 via a hinge unit 110, are provided with a first suction valve 111 and a second suction valve 112 for opening or closing an aperture 103a of the heat-radiating duct 103 via an opening and closing motion mainly performed by the hinge unit 110, a valve stopper 113 provided around the center of the aperture 103a of the heat-radiating duct 103 and in contact with the other end of the first suction valve 111 and of the second suction valve 112 when blocking off the aperture 103a of the first heat-radiating duct 103 and an electromagnet 114 mounted on the heat-radiating duct 103 to fix the other end of the first suction valve 111 and of the second suction valve 112 when the aperture 103a of the heat-radiating duct 103 is opened, and is capable of taking air into the heat-radiating duct 103 by opening the aperture 103a of the heat-radiating duct 103.

The cooling unit 102 discharges internal air using the exhaust fan 106 to outside the apparatus or outside the heat-radiating duct 103 in a state where the first suctioning shutter 104 is opened and the second suctioning shutter 105 is closed when heat is let out from the first channel, and discharges internal air using the exhaust fan 106 to outside the heat-radiating duct 103 in a state where the first suctioning shutter 104 is closed and the second suctioning shutter 105 is opened when heat is let out from the second channel. This will be described in detail later.

A case where the cooling unit 102 is actuated in the thus structured image projection apparatus 100 will be described with reference to FIG. 32. Both the suction valves 111 and 112 of the suctioning shutters 104 and 105 are in contact with the valve stopper 113 on the other end, when the electromagnet 114 is not actuated. Such a state is an initial position of the apparatus.

First, when an observer selects the lamp mode (S40), the first suctioning shutter 104 is opened and at the same time the second suctioning shutter 105 is closed (S41). To be more specific, the heat-radiating drive control unit 107 actuates the electromagnet 114 of the first suctioning shutter 104 and fixes the other ends of both the suction valves 111 and 112 to allow the aperture 103a of the heat-radiating duct 103 to open. Both the suction valves 111 and 112 of the second suctioning shutter 105 remain located at the above-mentioned initial position.

At the same time as the above step, the heat-radiating drive control unit 107 drives the exhaust fan 106 (S42). Thereby air can be taken into the heat-radiating duct 103 from the first suctioning shutter 104, and such air can be expelled by the exhaust fan 106, together with internal air.

In other words, air flow can be created along the first channel. In this instance, in the second suctioning shutter 105, both the suction valves 111 and 112 are sucked in by the exhaust fan 106 and in contact with the valve stopper 113 on the other end. Thus, the aperture 103*a* of the second suctioning shutter 105 is completely blocked off.

After actuation of the exhaust fan 106, the lamp-lighting control unit 21 drives the lamp 10 via the lamp driving unit 22 (S43). In this instance, since air flow along the first channel is formed around the lamp 10, heat generated by the lamp 10 can be expelled by air flow.

Then, when an observer selects the LED mode (S44), the second suctioning shutter 105 is opened and at the same time the first suctioning shutter 104 is closed (S45). Namely, the heat-radiating drive control unit 107 actuates the electromagnet 114 of the second suctioning shutter 105 and fixes the other ends of the both suction valves 111 and 112 to allow the aperture 103*a* of the heat-radiating duct 103 to open. Both the suction valves 111 and 112 of the first suctioning shutter 104 remain located at the above-mentioned initial position.

At the same time as the above step, the heat-radiating drive control unit 107 drives the exhaust fan 106 (S46).

Thereby air can be taken into the heat-radiating duct 103 from the second suctioning shutter 105, and such air can be expelled by the exhaust fan 106, together with internal air.

In other words, air flow can be created along the second channel. In this instance, in the first suctioning shutter 104, both the suction valves 111 and 112 are sucked in by the exhaust fan 106 and in contact with the valve stopper 113 on the other end. Thus, the aperture 103*a* of the first suctioning shutter 104 is completely blocked off.

After actuation of the exhaust fan 106, the LED lighting control unit 32 drives the LEDs via the LED driving unit 33 (S47). In this instance, since air flow along the second channel is created around the LED light source unit 14, heat generated by the LED light source unit 14 can be expelled by the air flow.

Where an observer selects the booster mode (S48), the heat-radiating drive control unit 107 opens the first suctioning shutter 104 and the second suctioning shutter 105 (S49). Namely, the heat-radiating drive control unit 107 actuates the electromagnet 114 of the first suctioning shutter 104 and second suctioning shutter 105, and fixes both the suction valves 111 and 112 to allow the aperture 103*a* of the heat-radiating duct 103 to open.

At the same time, the heat-radiating drive control unit 107 drives the exhaust fan 106 (S50).

Thereby air can be taken into the heat-radiating duct 103 from the second suctioning shutter 105 and the first suctioning shutter 104, and such air can be expelled by the exhaust fan 106, together with internal air. Thus, air flow along the first channel and the second channel can be created.

After actuation of the exhaust fan 106, the lamp lighting control unit 21 drives the lamp 10 via the lamp driving unit 22, and the LED lighting control unit 32 drives LEDs via the LED driving unit 33 (S51). In this instance, since air flow along the first channel and the second channel is formed around the first lamp 10 and the LED light source unit 14, heat generated by the lamp 10 and the LED light source unit 14 can be expelled by the air flow.

As described above, according to the image projection apparatus 100 of this embodiment, heat generated by the lamp 10 and the LED light source unit 14 can be expelled to outside the heat-radiating duct 103 by the cooling unit 102 via the first channel or the second channel according to the mode selected, thereby reducing heat influence to the greatest possible extent. It is also possible to observe a projected image for a longer time and improve the reliability of products.

In particular, the opening and closing motion of the first suctioning shutter 104 is combined with that of the second suctioning shutter 105, whereby the first channel and the second channel are used to reliably discharge heat. Further, use of the first suctioning shutter 104 and the second suctioning shutter 105 makes it possible to block off the aperture 103*a* of the heat-radiating duct 103, without producing clearance, thereby reliably discharging heat via a desired channel.

Next, the sixth embodiment of the light source apparatus and image projection apparatus according to the present invention will be described with reference to FIG. 33. The same symbols are given to the components of the sixth embodiment which are the same as those of the first embodiment, and the descriptions thereof are omitted.

Figure 33:
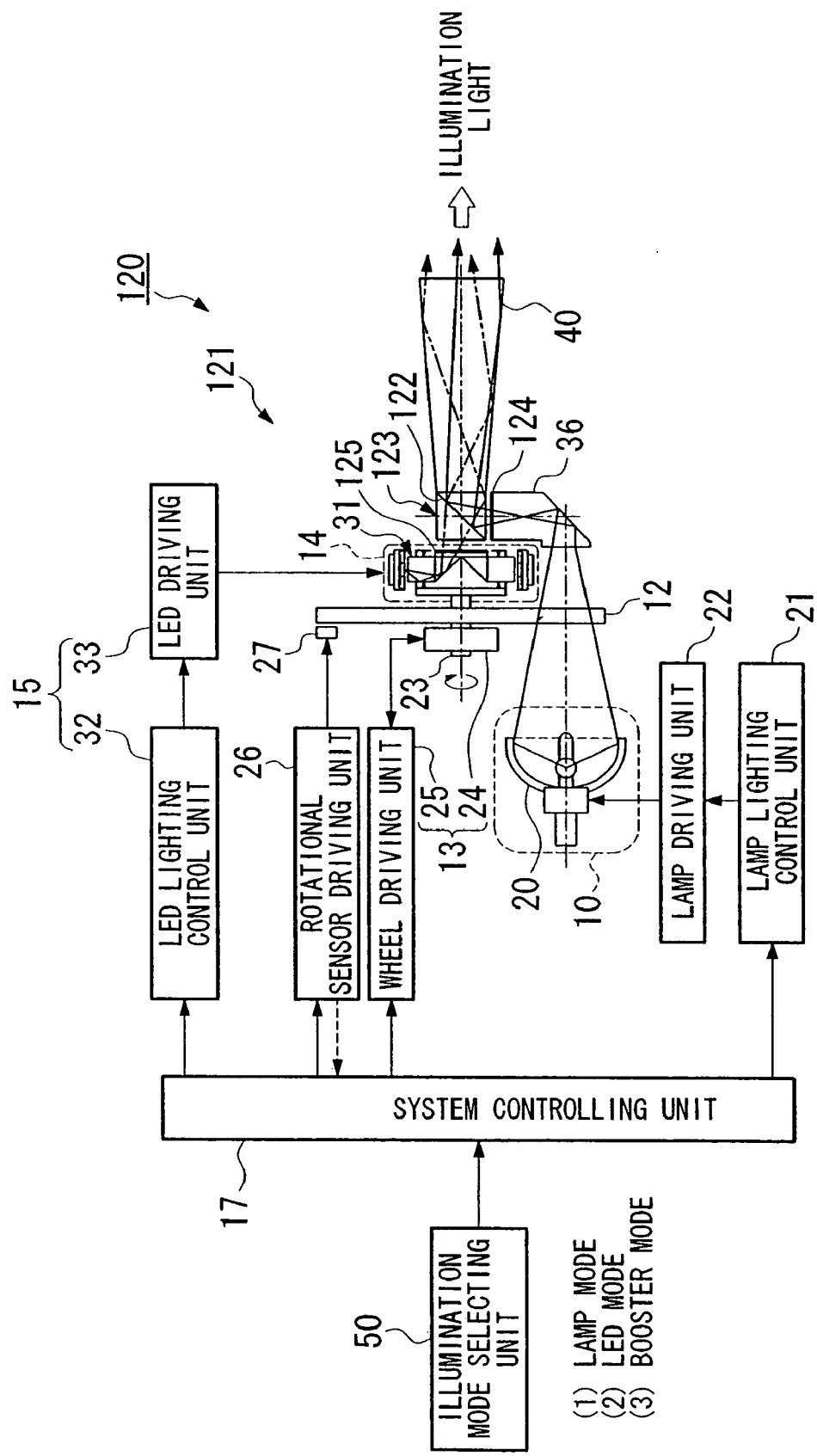
FIG. 33 is an overall diagram showing the image projection apparatus and the light source apparatus of the sixth embodiment according to the present invention.

A difference between the sixth embodiment and the first embodiment is that in the first embodiment illumination light from the lamp 10 and that from the LED light source unit 14 are synthesized by the synthetic prism 16, whereas in a light source apparatus 121 mounted on an image projection apparatus 120 of the sixth embodiment, as shown in FIG. 33, illumination light is synthesized by using a polarizing beam splitter 123 (an optical synthesis unit) which has a polarization and transmission reflecting plane 122.

The above-described polarizing beam splitter 123 is designed to synthesize illumination light of S polarization, which is linear polarization in a predetermined direction with respect to the polarization transmission reflecting plane 122, of illumination light passed through the color filter 11 of the color wheel 12, with illumination light of P polarization, which is linear polarization in a direction perpendicular to the predetermined direction, of illumination light emitted by the LED light source unit 14. In this embodiment, the polarization and transmission reflecting plane 122 is designed to transmit the light of P polarization and at the same time reflect the light of S polarization.

Further, the light source apparatus 121 of this embodiment is provided with a first polarizing plate 124 mounted on an emitting plane of the lamp light guiding unit 36 for converting illumination light passed through the color filter 11 of the color wheel 12 to illumination light of the above-described S polarization with respect to the polarization and transmission reflecting plane 122, and a second polarizing plate 125 mounted on an emitting plane of the light guide unit 31 for converting illumination light emitted by the LED light source unit 14 to illumination light of the above-described P polarization with respect to the polarization and transmission reflecting plane 122.

A case where the booster mode is selected and illumination light is synthesized by the thus structured light source apparatus 121 and image projection apparatus 120 will be described as follows.

Illumination light passed via the color filter 11 of the color wheel 12 is converted by the first polarizing plate 124 to the light of S polarization after passage via the lamp light guiding unit 36, and is incident on the polarization and transmission reflecting plane 122 of the polarizing beam splitter 123.

Then, illumination light emitted by the LED elements 30 is incident on the both ends of the parallel rod 31*a* of the light guide unit 31. This illumination light is at the same time changed in the direction by the prism 31*b* and, then, converted by a second polarizing plate 125 to the light of P polarization, to be incident on the polarization and transmission reflecting plane 122 of the polarizing beam splitter 123.

Here, as explained above, since the polarization and transmission reflecting plane 122 is designed to allow the light of P polarization to pass and at the same time allow the light of S polarization to reflect, the illumination light converted to that of P polarization passes through the polarization and transmission reflecting plane 122 and is incident on the taper rod 40. Further, the illumination light converted to that of S polarization is reflected by the polarization and transmission reflecting plane 122 and is incident on the taper rod 40. Thus, these two types of the illumination light are incident on the taper rod 40 in a state of being synthesized due to transmission and reflection on the polarization and transmission reflecting plane 122. Thereafter, the illumination light synthesized similarly as in the first embodiment is used for projecting an image.

As explained above, according to the light source apparatus 121 and the image projection apparatus 120 of this embodiment, it is possible to synthesize two types of illumination light easily and reliably via the polarizing beam splitter 123 by taking advantage of the direction of linear polarization. In particular, the first polarizing plate 124 and the second polarizing plate 125 are provided; therefore, illumination light can be synthesized more reliably and effectively.

Next, the seventh embodiment of the light source apparatus and image projection apparatus according to the present invention will be described with reference to FIG. 34 to FIG. 36. The same symbols are given to the components of the seventh embodiment which are the same as those of the first embodiment, and the descriptions thereof are omitted.

Figure 34:
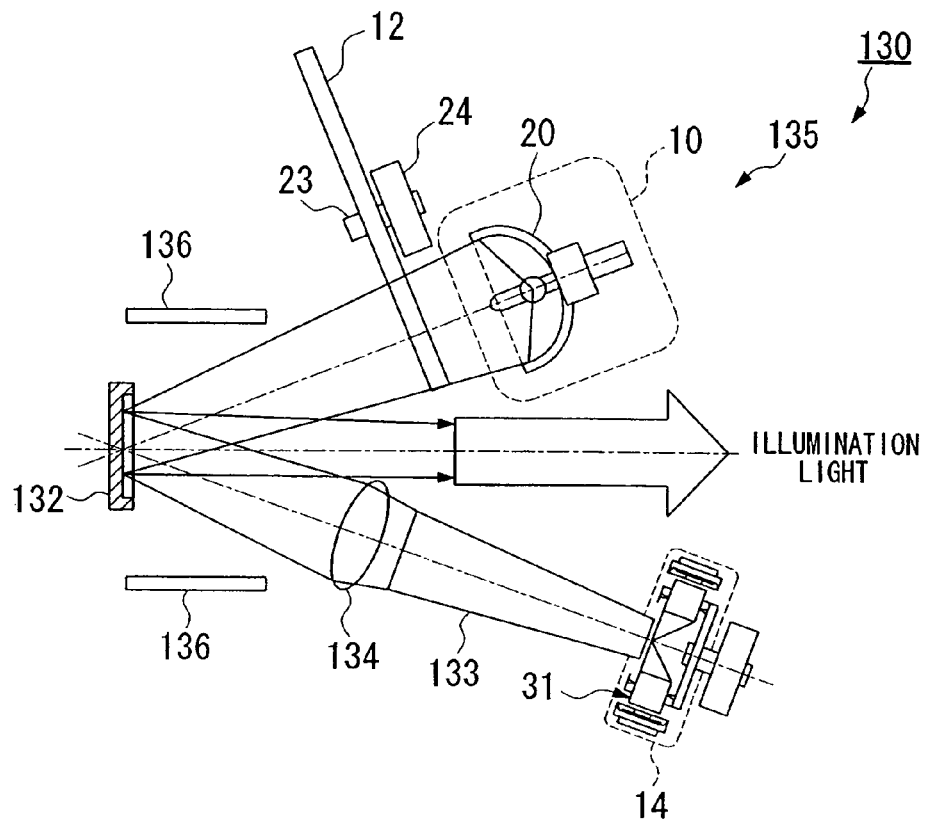
FIG. 34 is an overall diagram showing the image projection apparatus and the light source apparatus of the seventh embodiment according to the present invention.

A difference between the seventh embodiment and the first embodiment is that in the first embodiment illumination light (green (G) and blue (B)) from the color wheel 12 and illumination light (red (R)) from the LED light source unit 14 are synthesized by the synthetic prism 16, whereas in the seventh embodiment, as shown in FIG. 34, an image projection apparatus 130 is provided with a light source apparatus 135 having a DMD (selective reflection unit) 132 for selecting either illumination light from the color wheel 12 or that from the LED light source unit 14 for reflection.

Further, as in the second embodiment, in the light source apparatus 135 of this embodiment, the color wheel 12 and the LED light source unit 14 are designed to be driven independently.

Figure 35:
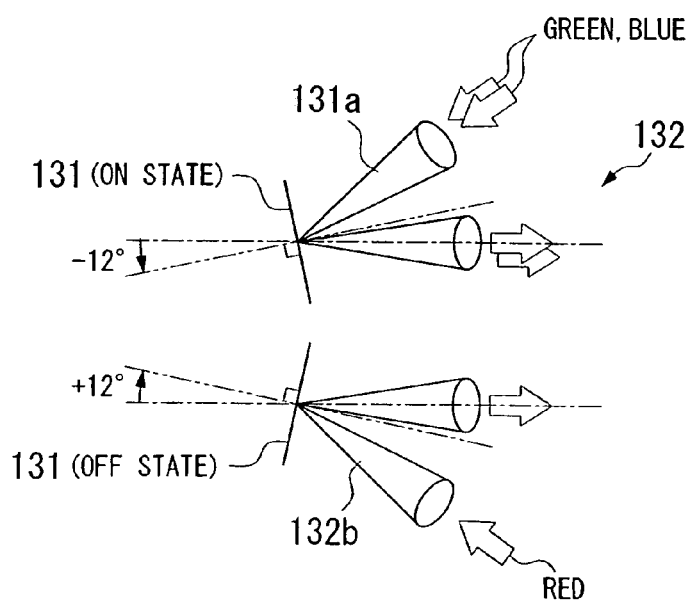
FIG. 35 is a view showing an operational state of the movable micro-mirrors of the DMD (registered trade mark) shown in FIG. 34.

As shown in FIG. 35, the DMD 132 is provided with plural movable micro-mirrors 131 which can be changed in angle by being ON-OFF controlled by the system controlling part 17. These movable micro-mirrors 131 are designed to be directed at an angle of +12 degrees in a state of OFF and at an angle of −12 degrees in a state of ON in relation to the optical axis of the illuminating optical unit 4 (indicated by the dashed line in FIG. 35). In this embodiment, illumination light reflected when illumination light 131a of green (G) and blue (B) which is incident on the movable micro-mirrors 131 is in a state of ON is made incident on the illuminating optical unit 4, as in the first embodiment. Further, illumination light reflected when red (R) illumination light 132b which is incident on the movable micro-mirrors 131 is in a state of OFF is incident on the illuminating optical unit 4, as in the first embodiment.

The lamp 10 is arrayed in a position for allowing illumination light to be incident, when the movable micro-mirrors 131 are directed at an angle of −12 degrees (in a state of ON), as shown in FIG. 34.

The LED light source unit 14 is disposed in a position for allowing illumination light to be incident, when the movable micro-mirrors 131 are directed at an angle of +12 degrees (in a state of OFF). Further, the LED light source unit 14 will be explained under the assumption that illumination light of red (R) is to be projected. The taper rod 133 and condenser lens 134 are arrayed between the LED light source unit 14 and the DMD 132. Further, a light absorbing material 136 is provided in an area around the DMD 132 for absorbing red (R) illumination light reflected on the movable micro-mirrors 131 when the movable micro-mirrors 131 are directed at an angle of −12 degrees (in a state of ON) or illumination light of green (G) and blue (B) reflected on the movable micro-mirrors 131 when the movable micro-mirrors 131 are directed at an angle of +12 degrees (in a state of OFF).

In this embodiment, the system controlling part 17 can select one mode from at least two modes, among three modes of lamp mode, LED mode and dynamic selection mode, and controls the illumination light emitted from the DMD 132 so that it is only illumination light emitted from the lamp 10 when the lamp mode is selected, only illumination light emitted from the LED light source unit 14 when the LED mode is selected, and only illumination light emitted by switching between the lamp mode and the LED mode for each color of illumination light within one frame period of image information when the dynamic selection mode is selected.

To be more specific, when the dynamic selection mode is selected, the system controlling part 17 controls all the movable micro-mirrors 131 so as to be switched to ON when the green (G) and blue (B) portions of the color filters 11 of the color wheel 12 arrive at a site where illumination light from the lamp 10 is incident. Further, the system controlling part 17 controls all the movable micro-mirrors 131 so as to be switched to OFF in synchronization with lighting timing of the LED light source unit 14 which is lit when the red (R) color portion of the filter 11 of the color wheel 12 arrives at a place where illumination light from the lamp 10 is incident thereon.

A case where the thus structured light source apparatus 135 and image projection apparatus 130 are used to emit illumination light will be described below.

First, when the lamp mode is selected, the system controlling part 17 controls all the movable micro-mirrors 131 so as to be switched to ON, thereby reflecting illumination light of red (R), green (G) and blue (B) passed through the color wheel 12 and emitted from the lamp 10. The thus reflected illumination light is then used as light for creating a projected image. In this instance, the LED light source unit 14 will not emit illumination light.

Next, where the LED mode is selected, the system controlling part 17 controls the movable micro-mirrors 131 so as to be switched to OFF, thereby reflecting red (R) illumination light emitted from the LED light source unit 14. The thus reflected illumination light is then used as light for creating a projected image. In this instance, the lamp 10 will not emit illumination light or is shielded by the light-shielding area provided on the color wheel 12 in synchronization with lighting time.

Figure 36:
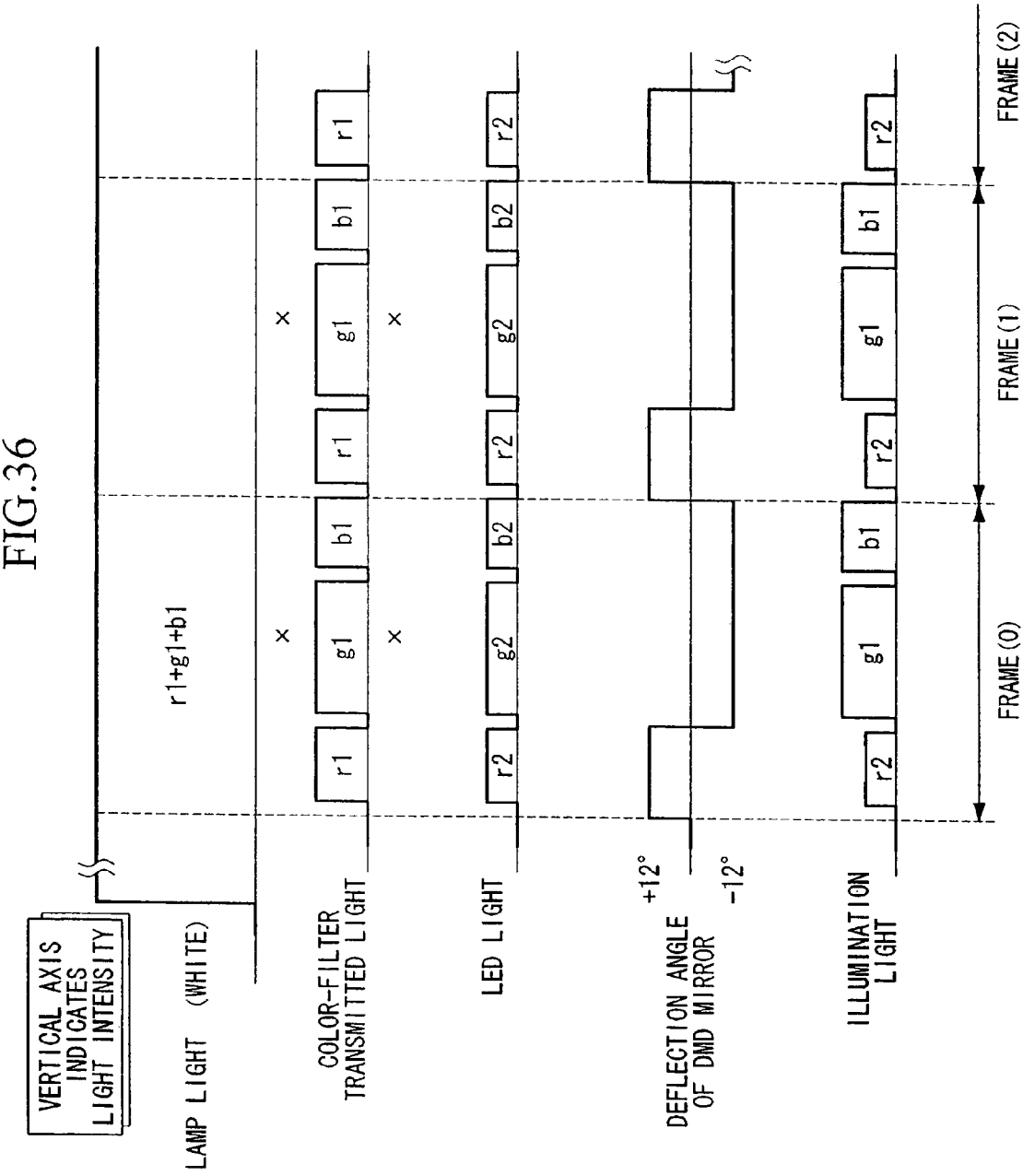
FIG. 36 is a diagram of the lighting sequence according to the light source apparatus shown in FIG. 34.

When the dynamic selection mode is selected, as shown in FIG. 35 and FIG. 36, the system controlling part 17 controls all the movable micro-mirrors 131 so as to be switched to OFF in synchronization with lighting timing of the LED light source unit 14, thereby reflecting illumination light of red (R), and also controls all the movable micro-mirrors 131 so as to be switched to ON in synchronization with lighting timing of rotation of the color wheel 12, thereby reflecting illumination light of green (G) and blue (B).

As described above, according to the light source apparatus 135 and the image projection apparatus 130 of this embodiment, it is possible to reflect illumination light by selecting a mode for each color of the light within one frame period. Thus, it is possible to select arbitrarily illumination light for which a great light intensity is secured by the lamp 10 and that for which excellent color rendering properties are secured by the LED light source unit 14, to reliably obtain illumination light with priority given to brightness or that excellent in color rendering properties, and can also be used as light for creating a projected image, thus making it possible to observe an image according to an intended application and also to increase usability.

Further, the DMD 132 is used to reflect illumination light, thereby making it possible to reliably reflect a desired color of illumination light, and also effective in enlarging the color region.

Further, the technical field of the present invention is not limited to the above-described embodiments, but may be executed in various modifications within the scope not deviating from the object of the invention.

According to the above-described various embodiments, examples of the image projection apparatus and the light source apparatus according to the present invention were described, however, the invention is not limited to the structures shown in the embodiments but may be executed in any combination of the structures shown in these embodiments. For example, the structure of the first embodiment may be combined with the cooling unit for the fifth embodiment. Alternatively, the structure of the second embodiment may be combined with the unit for shielding illumination light of the lamp.

In these embodiments, it is preferable that the central wavelength of each color of light emitted by the LED light source unit is 620 to 650 nm for red (R), 505 to 535 nm for green (G) and 450 to 480 nm for blue (B). It is also preferable that the wavelength of each color of illumination light emitted from the lamp is approximately similar to the central wavelength. The central wavelength may be made different depending on each color of light.

Further, each of the above-described embodiments may be structured in such a way the optical projection unit is provided with a zoom unit for changing a magnification of the image to be projected and the system controlling part selects the LED mode when an image projected by the optical projection unit is made smaller by the zoom unit than a predetermined size and selects the booster mode when it is made larger than the predetermined size.

To be more specific, when a projected image is changed in size by the zoom unit or others, the LED mode may be used at an image size smaller than the predetermined size, and the booster mode is used to automatically switch at an image size larger than the predetermined size.

Alternatively, it is also possible to appropriately control light intensity so that luminance of a screen reflected image can be made constant by mode switching and image data given to the display device.

The thus structured apparatus makes it possible for an observer to observe an image at any given magnification, to give a priority to color rendering properties or brightness according to the magnification of an image, thereby improving viewability of an image.

Further, each of the above-described embodiments may be structured so that the optical projection unit is provided with a projection light intensity detection sensor for detecting the light intensity of an image projected by the optical projection unit, the system controlling part selects the booster mode when the light intensity of the projected image detected by the projection light intensity sensor is smaller than a predetermined value and selects the LED mode when it is larger than the predetermined value. In this instance, it may also be structured so that the projection light intensity sensor detects light reflected from the screen in a state where an image is projected by the optical projection unit.

The thus structured apparatus makes it possible for an observer to observe an image on the screen at optimal brightness.

Further, each of the above-described embodiments may be structured so that a lamp-failure detecting unit is provided for detecting a lamp failure and a system controlling part selects the LED mode when the lamp-failure detecting unit detects a lamp failure.

The thus structured apparatus makes it possible for an observer to continuously observe an image, even when light is off due to a lamp failure.

In this instance, it may also be structured so that a lamp light-intensity detecting unit is provided for detecting a reduction in light intensity of illumination light emitted from the lamp and the system controlling part controls the LED driving unit so as to offset a reduction in light intensity of illumination light, when the lamp light-intensity detecting unit detects a reduction in light intensity of illumination light from the lamp. This allows an observer to observe a projected image more easily.

In addition, each of the above-described embodiments may be structured so that a power source monitoring unit is provided for detecting whether electricity is supplied to each component by batteries, and the system controlling part selects the LED mode or disables other modes, when the power source monitoring unit detects that electricity is supplied from batteries.

The thus structured apparatus makes it possible to observe a projected image in a state where electricity power dissipation from the batteries is kept to the lowest possible level. Where the apparatus is driven by AC power, it may be structured so that any mode is effective.

Each of the above-described embodiments may also be provided with a selected-mode displaying unit for displaying a mode selected by the system controlling part so that an observer can recognize the mode.

The thus structured apparatus makes it possible for an observer to confirm a mode easily and reliably, thereby resulting in an increased usability of the apparatus and a reduction in mode selection error.

Further, the LED mode is defined as cinema mode and the booster mode as presentation mode, and the mode switching is displayed as interface, which is more user-friendly and therefore preferable.

In addition, each of the above-described embodiments may be structured so that an LED light source is provided when color reproduction is required and a lamp light source is provided in place of the LED light source when brightness is required, rather than providing both the LED light source and the lamp light source as a set in the apparatus. In this instance, it will be convenient, if types and characteristics of a light source are sent to the system controlling part as information so that an appropriate light source can be automatically selected according to the information.

Figure 37:
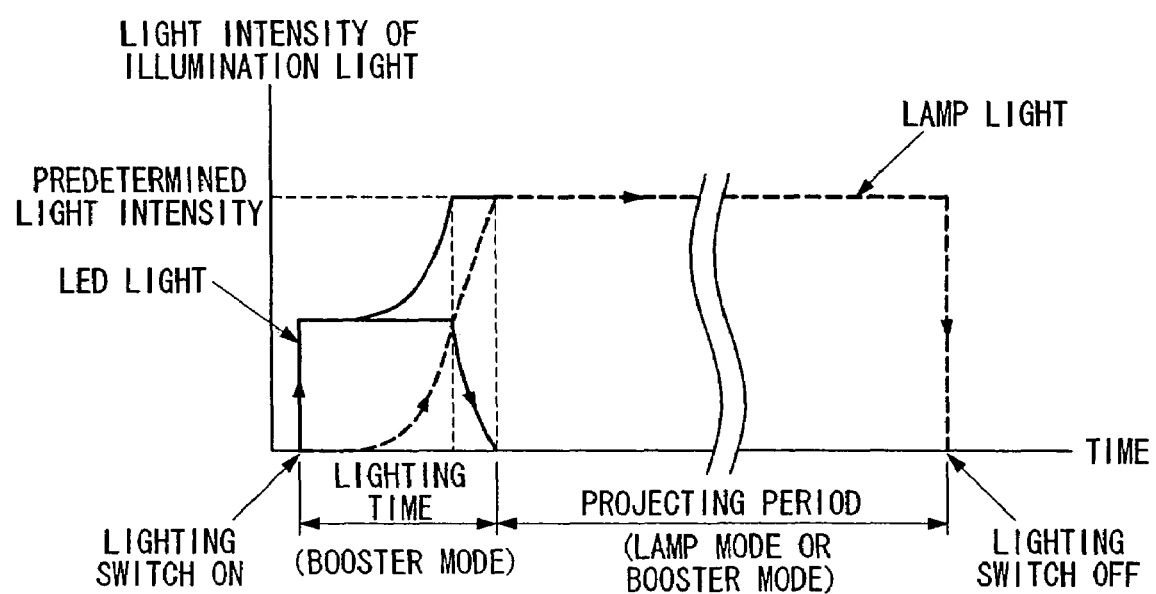
FIG. 37 is a diagram in which the light intensity of lamp light is compared with that of the LED light for the period from immediately after the apparatus is driven to the elapse of a predetermined time.

Further, each of the above-described embodiments may be structured so that, as shown in FIG. 37, the system controlling part selects the booster mode immediately after being driven and also selects the lamp mode or the booster mode after some time has elapsed when light intensity of illumination light emitted from the lamp exceeds a predetermined light intensity.

The thus structured apparatus makes it possible to offset an insufficient light intensity resulting from delay in rise time of the lamp by using illumination light from the LED light source unit because the system controlling part automatically selects the booster mode immediately after it is driven. Then, the system controlling part selects the lamp mode or the booster mode after some time when light intensity of illumination light from the lamp exceeds the predetermined light intensity. Therefore, an observer can reliably observe a projected image at a predetermined brightness immediately after the apparatus is started up, and usability can be improved.

According to the light source apparatus of the embodiments of the invention, illumination light emitted from the lamp and that emitted from the LED light source unit can be synthesized into illumination light of the same color, thereby acquiring illumination light with a great light intensity, smaller in light angle and excellent in color rendering properties. Thus, it is possible to reliably acquire illumination light excellent in brightness (sufficient luminance) and color rendering properties.

In addition, according to the image projection apparatus of the embodiments of the invention, the illumination light excellent in brightness (sufficient luminance) and color rendering properties can be utilized effectively as described above, thereby acquiring a projected image which an observer can clearly observe.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A light source apparatus comprising:
   a lamp for emitting white illumination light;
   a color wheel for rotating a color filter having a plurality of colors and sequentially switching the color filter on which illumination light emitted by the lamp is incident;
   a wheel driving unit for rotating the color wheel and also controlling the rotation;
   an LED light source unit for emitting at least one color of illumination light;
   an LED driving unit for driving the LED light source unit and also controlling illumination light to be emitted;
   an optical synthesis unit capable of optically synthesizing and emitting illumination light passed through the color filter of the color wheel and illumination light emitted from the LED light source unit; and
   a system controlling unit for controlling the wheel driving unit and the LED driving unit so that each color of illumination light synthesized by the optical synthesis unit is rendered the same;
   wherein the optical synthesis unit is a prism having a first plane on which illumination light passed through the color filter of the color wheel is incident, a second plane on which illumination light emitted by the LED light source unit is incident, and a third plane from which illumination light made incident at least on the first and the second planes is emitted, so that illumination light totally reflected by the second plane of illumination light incident on the first plane and illumination light totally reflected by the first plane of illumination light incident from the second plane are also emitted from the third plane.

2. The light source apparatus according to claim 1, wherein the LED light source unit emits a single color of illumination light and includes:
   a plurality of LED elements emitting the single color of illumination light; and
   a light guide unit for guiding to the optical synthesis unit illumination light emitted by the plurality of LED elements,
   wherein the LED driving unit drives the plurality of LED elements so that the plurality of LED elements are turned on sequentially in chronological order and also controls the light guide unit so as to move the light guide unit in relation to the plurality of LED elements in synchronization with timing for turning on the plurality of LED elements.

3. The light source apparatus according to claim 2, wherein:
   the plurality of LED elements are disposed on a circumference, emitting the single color illumination light toward the center of the circumference; and
   the light guide unit is rotated about the center of the circumference.

4. The light source apparatus according to claim 3, wherein the rotation number per unit time of the color wheel driven by the wheel driving unit is designed to be different from the rotation number per unit time of the light guide unit rotated by the LED driving unit.

5. The light source apparatus according to claim 1, wherein the LED light source unit emits illumination light the color number of which is equal to that of illumination light passed through the color filter of the color wheel.

6. The light source apparatus according to claim 5, wherein illumination light emitted by the LED light source unit and illumination light passed through the color filter of the color wheel have red (R), green (G) and blue (B) that are approximately the same in central wavelength.

7. The light source apparatus according to claim 5, wherein illumination light emitted by the LED light source unit and illumination light passed through the color filter of the color wheel have two types of red (R), green (G) and blue (B) that are different in central wavelength, respectively.

8. An image projection apparatus for projecting an image according to image information to be input, comprising:
   a light source apparatus as set forth in claim 7;
   a spatial modulation element to be modulated according to the image information to be input;
   an illuminating optical unit for guiding illumination light emitted from the optical synthesis unit and illuminating the spatial modulation element;
   an optical projection unit for projecting the image created by the illuminating optical unit and modulated by the spatial modulation element; and
   a color adjusting unit for adjusting a central wavelength for each color of red (R), green (G) and blue (B) of the image projected by the optical projection unit to adjust illumination light intensity of respective colors of red (H), green (G) and blue (B) emitted by the LED light source unit.

9. The light source apparatus according to claim 1, wherein:
   the LED light source unit includes a plurality of LED elements for emitting at least two colors of illumination light and a light guide unit for guiding to the optical synthesis unit illumination light emitted by the plurality of LED elements; and
   the LED driving unit drives the plural LED elements to turn them on sequentially in chronological order and also controls the light guide unit so as to move with respect to the plurality of LED elements in synchronization with timing for turning on the plurality of LED elements.

10. The light source apparatus according to claim 9, wherein:

the plural LED elements are disposed on a circumference, emitting illumination light toward the center of the circumference; and the light guide unit is rotated about the center of the circumference.

11. The light source apparatus according to claim 10, wherein:

the color order of the color filter moving in a direction opposite the rotating direction of the color wheel is the same as that of illumination light emitted by respective LED elements of the LED light source unit in the direction in which the light guide unit moves; and the rotation number per unit time of the color wheel driven by the wheel driving unit is designed to be equal to that of the light guide unit rotated by the LED driving unit.

12. The light source apparatus according to claim 11, wherein:

the wheel driving unit includes a motor rotating and driving the color wheel; and the LED driving unit rotates the light guide unit by utilizing the rotation and driving force of the motor.

13. An image projection apparatus for projecting an image according to the image information to be input so as to be observed by an observer, the image projection apparatus comprising:

a light source apparatus set forth in claim 1;

a spatial modulation element modulated according to the image information to be input;

an illuminating optical unit for guiding illumination light emitted from the optical synthesis unit and illuminating the spatial modulation element; and an optical projection unit illuminated by the illuminating optical unit for projecting an image modulated by the spatial modulation element.

14. The image projection apparatus according to claim 13, wherein the system controlling unit can select one mode from at least two modes among four modes of lamp mode, LED mode, booster mode and dynamic selection mode, as a condition under which the spatial modulation element is illuminated by the illuminating optical unit, and controls the wheel driving unit and the LED driving unit so that illumination light emitted by the optical synthesis unit is:

only illumination light emitted by the lamp when selecting the lamp mode;

only illumination light emitted by the LED light source unit when selecting the LED mode;

combined illumination light derived by combining illumination light emitted by the lamp and that emitted by the LED light source unit in at least one color of illumination light when selecting the booster mode; and illumination light emitted by switching between the lamp mode and the LED mode within one frame period of the image information when selecting the dynamic selection mode.

15. The image projection apparatus according to claim 14, wherein the system controlling unit selects and switches between the lamp mode and the LED mode for each color of illumination light emitted from the optical synthesis unit when selecting the dynamic selection mode.

16. The image projection apparatus according to claim 14, further comprising a manual switch operable by an observer for specifying the mode to be selected by the system controlling unit among the four modes.

17. The image projection apparatus according to claim 14, wherein the system controlling unit selects one mode according to the image information to be input.

18. The image projection apparatus according to claim 17, wherein the system controlling unit:

selects the LED mode when a ratio of the pixels exceeding a predetermined gradation threshold to the whole is smaller than a predetermined ratio, in gradation distribution of the pixels of the image information to be input; and selects the booster mode when the ratio is greater than the predetermined ratio.

19. The image projection apparatus according to claim 14, further comprising:

an ambient light intensity sensor for detecting an ambient light intensity, wherein the system controlling unit selects the LED mode when the ambient light intensity detected by the ambient light intensity sensor is smaller than a predetermined value, and selects the booster mode when it is greater than the predetermined value.

20. The image projection apparatus according to claim 19, wherein when the optical projection unit projects an image to a screen, the ambient light intensity sensor detects as an ambient light intensity the reflected light from the screen in a state where the optical projection unit projects no image.

21. The image projection apparatus according to claim 14, further comprising:

a zooming unit for changing a magnification of the image projected by the optical projection unit, wherein the system controlling unit selects the LED mode when the image projected by the optical projection unit is made smaller than a predetermined size by the zooming unit, and selects the booster mode when it is made greater than the predetermined size.

22. The image projection apparatus according to claim 14, further comprising:

a projection light intensity sensor for detecting the light intensity of an image projected by the optical projection unit, wherein the system controlling unit selects the booster mode when light intensity of the projected image detected by the projection light intensity sensor is smaller than a predetermined value, and selects the LED mode when it is greater than the predetermined value.

23. The image projection apparatus according to claim 22, wherein when the optical projection unit projects an image to a screen, the projection light intensity sensor detects the reflected light from the screen in a state where the optical projection unit projects the image.

24. The image projection apparatus according to claim 14, further comprising:

a lamp failure detecting unit for detecting failure of the lamp, wherein the system controlling unit selects the LED mode when the lamp failure detecting unit detects the failure of the lamp.

25. The image projection apparatus according to claim 14, further comprising:

a lamp light-intensity detecting unit for detecting a reduction in light intensity of illumination light emitted by the lamp, wherein the system controlling unit selects the booster mode when the lamp light-intensity detecting unit detects the reduction in light intensity of illumination light emitted from the lamp, and also controls the LED driving unit so as to offset the reduction in light intensity of illumination light.

26. The image projection apparatus according to claim 14, further comprising:

a power-source monitoring unit for detecting whether or not a power source is supplied to respective components by a battery, wherein the system controlling unit selects the LED mode when the power source monitoring unit detects that the power source is supplied from the battery.

27. The image projection apparatus according to claim 14, further comprising:

a projection light intensity sensor for detecting the light intensity of respective colors of red (R), green (G) and blue (B) on an image projected by the optical projection unit; and a white-balance calculation setting unit for calculating the white balance on the basis of the light intensity of respective colors detected by the projection light intensity sensor and controlling the intensity of the LED driving unit according to the calculated white balance.

28. The image projection apparatus according to claim 27, wherein the white-balance calculation setting unit controls the intensity of the LED driving unit so that the respective white balances of the LED mode, the booster mode and the dynamic selection mode are approximately equal.

29. The image projection apparatus according to claim 14, wherein the system controlling unit selects the booster mode immediately after actuation, and selects the lamp mode or the booster mode after a time when the light intensity of illumination light projected from the lamp exceeds a predetermined light intensity from the lamp has elapsed.

30. The image projection apparatus according to claim 14, further comprising a lamp shutting-off unit for optically shutting off illumination light emitted by the lamp when the system controlling unit has switched from the lamp mode to the LED mode or from the booster mode to the LED mode.

31. The image projection apparatus according to claim 14, further comprising:

a cooling unit for expelling heat generated by the lamp and the LED light source unit from the apparatus, wherein the cooling unit expels the heat via a first channel capable of easily radiating the heat generated from the lamp when the lamp mode is selected, and expels the heat via a second channel capable of easily radiating heat generated by the LED light source unit when the LED mode is selected.

32. The image projection apparatus according to claim 31, wherein the cooling unit includes a first suctioning pore and a second suctioning pore having an exhaust fan and a shutter function, and in order to radiate heat from the first channel, air is expelled from the apparatus by the exhaust fan in a state where the shutter of the first suctioning pore is opened and the shutter of the second suctioning pore is closed; and in order to radiate heat from the second channel, air is expelled from the apparatus by the exhaust fan in a state where the shutter of the first suctioning pore is closed and the shutter of the second suctioning pore is opened.

33. The image projection apparatus according to claim 14, further comprising a selection mode displaying unit for displaying a mode selected by the system controlling unit so as to be recognized by an observer.

34. A light source apparatus comprising:

a lamp for emitting white illumination light;

a color wheel for rotating a color filter having a plurality of colors and sequentially switching the color filter on which illumination light emitted by the lamp is incident;

a wheel driving unit for rotating the color wheel and also controlling the rotation;

an LED light source unit for emitting at least one color of illumination light;

an LED driving unit for driving the LED light source unit and also controlling illumination light to be emitted;

an optical synthesis unit capable of optically synthesizing and emitting illumination light passed through the color filter of the color wheel and illumination light emitted from the LED light source unit; and a system controlling unit for controlling the wheel driving unit and the LED driving unit so that each color of illumination light synthesized by the optical synthesis unit can be rendered the same;

wherein the optical synthesis unit is a polarizing beam splitter having a polarization and transmission reflecting plane, and the polarizing beam splitter synthesizes linearly-polarized illumination light in a predetermined direction with respect to the polarization and transmission reflecting plane among various types of illumination light passed through the color filter of the color wheel and linearly-polarized illumination light in a direction perpendicular to the predetermined direction among various types of illumination light emitted by the LED light source unit.

35. The light source apparatus according to claim 34, further comprising:

a first polarizing plate for converting illumination light passed through the color filter of the color wheel to linearly-polarized illumination light in the predetermined direction with respect to the polarization and transmission reflecting plane; and a second polarizing plate for converting illumination light emitted by the LED light source unit to linearly-polarized illumination light in a direction perpendicular to the predetermined direction, wherein the polarizing beam splitter synthesizes illumination light converted individually by the first polarizing plate and the second polarizing plate.

36. A light source apparatus comprising:

a lamp emitting white illumination light;

a color wheel for rotating color filters of a plurality of colors and sequentially switching the color filters on which illumination light emitted by the lamp is incident;

a wheel driving unit for rotating and driving the color wheels and also controlling the rotation;

an LED light source unit for emitting at least one color of illumination light;

an LED driving unit for driving the LED light source unit and also controlling the emitted illumination light;

a selective reflection unit for selecting and reflecting either illumination light passed through the color filter of the color wheel or illumination light emitted by the LED light source unit; and a system controlling unit for controlling the wheel driving unit and the LED driving unit so that each illumination light to be selected by the selective reflection unit is the same in color.

37. The light source apparatus according to claim 36, wherein the selective reflection unit is a DMD (digital micromirror device).

38. An image projection apparatus for projecting an image according to image information to be input so as to be observed by an observer, the image projection apparatus comprising:

a light source apparatus set forth in claim 36;

a spatial modulation element to be modulated according to the image information to be input;

an illuminating optical unit for guiding illumination light reflected by the selective reflection unit and illuminating the spatial modulation element; and an optical projection unit for projecting the image illuminated by the illuminating optical unit and modulated by the spatial modulation element.

39. The image projection apparatus according to claim 38, wherein the system controlling unit can select one mode from at least two modes among three modes of lamp mode, LED mode and dynamic selection mode as a condition where the illuminating optical unit illuminates the spatial modulation element, and controls the wheel driving unit and the LED driving unit so that illumination light emitted by the selective reflection unit is:

only illumination light emitted by the lamp when selecting the lamp mode;

only illumination light emitted by the LED light source unit when selecting the LED mode; and illumination light emitted by switching between the lamp mode and the LED mode within one frame of the image information when selecting the dynamic selection mode.

40. The image projection apparatus according to claim 39, wherein the system controlling unit selects and switches between the lamp mode and the LED mode for each color of illumination light emitted by the selective reflection unit when the dynamic selection mode is selected.

* * * * *